US012466042B2

(12) United States Patent
Bellissimo et al.

(10) Patent No.: US 12,466,042 B2
(45) Date of Patent: Nov. 11, 2025

(54) NAIL GUN AND METHODS FOR SEQUENTIALLY DRIVING NAILS INTO A SUBSTRATE OR A STRUCTURE

(71) Applicant: Buildz, LLC, Forest City, NC (US)

(72) Inventors: Mark Joseph Bellissimo, Wellington, FL (US); Stanley Clark Beard, Jr., Hendersonville, NC (US); Caleb Robert Boothe, Inman, SC (US); Zachary Tarshel Peek, Shelby, NC (US); Robert Charles McNaughton, Forest City, NC (US); Robert James Hellner, Zirconia, NC (US)

(73) Assignee: Buildz, LLC, Forest City, NC (US)

( * ) Notice: Subject to any disclaimer, the term of this patent is extended or adjusted under 35 U.S.C. 154(b) by 0 days.

(21) Appl. No.: 18/593,576

(22) Filed: Mar. 1, 2024

(65) Prior Publication Data

US 2024/0293922 A1 Sep. 5, 2024

Related U.S. Application Data

(60) Provisional application No. 63/449,447, filed on Mar. 2, 2023, provisional application No. 63/458,540, filed on Apr. 11, 2023.

(51) Int. Cl.
*B25C 1/04* (2006.01)
*B25C 1/00* (2006.01)

(52) U.S. Cl.
CPC .............. *B25C 1/047* (2013.01); *B25C 1/003* (2013.01)

(58) Field of Classification Search
CPC ................................ B25C 1/047; B25C 1/003
See application file for complete search history.

(56) References Cited

U.S. PATENT DOCUMENTS

| | | | | |
|---|---|---|---|---|
| 2,879,509 | A | 3/1959 | Congdon et al. | |
| 2,973,021 | A * | 2/1961 | Crossen | B25B 13/481 81/430 |
| 3,049,713 | A * | 8/1962 | Dupuy | B25C 1/001 227/112 |
| 3,563,438 | A | 2/1971 | Doyle et al. | |
| 3,837,556 | A | 9/1974 | Doyle et al. | |
| 5,004,141 | A | 4/1991 | Young | |
| 2002/0189065 | A1 | 12/2002 | Pruyne | |
| 2010/0163595 | A1 | 7/2010 | Draht | |

FOREIGN PATENT DOCUMENTS

EP 0138565 A2 4/1985

OTHER PUBLICATIONS

International Search Report and Written Opinion from PCT/US2024/018192 dated Jun. 7, 2024, 15 pages.

* cited by examiner

*Primary Examiner* — Nathaniel C Chukwurah
(74) *Attorney, Agent, or Firm* — Michele V. Frank; Venable LLP

(57) ABSTRACT

A nail gun for repeatedly driving nails into a substrate includes a drive assembly having a longitudinal axis, a feed head assembly attached to the drive assembly and configured to provide the nails to an output segment, a hammer configured to reciprocate along the longitudinal axis of the drive assembly to drive the nails into the substrate, and a reservoir assembly configured to provide compressed air to the drive assembly to reciprocate the hammer and drive the nail into the substrate. A method drives nails into a substrate with the nail gun.

30 Claims, 62 Drawing Sheets

NAIL GUN AND METHODS FOR SEQUENTIALLY DRIVING NAILS INTO A SUBSTRATE OR A STRUCTURE

CROSS REFERENCE TO RELATED APPLICATIONS

The present application claims priority to U.S. provisional patent application No. 63/449,447 filed Mar. 2, 2023, and U.S. provisional patent application No. 63/458,540 filed Apr. 11, 2023, the entire contents of each of which is hereby incorporated by reference in its entirety.

TECHNICAL FIELD

The present disclosure relates generally to nail guns. In particular, the present disclosure relates to a nail gun and methods for sequentially driving nails into a substrate or a structure.

BACKGROUND

The need for using fasteners, such as nails, is well known in the field of construction, especially for fixedly connecting together rigid frame elements, such as can be made of wood or other suitably rigid and durable materials. Some structures are assembled on-site from prefabricated, custom-designed modular units that are assembled in a factory and then transported to the construction site for assembly with other such modular units to form a building. With the rise in factory-built modular building units, there is a need for nail guns that provide high reliability without malfunctioning and with sufficient durability to operate substantially continuously while delivering repeated impact forces without damaging the nail driver.

SUMMARY

A nail gun configured to repeatedly drive nails into a substrate, the nail gun having a drive assembly having a longitudinal axis, a feed head assembly attached to the drive assembly and configured to provide the nails to an output segment, a hammer configured to reciprocate along the longitudinal axis of the drive assembly to drive the nails into the substrate, and a reservoir assembly configured to provide compressed air to the drive assembly to reciprocate the hammer and drive a nail into the substrate.

A method for sequentially driving nails into a substrate or structure, the method including providing a nail gun, dispensing a first nail into the drive assembly such that the first nail moves into the output segment, moving the hammer along a direction of the longitudinal axis, impacting a head of the first nail with a distal end of the hammer, thereby imparting a drive force to the first nail, feeding, from a nail supply and while the hammer is moving to impact the first nail, a second nail into a reload segment, preventing the second nail from being dispensed into the feed head assembly while the distal end of the hammer is in the feed head assembly, and dispensing the second nail into the feed head assembly after the distal end of the hammer is withdrawn from the feed head assembly. The nail gun includes a drive assembly having a longitudinal axis, a feed head assembly attached to the drive assembly and configured to provide the nails to an output segment, a hammer configured to reciprocate along the longitudinal axis of the drive assembly to drive the nails into the substrate, and a reservoir assembly configured to provide compressed air to the drive assembly to reciprocate the hammer and drive the nails into the substrate.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
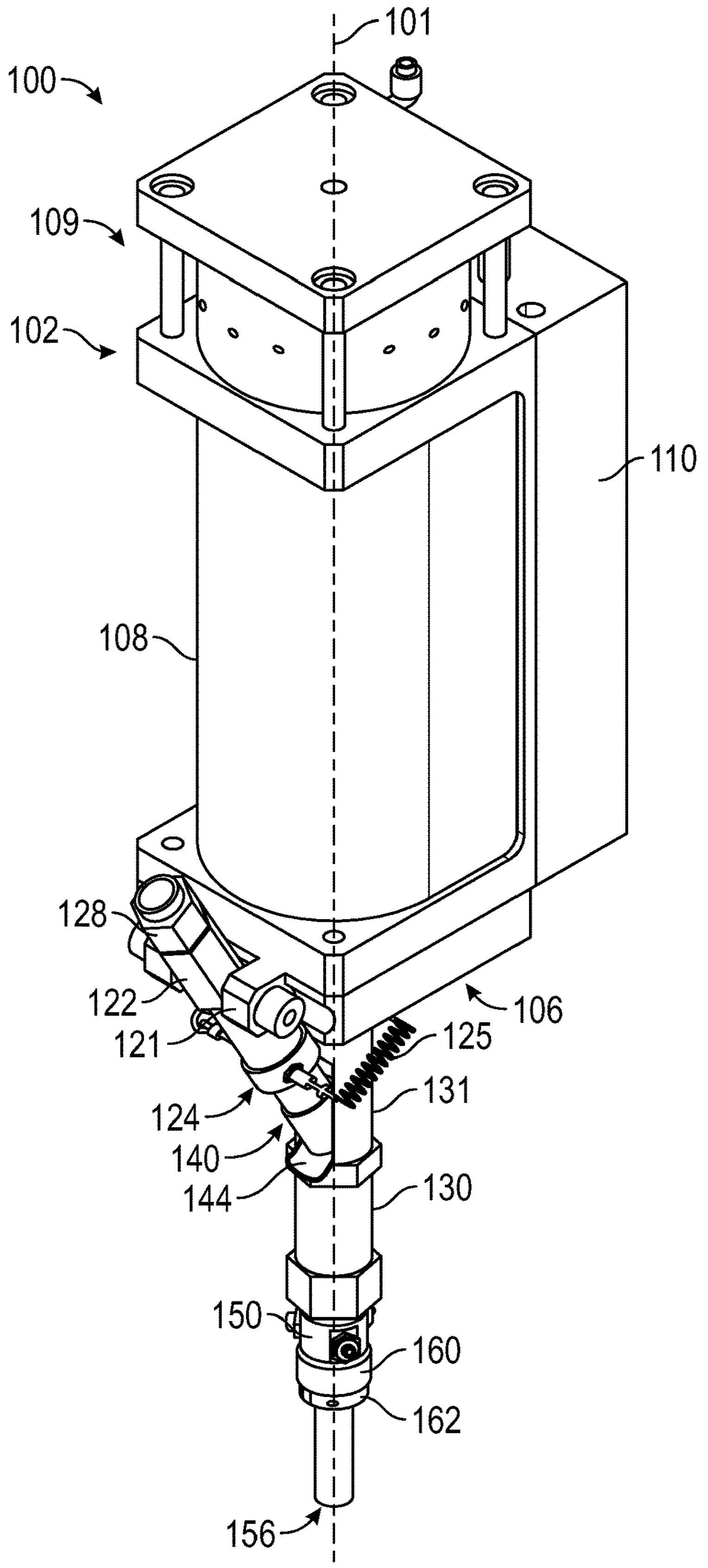
FIG. 1 is an isometric view of an example embodiment of a nail gun having an automated feed-blown reloading mechanism integrated therein for repeated operation.
Figure 2:
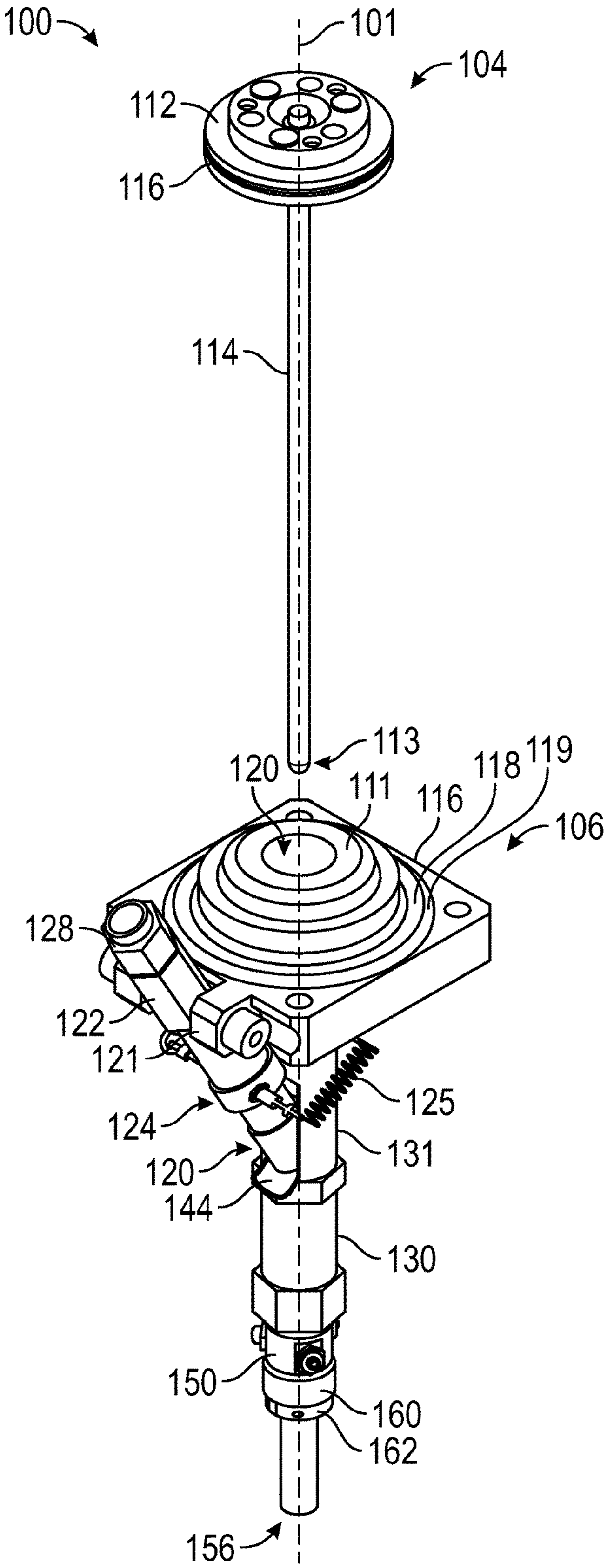
FIG. 2 is an isometric view of a portion of the nail gun shown in FIG. 1, with the driver and the feed head assembly being arranged in an exploded view relative to each other.
Figure 3:
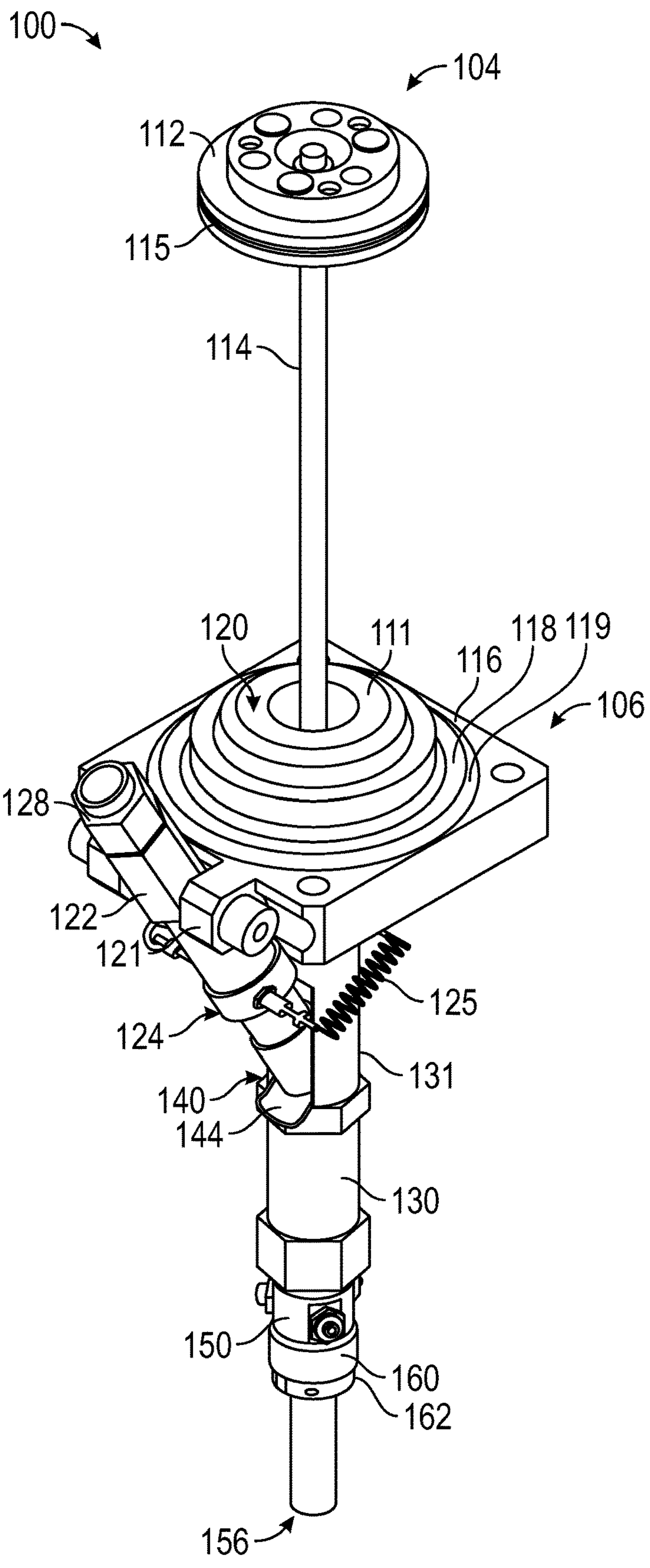
FIG. 3 is an isometric view of the portion of the nail gun shown in FIG. 2, with the driver engaged, at least partially, within the driver hole of the feed head assembly.
Figure 4:
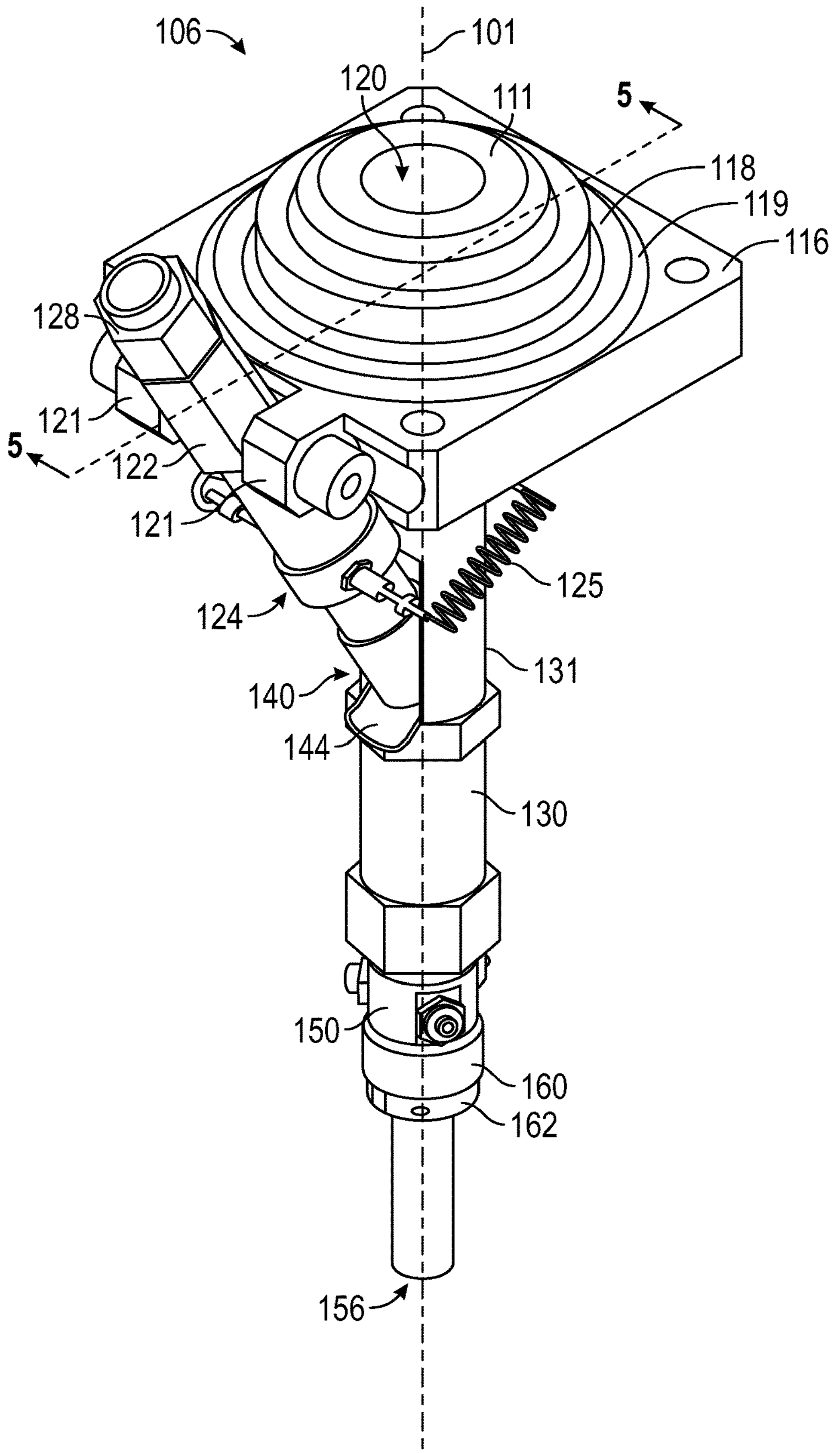
FIG. 4 is an isometric view of the feed head assembly of the nail gun shown in FIG. 1.

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first," "second,", "third," "fourth," etc., may be used interchangeably to distinguish one component from another and are not intended to signify location or importance of the individual components.

The terms "coupled," "fixed," "attached," "connected," and the like, refer to both direct coupling, fixing, attaching, or connecting as well as indirect coupling, fixing, attaching, or connecting through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components or the systems or manufacturing the components or the systems. For example, the approximating language may refer to being within a one, a two, a four, a ten, a fifteen, or a twenty percent margin in either individual values, range(s) of values or endpoints defining range(s) of values.

FIGS. 1 to 5 show various aspects of the structure, assembly, functionality, and operation of a nail gun 100, according to the present disclosure. The nail gun 100 generally comprises a drive assembly 102, a hammer 104, and a feed head assembly 106. The drive assembly 102 is connected to the feed head assembly 106 and the hammer 104 is contained in a mobile manner within the drive assembly 102 and the feed head assembly 106. The drive assembly 102 comprises a drive motor 108 and a controller, also referred to as a reservoir assembly 110. The drive motor 108 is used to move the hammer 104 linearly along the longitudinal axis 101 of the nail gun 100. The reservoir assembly 110 is used to control actuation of the drive assembly 102, as well as various operational aspects (e.g., velocity, force, stroke depth, etc.) of the drive motor 108 and/or the hammer 104. The drive motor 108 includes a dump valve 109 that helps provide a seal against a cylinder of the drive motor 108. The drive motor 108 can be, for example, an electrical motor. In some embodiments, the drive motor 108 can be pneumatically driven and/or hydraulically driven. Any suitable type of drive motor may be used.

Figure 18:
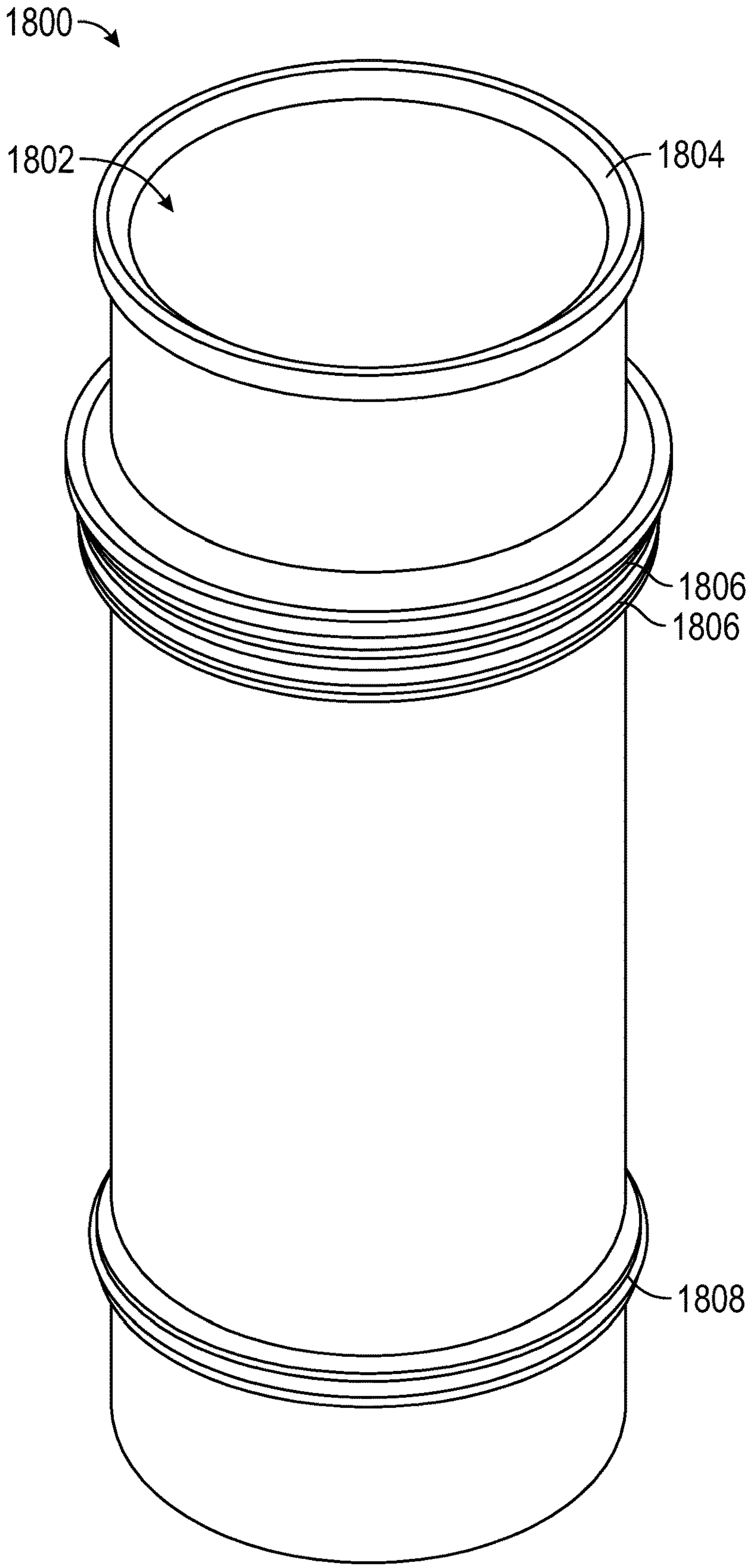
FIG. 18 is an isometric view of a cylinder of a drive motor of the nail gun of FIG. 10.

The hammer 104 comprises a hammer head 112, which moves internal to the drive assembly 102 in a captive manner, and a hammer rod 114, which is attached on one side of the hammer head 112 and extends away from the hammer head 112 in the direction of the feed head assembly 106. In the example embodiment shown, the hammer head 112 has a generally disc-like shape, or an annular shape, and is configured to be movably disposed within a cylinder (e.g., an example of which is shown in FIG. 18) contained within the drive assembly 102. In an example embodiment in which the drive motor 108 is pneumatically-driven or hydraulically-driven, the hammer head 112 advantageously comprises, on and/or around a peripheral edge thereof, a seal 115 or a gasket (e.g., in the form of an O-ring) to form an air-tight seal and/or a liquid-tight seal between the walls of the cylinder and the hammer head 112 to ensure efficient operation of the nail gun 100.

Figure 6A:
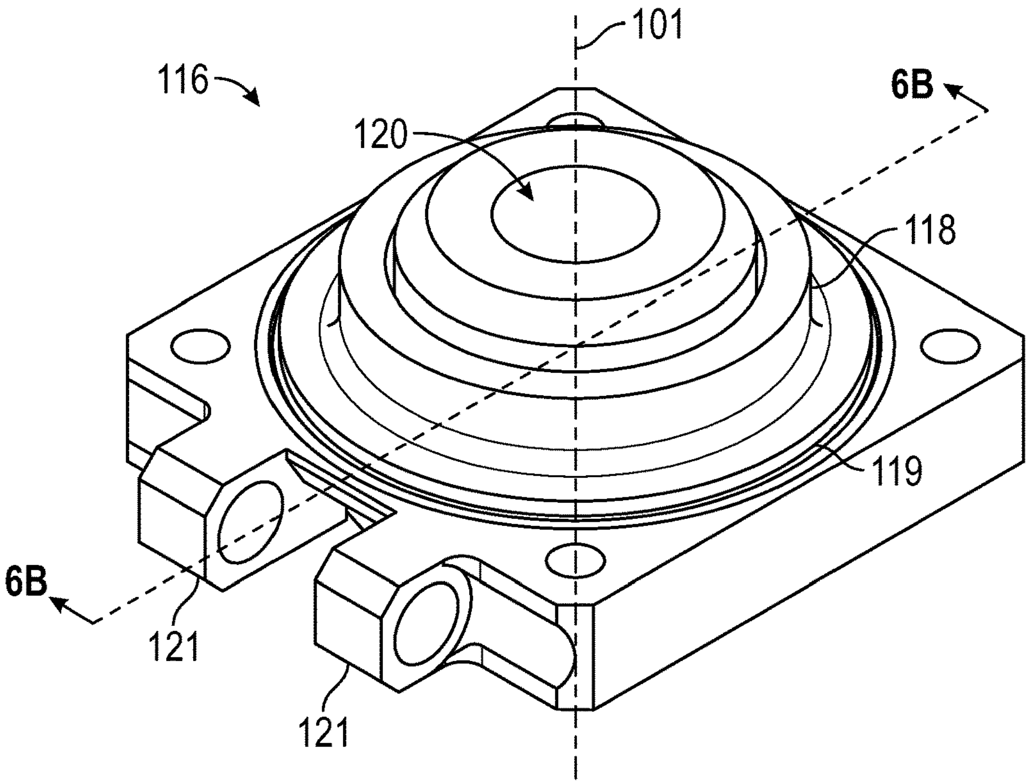
FIGS. 6A-6C show various aspects of an example embodiment of a base plate of the feed head assembly shown in FIGS. 1-5.
Figure 6B:
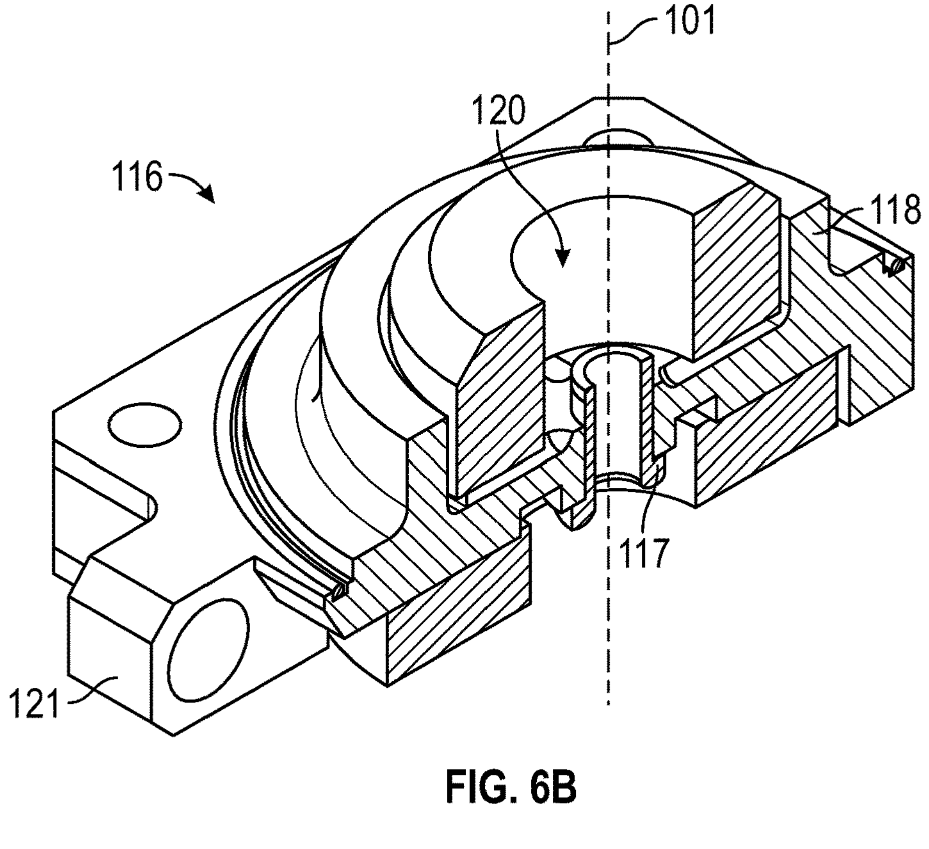
Figure 6C:
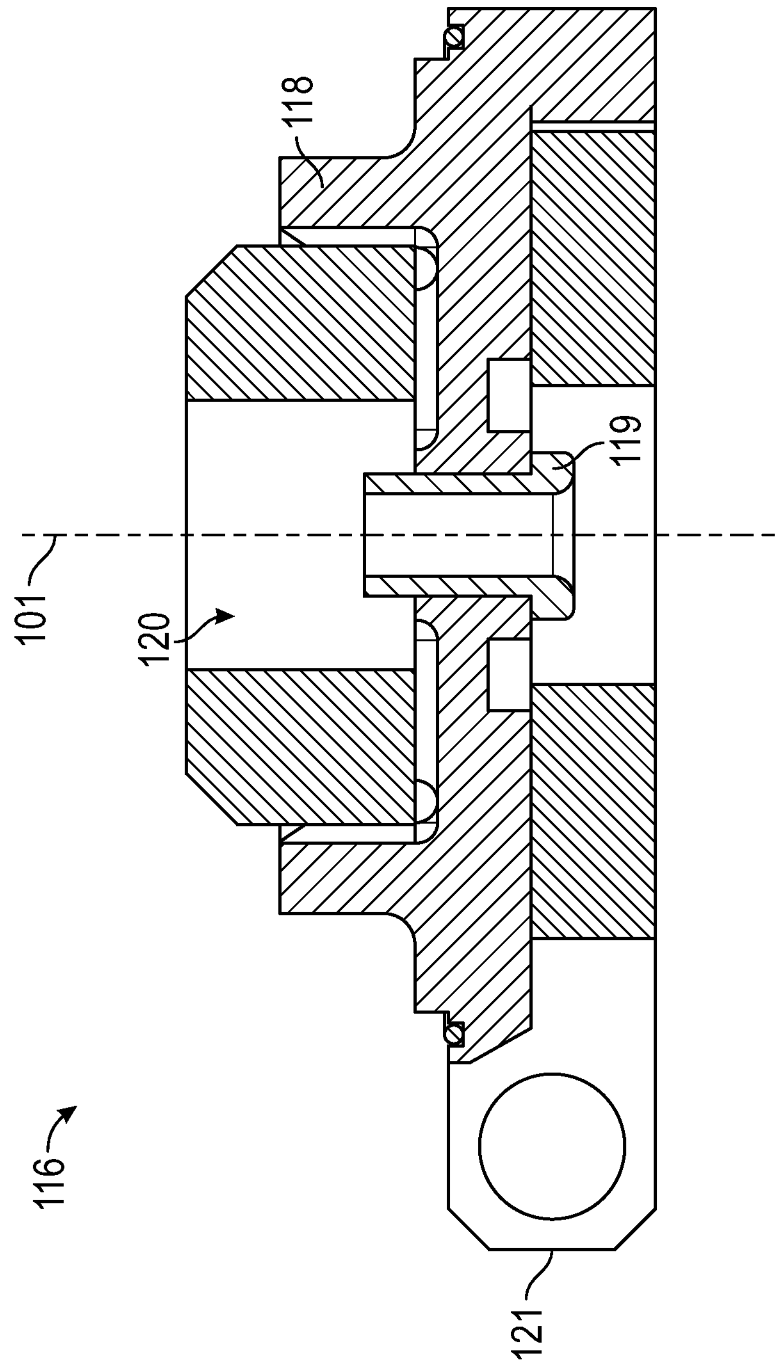

The feed head assembly 106 comprises a base plate 116, example aspects of which are shown in the illustration of FIGS. 6A to 6C for the example embodiment of the feed head assembly 106 and the nail gun 100 disclosed herein. FIG. 6B illustrates a cross-sectional view of the base plate 116 taken along the section line 6B-6B. The base plate 116 is fixedly attached to the drive motor 108. The base plate 116 comprises, on an upper surface thereof, a bumper 111, a mating flange 118 and a drive hole 120, also referred to as a hammer hole. The mating flange 118 is shaped to have a substantially similar outer profile (e.g., diameter) as the cylinder within the drive motor 108. The bumper 111 is disposed within the mating flange 118 and is configured to absorb impacts from the hammer head 112 at an end of a drive stroke of the hammer 104 and during dry fires (e.g., when there is no nail 10) of the hammer 104. Furthermore, when the base plate 116 is attached to the drive motor 108, the mating flange 118 and the cylinder of the drive motor 108 are advantageously concentric and/or coaxial with each other. The base plate 116 further comprises, on and/or around the mating flange 118, a seal 119 or a gasket that is configured to directly contact the drive motor 108 for forming an air-tight seal and/or a liquid-tight seal between the base plate 116 and the drive motor 108. The base plate 116 also includes a mounting bracket 121.

The hammer 104 is positioned within the cylinder of the drive motor 108 such that the hammer rod 114 is sufficiently aligned with the drive hole 120 for insertion of the hammer rod 114 within the drive hole 120. In some embodiments, the hammer 104 is positioned within the cylinder of the drive motor 108 such that the hammer rod 114 is substantially coaxial with the drive hole 120.

The feed head assembly 106 also comprises a reload segment 122 that is pivotably attached to the base plate 116 by a pivot mechanism 124 and within the mounting bracket 121. While not so limited, in the example embodiment the reload segment 122 is attached to the base plate 116 on a lateral edge of the base plate 116. The reload segment 122 comprises a reload chamber 126 (FIG. 5) that is contained therein. At a first end 123 of the reload segment 122, the reload segment 122 is connected to a nail feed fitting 128, which is configured to dispense a nail 10 (FIGS. 9A to 9L) from a nail supply into the reload chamber 126. The nails 10 are dispensed sequentially and individually into the reload chamber 126 from the nail feed fitting 128. In the example embodiment shown herein, the nail feed fitting 128 is engaged with the first end 123 of the reload segment 122 via a threaded connection, but any suitable connection type between the nail feed fitting 128 and the reload segment 122 can be provided. At a second end of the reload segment 122, the reload chamber 126 defines a reload chamber outlet 127 through which the nail 10 is dispensed from the reload chamber 126.

The reload segment 122 is connected to the base plate 116 in such a manner that no portion of the reload chamber 126 of the reload segment 122 is blocked or intruded upon by the pivot mechanism 124 by which the reload segment 122 is attached to the base plate 116, so as to allow a nail 10 that is fed into the reload chamber 126 from the nail feed fitting 128 to freely move along the entire length of the reload chamber 126 in an unobstructed manner. The reload chamber 126 extends substantially an entire length of the reload segment 122 and has, as shown in FIG. 5, a shape that is substantially similar to that of a hollow cylinder.

Figure 7A:
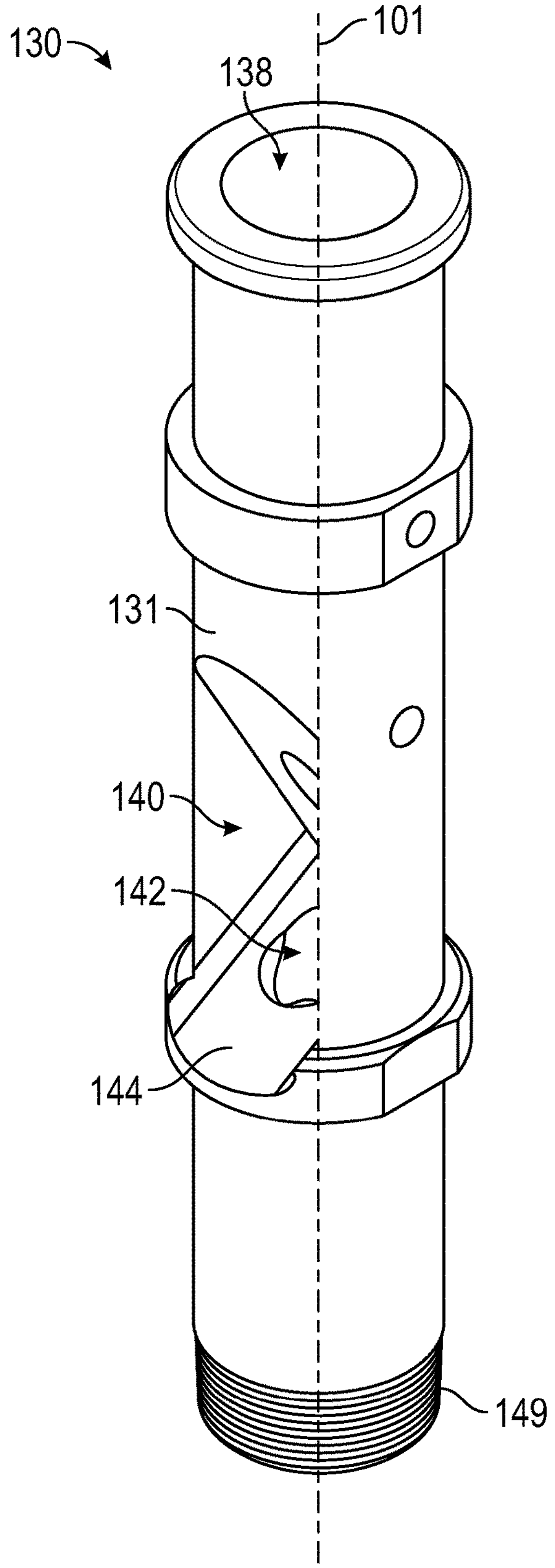
FIGS. 7A-7C show various aspects of an example embodiment of a drive segment of the feed head assembly shown in FIGS. 1-5.
Figure 7B:
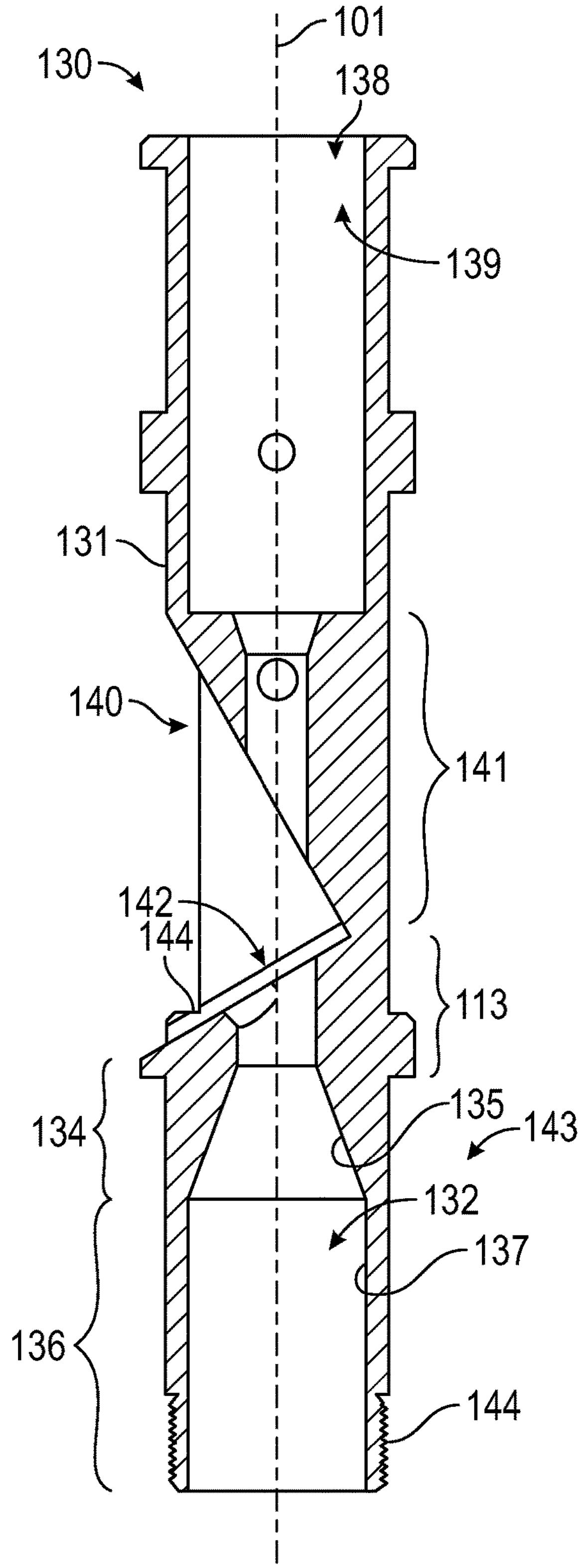
Figure 7C:
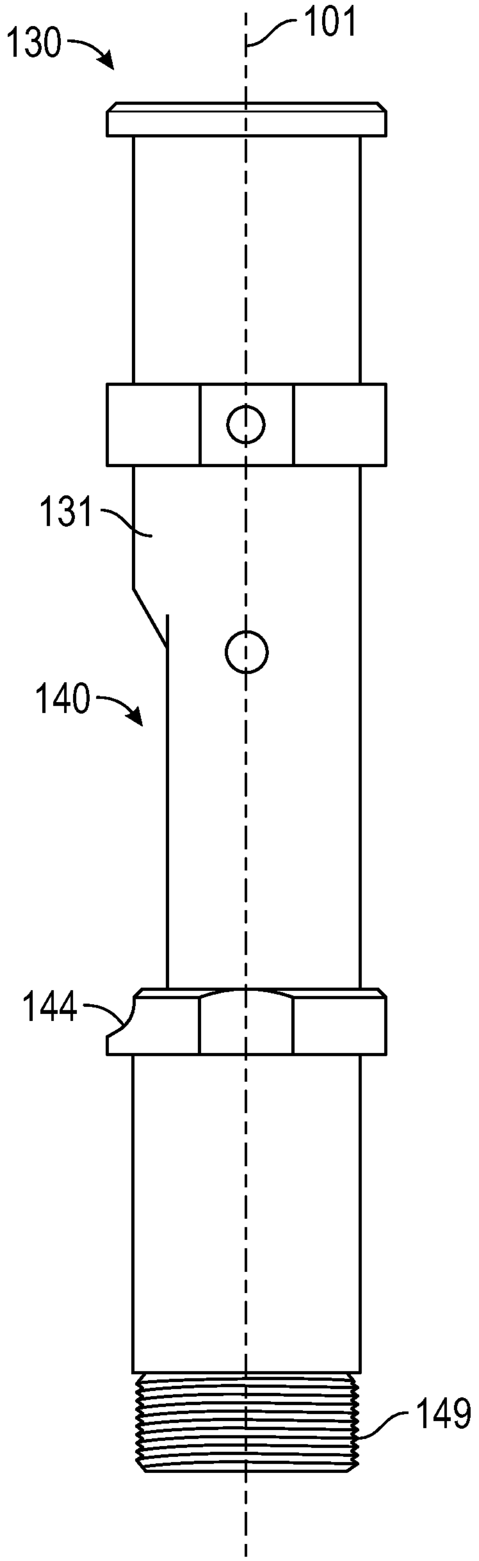

The feed head assembly 106 further comprises a drive segment 130 that is attached to the base plate 116 and extends away from the base plate 116 in a direction opposite the drive assembly 102. Example aspects of the drive segment 130 are shown in the illustration of FIGS. 7A-7C for the example embodiment of the feed head assembly 106 and the nail gun 100 disclosed herein. The drive segment 130 comprises a drive chamber 132 that is formed internal to the drive segment 130. Each nail 10 is thus sequentially and individually dispensed (e.g., directly) from the reload chamber 126 of the reload segment 122 into the drive chamber 132 of the drive segment 130. The drive chamber 132 comprises, at an upper end thereof, an inlet region 134 defined by a drive chamber inlet surface 135 that has a frustoconical shape (or tapered), and a primary region 136 defined by a primary region inner wall 137 that has a generally cylindrical shape. Due to the frustoconical shape of the drive chamber inlet surface 135, the drive chamber 132 is configured to receive from the reload chamber 126 a nail 10 therein, with the tip 11 (FIGS. 9A to 9L) of the nail 10 generally not directly contacting the drive chamber inlet surface 135 during transfer of the nail 10 from the reload chamber 126 into the drive chamber 132. The drive chamber 132 advantageously can have a length that is less than a length of the nail 10 being deposited therein.

The drive segment 130 comprises, directly connected to the drive chamber inlet surface 135, a hammer rod passage 138. The hammer rod passage 138 is a hollow region that has a generally cylindrical shape and that extends from the inlet region 134 of the drive chamber 132 entirely to an opposite end of the drive chamber 132. The hammer rod passage 138 has a diameter that is greater than a diameter of the hammer rod 114 of the hammer 104. The hammer rod passage 138 is oriented substantially parallel with the longitudinal axis 101 of the nail gun 100 and/or of the drive segment 130. In the example embodiment shown, the hammer rod passage 138 is substantially coaxial with the longitudinal axis 101 of the nail gun 100 and/or of the drive segment 130. To accommodate a bushing 117 (e.g., a hardened bushing) inserted within the base plate 116 to prevent direct contact between the hammer rod 114 and the base plate 116, a bushing section 139 of the hammer rod passage 138 adjacent to the base plate 116 may have a diameter that is larger than the diameter of the portion of the hammer rod passage 138 adjacent to the inlet region 134 of the drive chamber 132.

Figure 5:
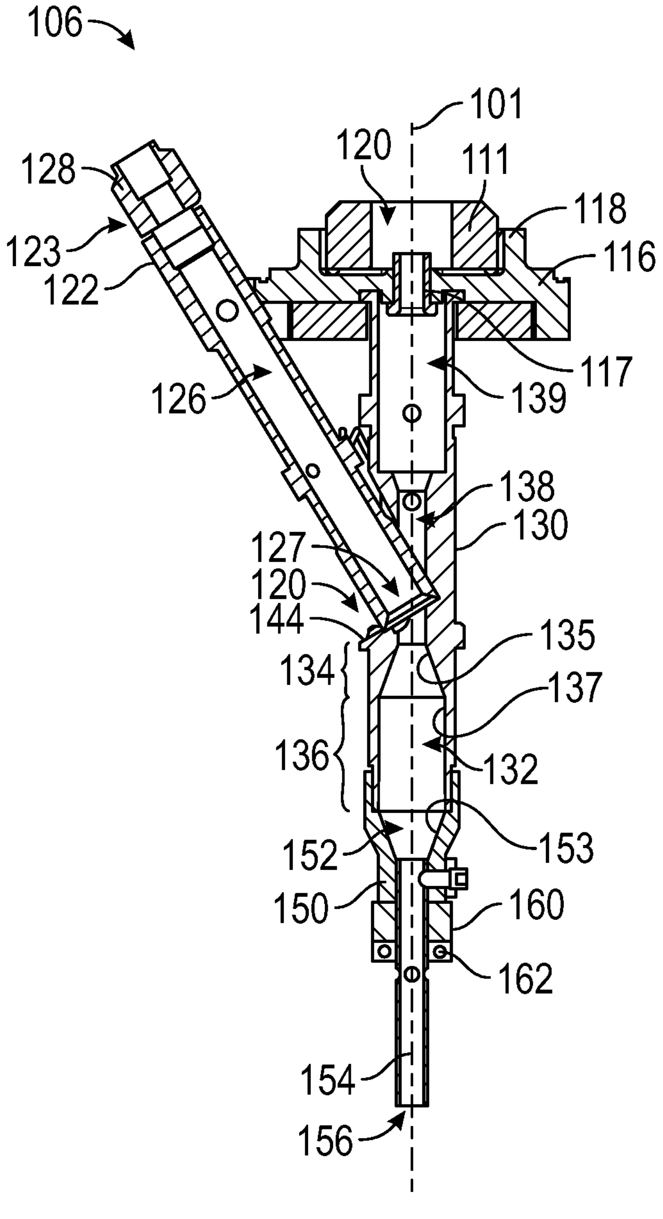
FIG. 5 is a cross-sectional view of the feed head assembly shown in FIG. 4, along the cut-line 5-5.

The inlet region 134 of the drive chamber 132, the primary region 136 of the drive chamber 132, and the hammer rod passage 138 are substantially parallel to each other and, as shown in FIG. 5, are coaxial with each other. Thus, the drive segment 130 defines a continuous and uninterrupted passage through an entire length of the drive segment 130.

The drive segment 130 also comprises a notch 140 that is formed on an exterior surface 131 of the drive segment 130 and extends radially inwardly by a sufficient distance to form a nail reload passage 142 that allows a nail 10 to be deposited within the drive chamber 132 from the reload segment 122. In the example embodiment shown, the notch 140 is formed along the length of the drive segment 130 to form the nail reload passage 142 coincident with the hammer rod passage 138. The notch 140 generally has a shape of a right angle, as shown in the cross-sectional view of FIG. 5. In forming the notch 140, a stop plate 144 is also formed, which is directly adjacent to the nail reload passage 142. The stop plate 144 is inclined with respect to the longitudinal axis 101 and is substantially parallel to an end of the reload segment 122 that dispenses the nails 10 into the drive segment 130 via the nail reload passage 142.

The hammer rod passage 138 has an upper section 141 that is above the notch 140 and a lower section 143 that is below the notch 140 in FIGS. 5 and 7B. A diameter of the portion (e.g., the lower section 143) of the hammer rod passage 138 that is below the notch 140 (e.g., so as to be directly adjacent to the drive chamber 132) may be larger than a diameter of the portion (e.g., the upper section 141) of the hammer rod passage 138 that is above (e.g., directly on the opposite side of the notch 140 from the portion of the hammer rod passage 138 that is directly adjacent to the drive chamber 132) the notch 140. This is advantageous because the change in diameter will allow for any radial deflections and/or eccentric movements of the hammer rod 114 within the radially unbounded region of the hammer rod passage 138 within the notch 140 to occur without the hammer rod 114 striking a sidewall of the portion of the hammer rod passage 138 that is directly adjacent to the drive chamber 132, thereby reducing noise during operation, as well as reducing maintenance of the nail gun 100 from errant impacts of the striker end, also referred to as an impact end 113, of the hammer rod 114 against, for example, the edge of the side wall of the hammer rod passage 138 that is coincident with the radially inner portion of the stop plate 144 (e.g., the edge where the stop plate 144 ends and the nail reload passage 142 begins).

As will be further described elsewhere herein, the nail 10 is dispensed into the reload chamber 126 when the reload segment 122 pivots into a blocked position in which the reload chamber outlet 127 of the reload chamber 126 is substantially blocked by the stop plate 144, thereby preventing the nail 10 from exiting the reload chamber 126. In this position, the nail 10 rests against the stop plate 144 and, as the reload segment 122 pivots away from the blocked position and towards a reload position, the tip 11 of the nail 10 drags along the stop plate 144 until the end (e.g., the reload chamber outlet 127) of the reload chamber 126 is sufficiently aligned with the nail reload passage 142 for the nail 10 to fall (e.g., as caused by the force of gravity) through the nail reload passage 142 and into the drive chamber 132. In the example embodiment shown, the notch 140 extends entirely through the hammer rod passage 138 and into an opposite sidewall of the drive segment 130 that defines the hammer rod passage 138. As shown in FIGS. 7A-7C, the notch 140 can have, in some embodiments, a shape that is a negative space of the end of the reload segment 122, so that the reload segment 122 will nest within the notch 140 when in the reload position.

Figure 8A:
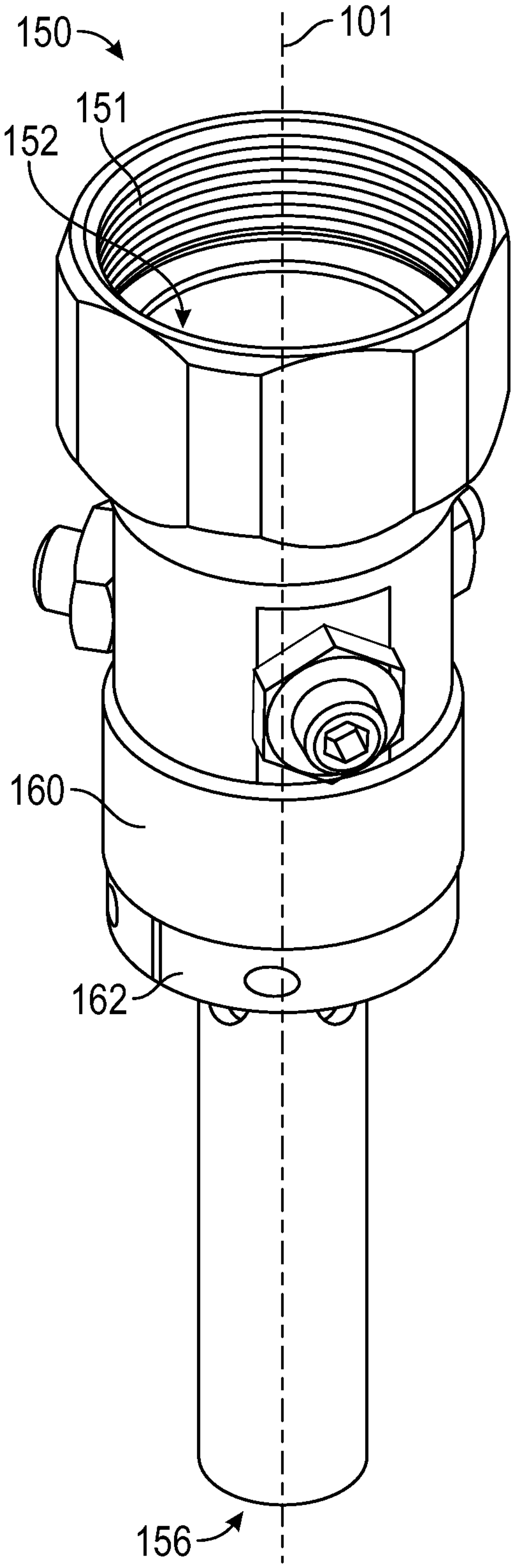
FIGS. 8A-8C show various aspects of an example embodiment of an output segment of the feed head assembly shown in FIGS. 1-5.
Figure 8B:
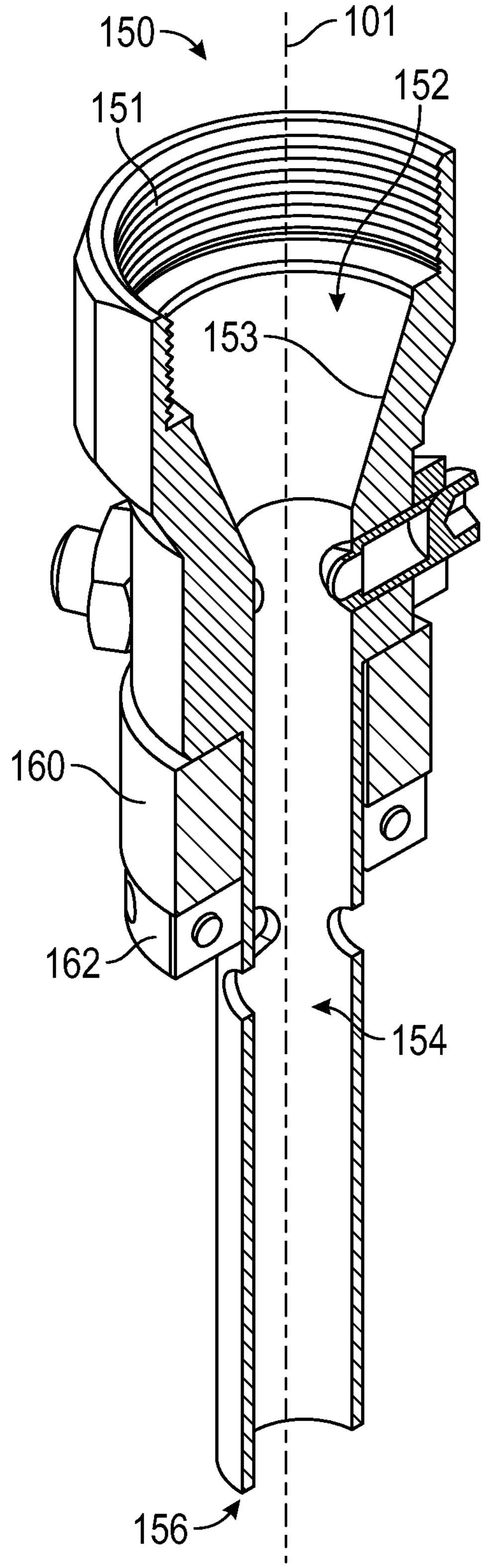
Figure 8C:
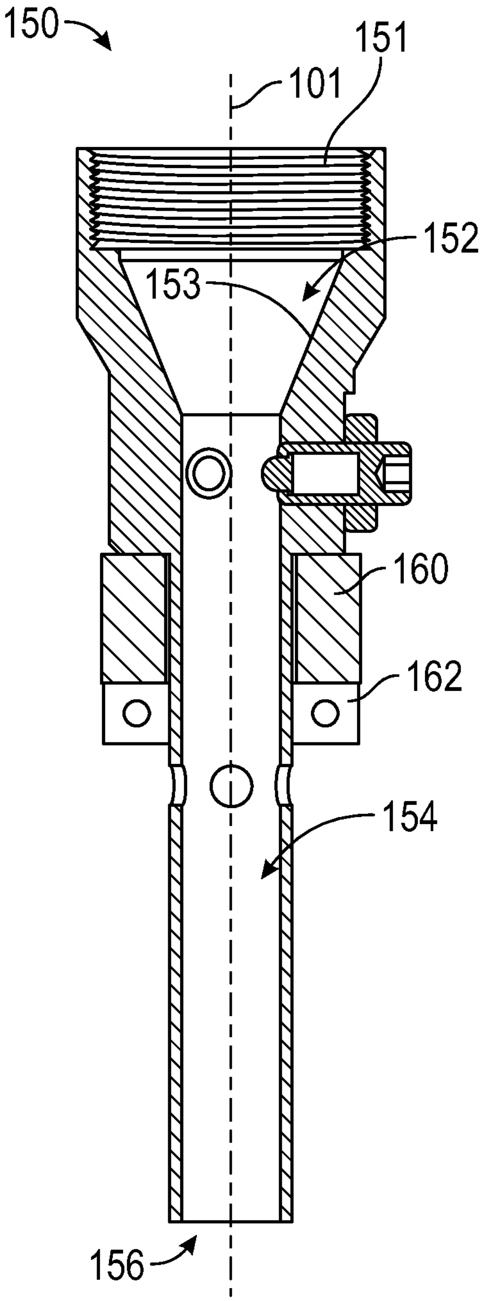

The feed head assembly 106 also comprises, attached (e.g., at a threaded connection via drive segment threads 149) at an end of the drive segment 130 where the primary region 136 of the drive chamber 132 is located, an output segment 150, example aspects of which are shown in the illustration of FIGS. 8A-8C for the example embodiment of the feed head assembly 106 and the nail gun 100 disclosed herein. In the example embodiment disclosed herein, the output segment 150 is attached to the drive segment 130 via a threaded connection with output segment threads 151 mating with the drive segment threads 149. The output segment 150 comprises, formed internal thereto and at an end of the output segment 150 where the output segment 150 is attached to the drive segment 130, an output chamber inlet 152. The output chamber inlet 152 has a generally frustoconical shape, such that a widest portion thereof is provided immediately adjacent to the drive chamber 132 and a diameter of the output chamber inlet 152 decreases (e.g., in a tapered manner) as a distance away from the drive chamber 132 increases.

The frustoconical shape of the output chamber inlet 152 is defined by an output chamber inlet surface 153, which is inclined with respect to the longitudinal axis 101 of the feed head assembly 106. In the example embodiment disclosed herein, a direction of the angle of inclination of the output chamber inlet 152 is opposite to the direction of the angle of inclination of the inlet region 134 of the drive chamber 132. In some embodiments, the volume and the shape of the inlet region 134 of the drive chamber 132 may be substantially similar to the volume and the shape of the output chamber inlet 152.

The output segment 150 also comprises, directly adjacent to the output chamber inlet 152 and in the manner of an extension of the output chamber inlet 152, an output chamber 154. The output chamber 154 extends from the end of the output chamber inlet 152 along substantially an entirety of the remaining length of the output segment 150, terminating at a nail output end, also referred to as a nail outlet 156 of the output segment 150. The output chamber 154 and the output chamber inlet 152 are substantially parallel to each other and, as shown in FIG. 5, coaxial with each other. Thus, the output segment 150 defines a continuous and uninterrupted passage through an entire length of the output segment 150. As such, when the output segment 150 is connected to the drive segment 130 and the drive segment 130 is connected to the base plate 116, a continuous and uninterrupted passage is formed along an entire length of the nail feed assembly (e.g., the feed head assembly 106), this passage being substantially linear, parallel to the longitudinal axis 101 of the feed head assembly 106 and/or of the nail gun 100. Each nail 10, once introduced into the drive chamber 132 via the nail reload passage 142, is thus directed by virtue of the respective surfaces of the drive chamber 132 (e.g., the primary region inner wall 137) and the output chamber inlet 152 (e.g., the output chamber inlet surface 153), into the output chamber 154, where the tip 11 of the nail 10 rests against a substrate or a structure (e.g., a workpiece) until driven into and through, at least partially, such substrate or structure when the head 12 of the nail 10 is struck by the impact end 113 of the hammer rod 114.

The hammer rod 114 is thus a generally linear-extending structure that can be moved through the various structures of the feed head assembly 106 during an impact stroke. The impact stroke is defined as comprising a generally downward movement, or downstroke, of the hammer rod 114 followed by a generally upward movement, or upstroke, of the hammer rod 114. The hammer rod 114 is thus at least partially confined in a mobile manner within the drive segment 130 and the output segment 150. The impact end 113 of the hammer rod 114 is the end of the hammer rod 114 opposite where the hammer rod 114 is attached to the hammer head 112. Linear movement of the hammer head 112 within the cylinder of the drive motor 108 thus causes a corresponding and substantially identical movement of the impact end 113 of the hammer rod 114 within the drive segment 130 and the output segment 150. The impact end 113 of the hammer rod 114 and, optionally, the entirety of the hammer rod 114 is made of a hardened material, having a hardness that is greater than or the same as the hardness of the nails 10 and/or the outer surface of the reload segment 122 to prevent excess wear on the reload segment 122.

The pivot mechanism 124 of the feed head assembly 106 also comprises a biasing spring 125 that is attached to the reload segment 122. In the example embodiment shown, the biasing spring 125 is shown being attached between the reload segment 122 and the base plate 116. In some embodiments, however, the biasing spring 125 can be attached between the reload segment 122 and the drive segment 130. The biasing spring 125 is an elastic member (e.g., a coil spring) that is configured to exert a biasing force on the reload segment 122 in the direction of the drive segment 130. Thus, the biasing force acts on the reload segment 122 to move (e.g., to pivot), once the impact end 113 of the hammer rod 114 has been retracted into the hammer rod passage 138 and beyond the notch 140, the reload segment 122 from the blocked position into the reload position and, similarly, to resist movement of the reload segment 122 out of the reload position. It should be noted, however, that when the hammer rod 114 contacts the outer surface of the reload segment 122 within the notch 140 during a downstroke of the hammer rod 114, the biasing force exerted on the reload segment 122 is overcome and the reload segment 122 is moved by the linear movement of the hammer rod 114 through the notch 140 from the reload position into the blocked position. However, the biasing force holds the end (e.g., the reload chamber outlet 127) of the reload segment 122 against the hammer rod 114 substantially continuously while the reload segment 122 is in the blocked position, so that the reload segment 122 moves immediately from the blocked position towards the reload position simultaneous with the withdrawal of the impact end 113 of the hammer rod 114 through the notch 140. This is further illustrated in FIGS. 9A to 9L discussed below.

At the beginning of the downstroke, the impact end 113 of the hammer rod 114 is contained within the hammer rod passage 138 of the drive segment 130, between the notch 140 and where the drive segment 130 is attached to the base plate 116. During the downstroke, the hammer rod 114 travels (down, in the view shown in FIG. 5) along the length of the hammer rod passage 138 until the impact end 113 of the hammer rod 114 contacts the outer surface of the reload segment 122 and enters the notch 140, which happens substantially simultaneously. The hammer rod 114 continues to move through the notch 140, causing a pivoting movement of the reload segment 122 about a point where the reload segment 122 is attached to the base plate 116 (e.g., within the mounting bracket 121), pushing the reload segment 122 in a direction out of the notch 140, so that the end (e.g., the reload chamber outlet 127) of the reload segment 122 opposite the nail feed fitting 128 is facing directly against the stop plate 144. During this pivoting movement of the reload segment 122, the impact end 113 of the hammer rod 114 slides along the outer surface of the reload segment 122. While the reload segment 122 is in the blocked position, a nail 10 is fed (e.g., by a flow of air) from a nail supply into the reload chamber 126 via the nail feed fitting 128, the nail 10 coming to rest (e.g., due to the force of gravity) within the reload chamber 126, with the tip 11 of the nail 10 resting against the stop plate 144.

Once the impact end 113 of the hammer rod 114 has fully displaced the reload segment 122 from the reload position and into the blocked position, the hammer rod 114 continues moving into the drive chamber 132 and then into the output chamber inlet 152 and the output chamber 154, until direct contact is made between the impact end 113 of the hammer rod 114 and the head 12 of the nail 10. The hammer rod 114 continues moving in the same direction, forcing the nail 10 out of the nail output end (e.g., the nail outlet 156) of the output segment 150 and driving the nail 10 into the surface, substrate, structure, etc., against which the tip 11 of the nail 10 had been resting before being contacted by the hammer rod 114. The hammer rod 114 moves a prescribed distance to fully eject the nail 10 from the nail outlet 156. In some embodiments, the impact end 113 of the hammer rod 114 may move so far as to be adjacent to, coplanar with, or extending beyond, the nail outlet 156 of the output segment 150.

The hammer rod 114 then begins the upstroke movement, in which the hammer rod 114 is retracted to the initial position, from which the downstroke motion was initiated. Thus, the hammer rod 114 moves such that the impact end 113 travels through and exits the output chamber 154, the output chamber inlet 152, and the drive chamber 132. After exiting the drive chamber 132, the impact end 113 of the hammer rod 114 continues moving through the hammer rod passage 138. When the impact end 113 of the hammer rod 114 passes into the notch 140, the biasing force of the biasing spring 125 causes the reload segment 122 to automatically pivot out of the blocked position and towards the reload position. This pivoting movement of the reload segment 122 occurs automatically, proportionally, and simultaneously with the retraction of the hammer rod 114 through the notch 140 and towards the upper section 141 of the hammer rod passage 138. As the reload segment 122 pivots towards the reload position, the nail 10 contained within the reload chamber 126 is also pivoted, the tip 11 of the nail 10 sliding along the stop plate 144 until the tip 11 of the nail 10 moves beyond the edge of the stop plate 144 to where the nail reload passage 142 is formed, at which point the nail 10 falls (e.g., under the force of gravity) through the nail reload passage 142 and into the drive chamber 132, then into the output chamber inlet 152 and, ultimately, into the output chamber 154. The hammer rod 114 continues moving in the upstroke direction until at least there is no direct contact between the hammer 104 (e.g., at the impact end 113 of the hammer rod 114) and the reload segment 122. At this point, the impact stroke repeats to drive another nail 10 into a suitable surface, substrate, structure, etc.

In order to encourage the nail 10 to move downward, towards the output chamber 154, and to prevent a nail 10 from becoming jammed within the drive chamber 132, a magnet 160 is provided around the output segment 150, below the output chamber inlet 152 and circumferentially around a portion of an outer wall of the output segment 150 that defines the output chamber 154. The magnet 160 can be, for example, a rare earth magnet or other magnet that can provide a suitably strong magnetic field to aid in preventing nails 10 from becoming lodged and/or jammed within the drive chamber 132. In some embodiments, the magnet 160 could be an electromagnet. As shown in FIGS. 8A to 8C, the magnet 160 is secured about a perimeter of the output segment 150 by a locking collar 162, which can be frictionally or otherwise secured around the outer surface of the output segment 150. In some embodiments, the magnetic force is of a sufficient strength to retain the nail 10 within the output chamber 154 without the need for mechanical retention of the nail 10 therein, advantageously allowing for a nail 10 to be loaded within the output chamber 154 while there is no surface, substrate, structure, etc. present that would otherwise prevent the nail 10 from falling out of the output chamber 154 without being driven out by contact with the impact end 113 of the hammer rod 114.

FIGS. 9A to 9L show the arrangement of various structural elements and of the nail 10 during an impact stroke.

Figure 9C:
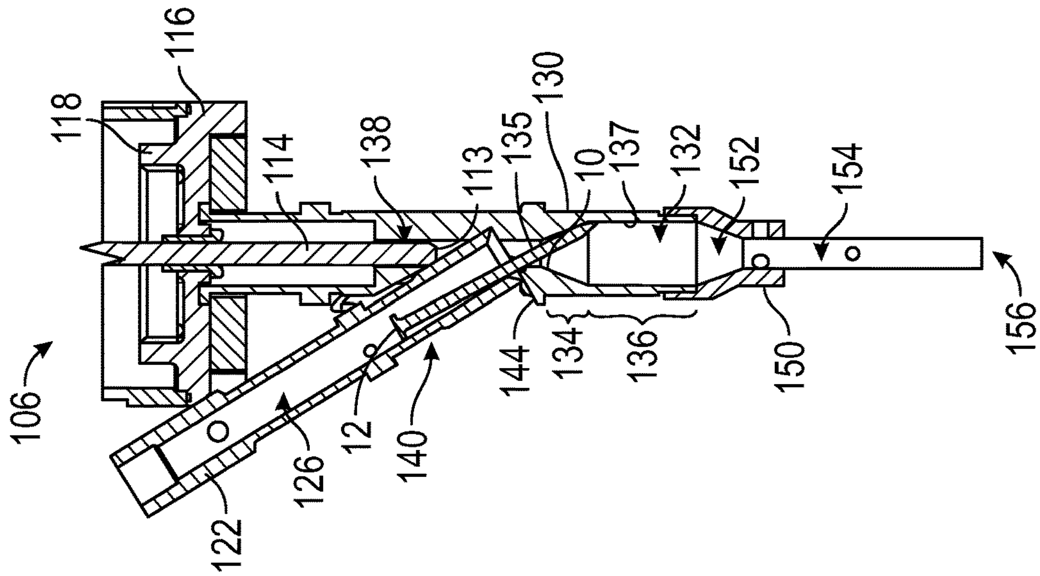
FIGS. 9A-9L are respective cross-sectional views of the feed head assembly, in which stages of operation of the nail gun shown in FIG. 1 are illustrated sequentially therein.
Figure 9B:
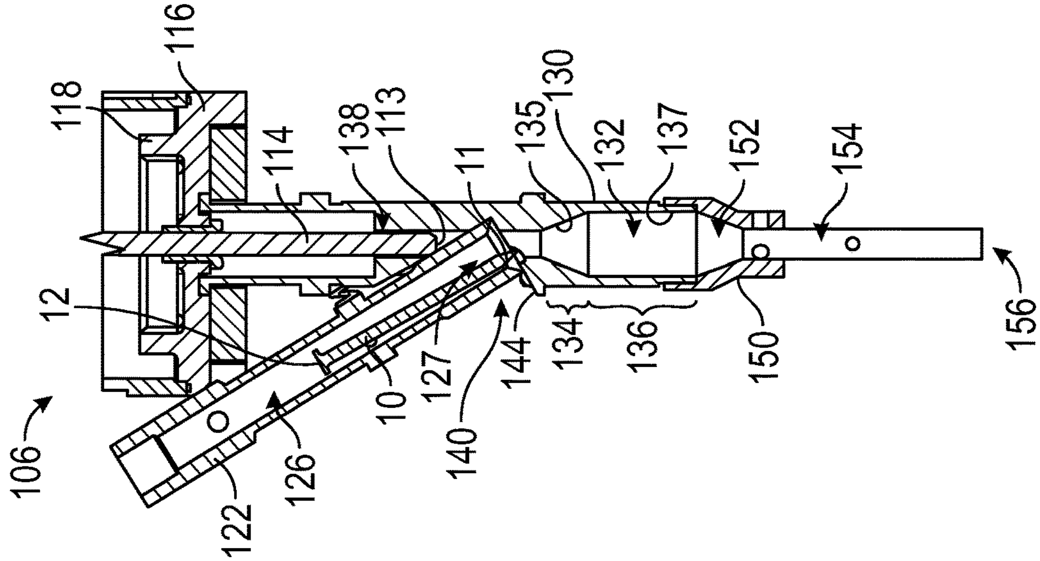
Figure 9A:
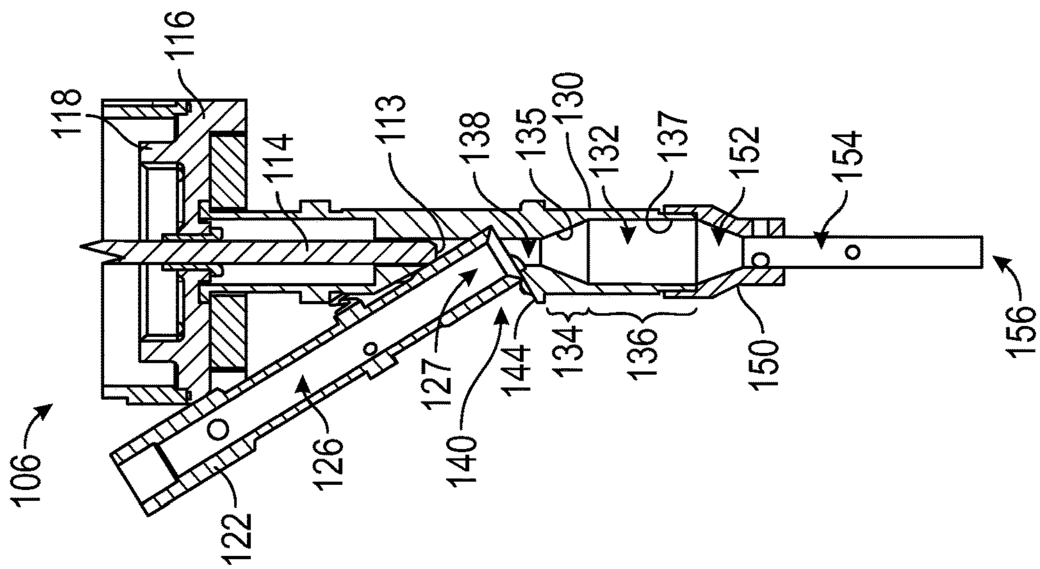

In FIG. 9A, the feed head assembly 106 is empty (e.g., does not contain a nail therein). This can happen, for example, when the nail gun 100 is being moved between workpieces since the nails are not mechanically retained within the nail output, when the nail gun is being restarted, when nonferrous nails are being used, or for any other reason. The impact end 113 of the hammer rod 114 is positioned entirely within the hammer rod passage 138, vertically above (e.g., on the same side as the base plate 116) the notch 140.

In FIG. 9B, a single nail 10 (e.g., a first nail 10) has been introduced into the reload chamber 126, which is in the reload position, and the tip 11 of the nail 10 has passed through the nail reload passage 142 formed at the notch 140. The hammer rod 114 has not moved from the position shown in FIG. 9A.

In FIG. 9C, the tip 11 of the nail 10 has contacted the inner side wall (e.g., primary region inner wall 137) of the primary region 136 of the drive chamber 132 but remains at least partially within the reload chamber 126. As shown, the tapered or inclined surface (e.g., the drive chamber inlet surface 135) of the inlet region 134 of the drive chamber 132 allows for the nail 10 to slide out of the reload chamber 126 and into the drive chamber 132 without becoming stuck or lodged within the drive chamber 132 before reaching the primary region 136 (e.g., having a cylindrical shape) thereof. The hammer rod 114 has not moved from the position shown in FIG. 9B.

Figure 9F:
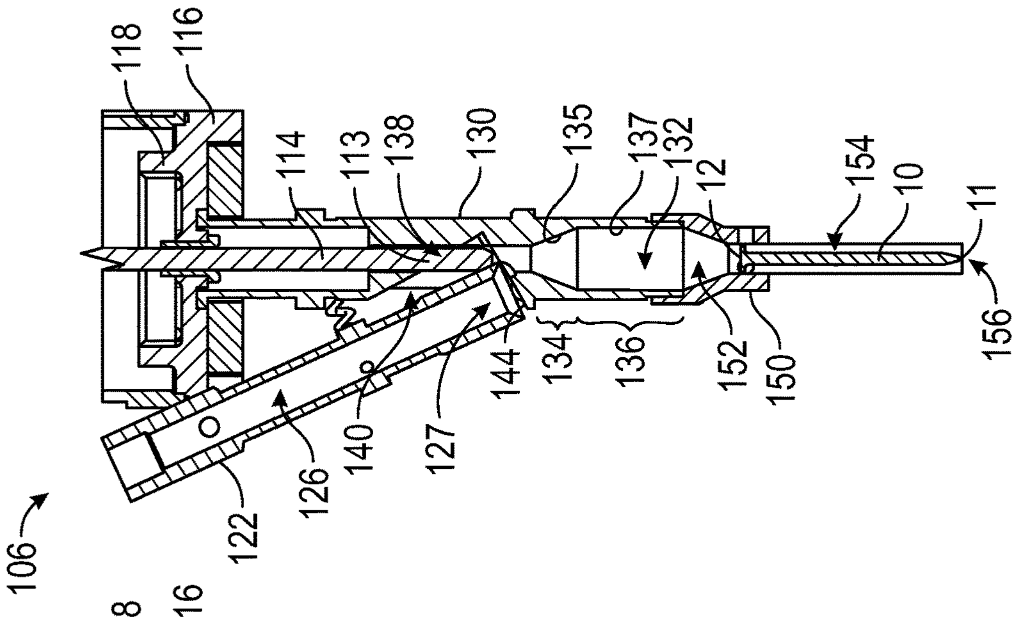
Figure 9E:
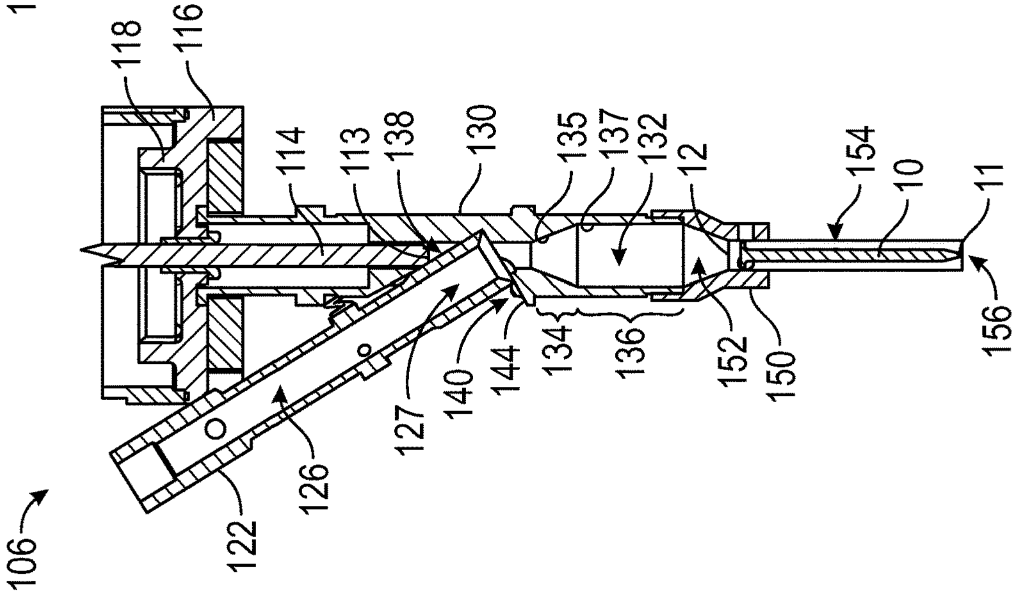
Figure 9D:
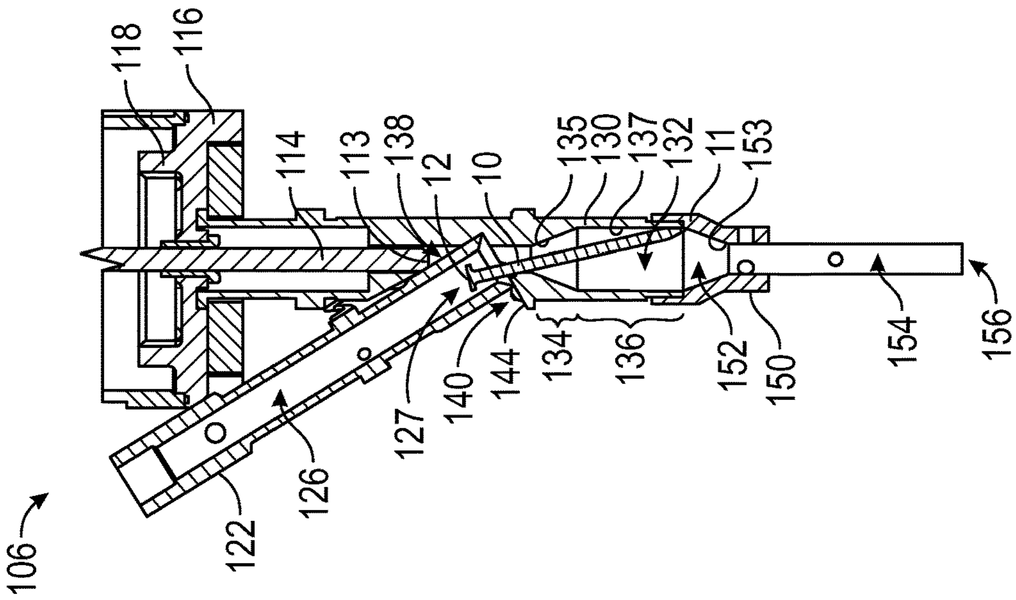

In FIG. 9D, the tip 11 of the nail 10 has slipped down the inner side wall (e.g., the primary region inner wall 137) of the primary region 136 of the drive chamber 132 and is about the enter into the output chamber inlet 152 of the output segment 150. The nail 10 is shown having rotated in the clockwise direction from the orientation shown in FIG. 9C as the nail 10 progressively moves further into the drive chamber 132 and out of the reload chamber 126. The hammer rod 114 has not moved from the position shown in FIG. 9C.

In FIG. 9E, the nail 10 has moved to be positioned entirely within the output chamber 154 of the output segment 150. In reaching the position shown in FIG. 9E from the position shown in FIG. 9D, the tip 11 of the nail 10 slides along the output chamber inlet surface 153 and the nail 10 simultaneously rotates in the clockwise direction from the orientation shown in FIG. 9D as the nail 10 progressively moves further into the output segment 150, out of the reload segment 122, and, ultimately, out of the drive segment 130. The nail 10 can be held within the output chamber 154 in the position shown in FIG. 9E via a magnetic field generated by the magnet 160 (see, e.g., FIGS. 1-5). The hammer rod 114 has not moved from the position shown in FIG. 9D. Once the nail 10 is in the position shown in FIG. 9E, the impact stroke of the hammer 104 can begin.

In FIG. 9F, the hammer rod 114 has moved into the notch 140 and has slid against the outer surface of the reload segment 122 to cause a pivoting movement of the reload segment 122 from the reload position, shown in FIGS. 9A-9E, in the direction of the blocked position. In FIG. 9F, the reload segment 122 is in an intermediate position, between the reload position and the blocked position. The biasing force applied by the biasing spring 125 increases progressively as the reload segment 122 is pivotably displaced from the reload position.

Figure 9I:
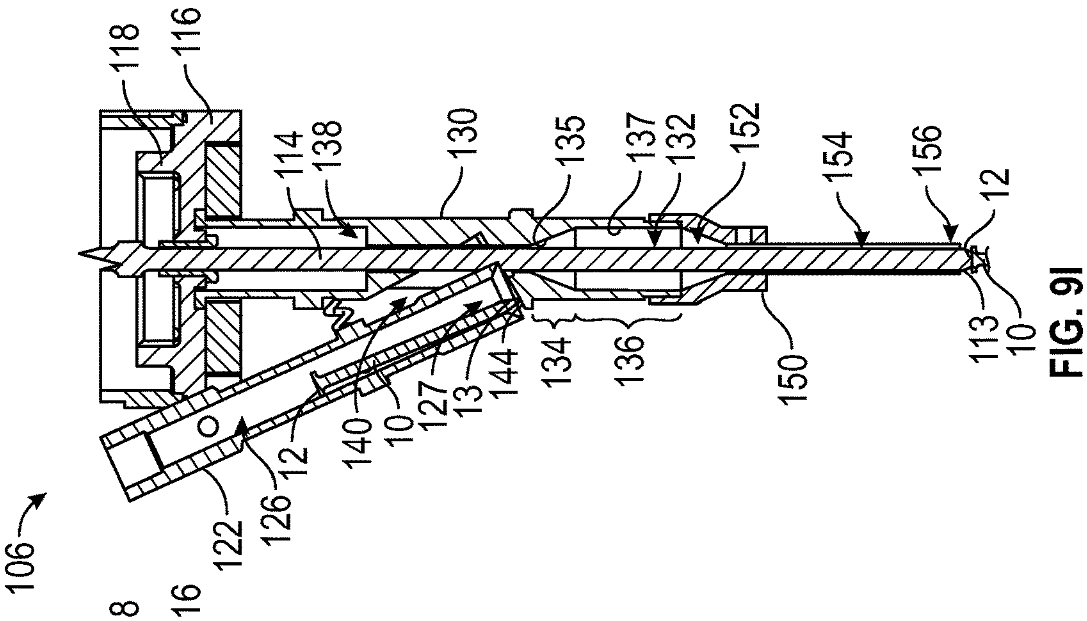
Figure 9H:
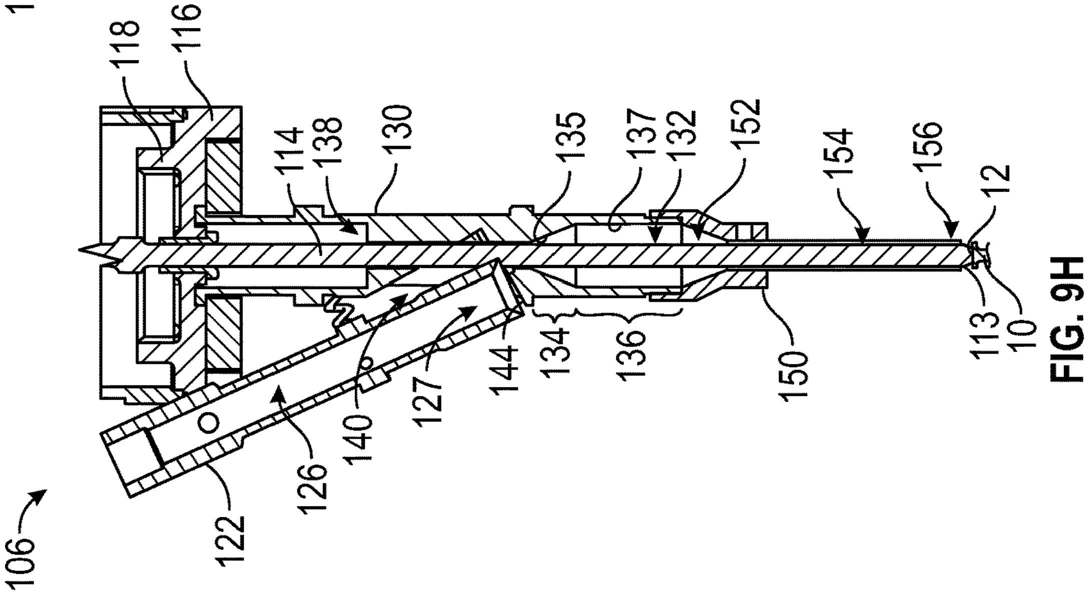
Figure 9G:
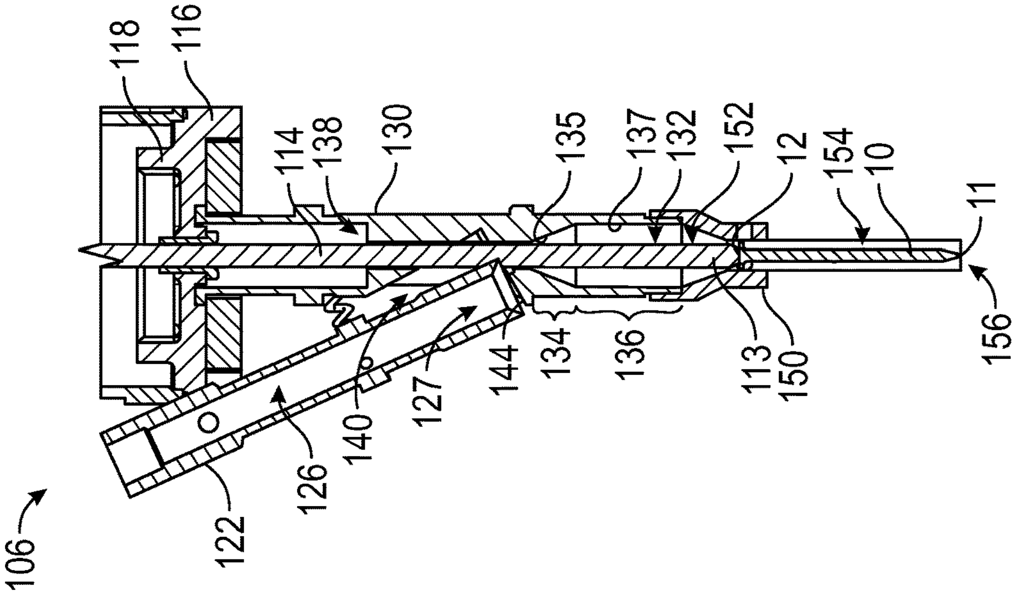

In FIG. 9G, the hammer rod 114 has moved such that the impact end 113 of the hammer rod 114 has exited the notch 140, moved entirely through the drive chamber 132, and is in an impact position, defined as being adjacent to the head 12 of the nail 10 within the output chamber 154. FIG. 9G shows the reload segment 122 in the blocked position, in which the reload chamber outlet 127 of the reload segment 122 is facing against the stop plate 144 and is directly blocked by the stop plate 144. The reload segment 122 will remain in this blocked position until the impact end 113 of the hammer rod 114 moves back through the notch 140 during the upstroke movement.

In FIG. 9H, the hammer rod 114 has moved such that the impact end 113 has extended so far as to protrude (e.g., extend beyond) the nail outlet 156 of the output segment 150, thereby fully driving the nail 10 out of the output segment 150 and into the surface, substrate, structure, etc. positioned at the nail outlet 156 of the output segment 150. The position of the hammer rod 114 shown in FIG. 9H is the end of the downstroke motion and the position from which the upstroke motion begins.

During the time of FIGS. 9G and 9H, a signal is transmitted to a nail supply and a further nail 10 (e.g., a second nail 10) is transmitted from the nail supply into the reload chamber 126 of the reload segment 122. This second nail 10 is shown in FIG. 9I being contained within the reload chamber 126, with the tip 11 of the second nail 10 resting against (e.g., directly against) the stop plate 144 while the reload segment 122 is in the blocked position. From the position shown in FIG. 9I, the upstroke motion of the hammer 104 can begin. In some embodiments, the upstroke motion of the hammer 104 can begin before the second nail 10 has entered the reload chamber 126. In such an embodiment, the second nail 10 may be dispensed into the reload chamber 126 at any time after the reload segment 122 has pivoted into the blocked position or even, in some instances, after the reload segment 122 has pivoted back into the reload position. It is advantageous for the second nail 10 to already be in the position shown in FIG. 9I, however, before the reload segment 122 moves fully back into the reload position so that the nail gun 100 can achieve a higher throughput of nails.

Figure 9L:
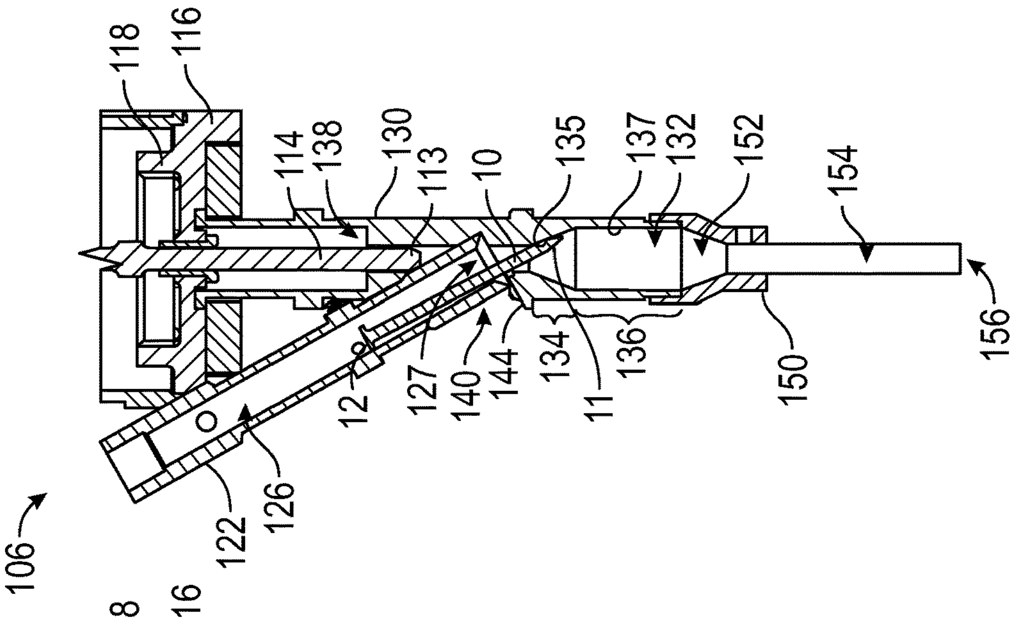
Figure 9K:
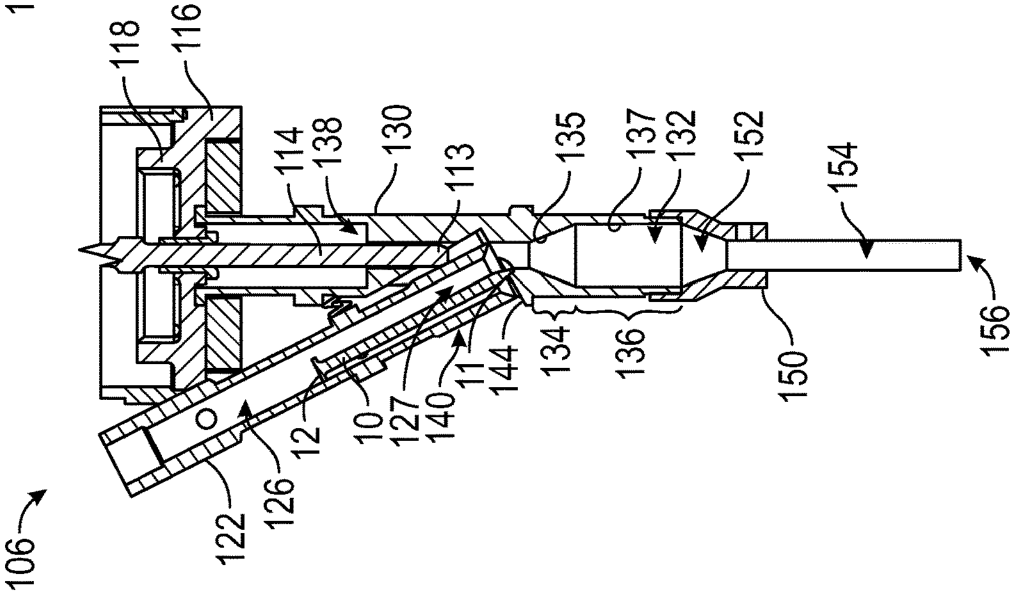
Figure 9J:
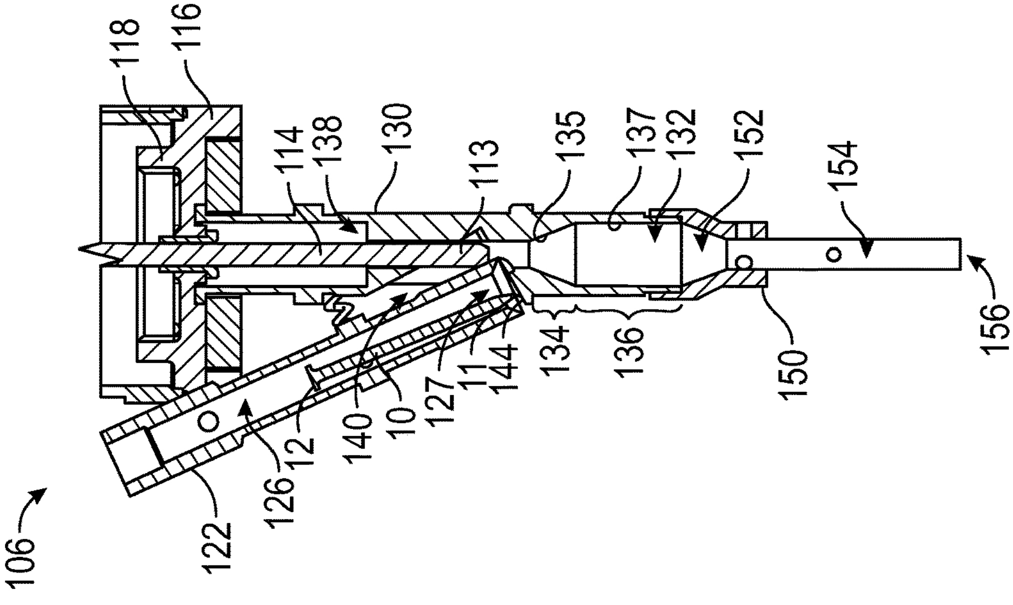

In FIG. 9J, the upstroke motion of the hammer 104 has progressed such that the impact end 113 of the hammer rod 114 is within the notch 140, such that the reload segment 122 begins, due to the biasing force of the biasing spring 125 acting on the reload segment 122, to move from the blocked position into the reload position. Since the tip 11 of the second nail 10 rests against the stop plate 144 while the second nail 10 is held within the reload chamber 126 during or before the upstroke motion of the hammer 104, the tip 11 of the second nail 10 slides along the stop plate 144 while the reload segment 122 pivots from the blocked position towards the reload position.

In FIG. 9K, the hammer 104 has continued its upstroke motion from the position shown in FIG. 9J, but the impact end 113 of the hammer rod 114 remains protruding into the notch 140 from the upper section 141 of the hammer rod passage 138. Thus, the reload segment 122 is in an intermediate position, between the blocked position and the reload position. However, as shown in FIG. 9K, the reload chamber 126 and the reload segment 122 can be designed such that the tip 11 of the second nail 10 can slide off of the stop plate 144 and through the nail reload passage 142 before the reload segment 122 has moved fully into the reload position, as shown in FIG. 9K. This arrangement can allow for higher throughput for the nail gun 100 and, furthermore, the vibration of the reload segment 122 as it moves into the reload position, during which time the reload segment 122 directly contacts the drive segment 130, can cause vibrations that are transmitted to the second nail 10, which can also advantageously agitate the second nail 10 and aid in preventing the second nail 10 from becoming lodged and/or stuck within any of the reload segment 122, the drive segment 130, and/or the output segment 150.

In FIG. 9L, the hammer 104 has continued its upstroke motion from the position shown in FIG. 9K and the impact end 113 of the hammer rod 114 has been fully retracted from the notch 140, such that the reload segment 122 is now in the reload position, in which the reload chamber outlet 127 of the reload chamber 126 is aligned with the nail reload passage 142 defined within the notch 140 by the stop plate 144. Thus, the upstroke motion of the hammer 104 has been completed in the position shown in FIG. 9L and the components of the nail gun 100 are substantially similar in FIG. 9L as were shown and described in FIG. 9C. As such, from FIG. 9L, the nail gun 100 repeats the steps shown in FIGS. 9C-9L for each nail 10 dispensed or driven out of the nail gun 100 and the hammer 104 is configured, once the second nail 10 is within the output chamber 154, to begin another impact stroke.

During the entire impact stroke, the hammer 104 movement along the cylinder of the drive motor 108 and of the hammer rod 114 along and through the drive segment 130 and the output segment 150 comprises or consists of a linear movement. Stated somewhat differently, the movement of the hammer 104 is only linear, with no rotary motion being imparted to the nail 10 by the hammer 104 or any part of the hammer 104.

Figure 10:
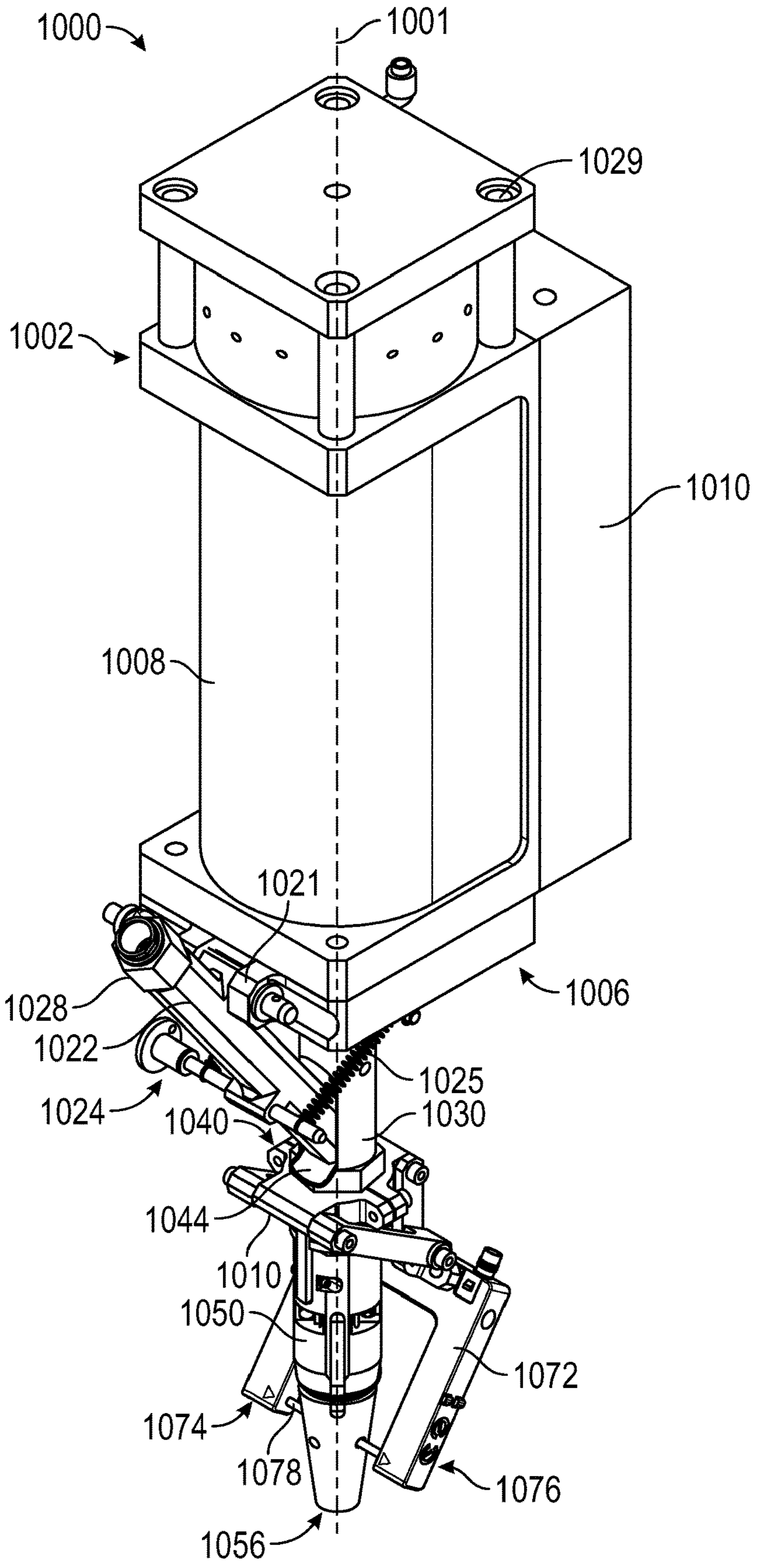
FIG. 10 is an isometric view of another example embodiment of nail gun having a feed head assembly.

FIGS. 10 to 15C show various aspects of the structure, assembly, functionality, and operation of a nail gun 1000, according to another embodiment. FIGS. 12A to 15C show various aspects of another example embodiment of a feed head assembly 1006 for use in the nail gun 1000 that is generally similar to that which is shown in FIG. 1. Unless described otherwise herein, the components of the nail gun 1000 and the method of operation of the nail gun 1000 shown in FIG. 10 is substantially similar to the nail gun 100 shown in FIG. 1. Similar reference numerals will be used for components of the nail gun 1000 that are the same as or similar to the components of the nail gun 100, discussed above. The description of these components above also applies to this embodiment, and a detailed description of these components is omitted here.

Figure 11A:
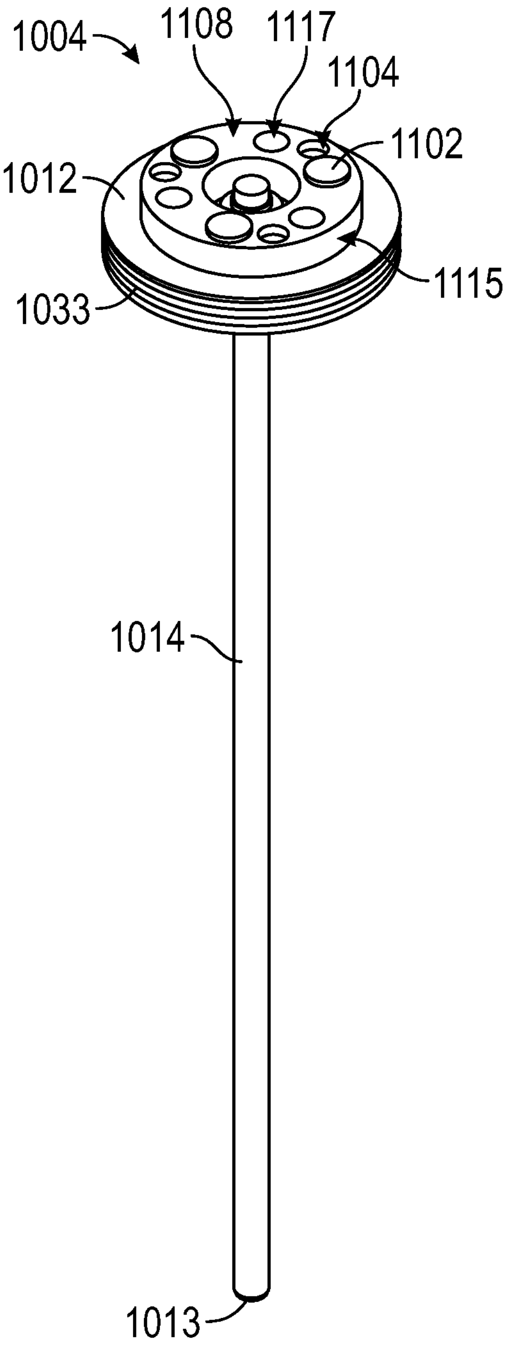
FIGS. 11A and 11B are isometric views of a drive assembly for the feed head assembly of FIG. 10.
Figure 11B:
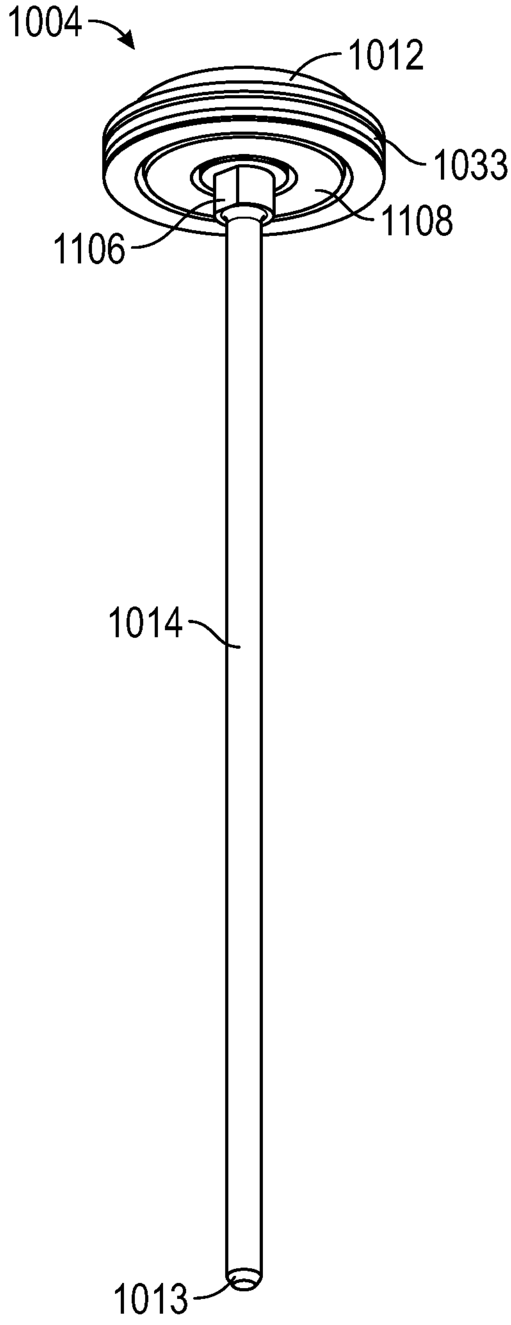
Figure 12A:
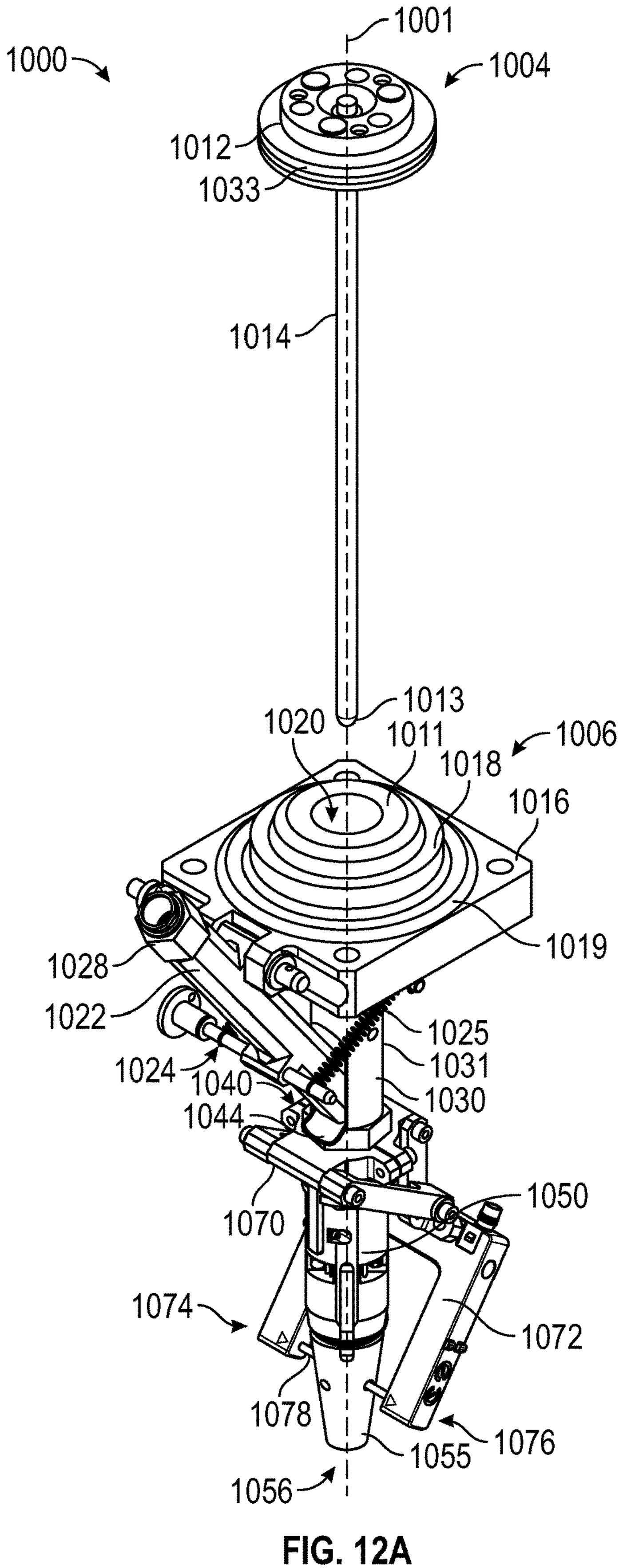
FIGS. 12A and 12B are isometric views of the feed head assembly and drive assembly of the nail gun of FIG. 10.
Figure 12B:
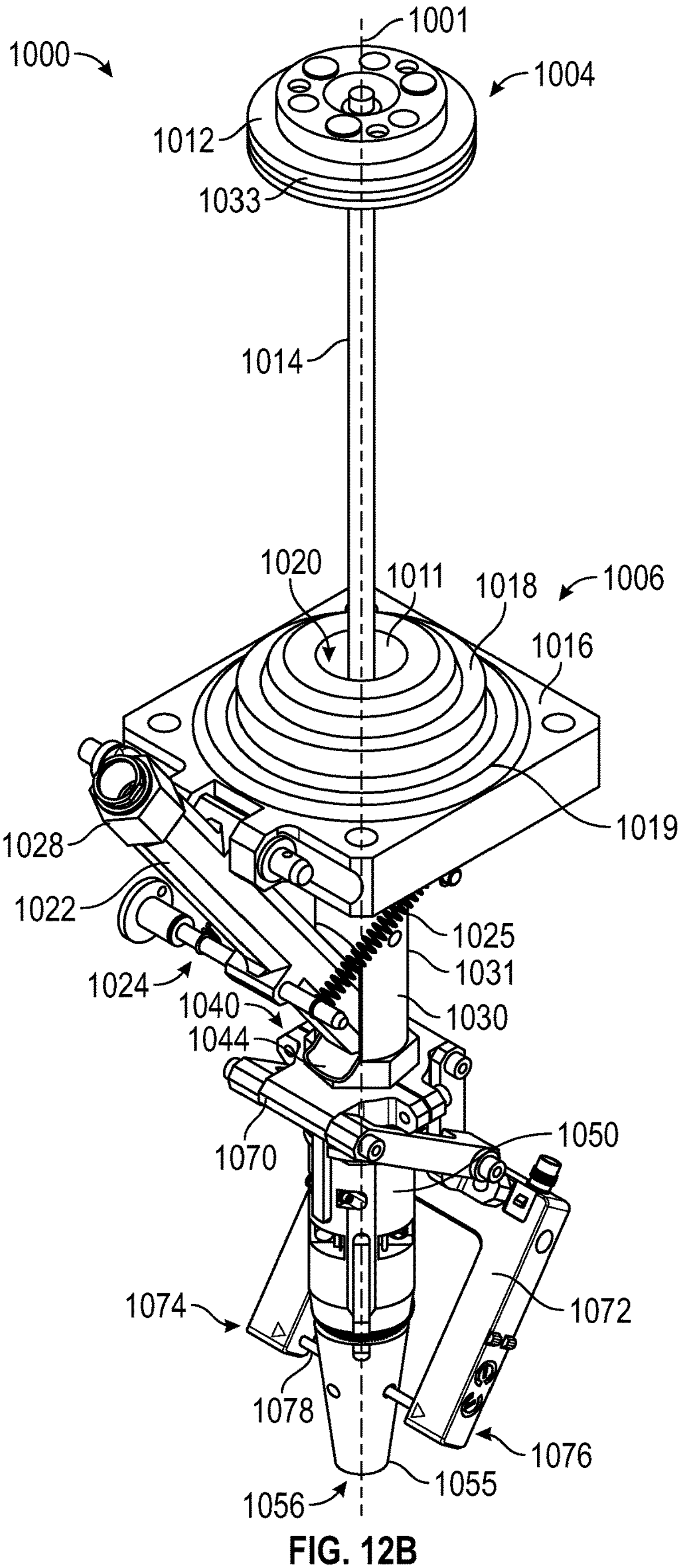

The nail gun 1000 has a longitudinal axis 1001. The nail gun 1000 includes a drive assembly 1002, a hammer 1004, a feed head assembly 1006, a drive motor 1008, a dump valve 1009, and a controller, also referred to as a reservoir assembly 1010. The hammer 1004 includes a hammer head 1012, an impact end 1013, a hammer rod 1014, a cylindrical component 1115, and a seal 1033. As shown in FIGS. 11A and 11B, the cylindrical component 1115 includes one or more hammer bumpers 1102, one or more wrench holes 1104, one or more fastener openings 1117, and a strike surface 1108. One or more wrench flats 1106 are provided below the seal 1033. Although not labeled in FIGS. 2 to 9L, the hammer 104 also includes these components. The one or more hammer bumpers 1102 provide a damper on a top side of the hammer head 1012 for damping impacts of the hammer head 1012 against a top inner surface of the drive assembly 1002 during the upstroke of the hammer 1004. The one or more wrench holes 1104 are configured to receive a wrench, such as, for example a spanner wrench, for disassembling the cylindrical component 1115 and the hammer head 1012 from the hammer rod 1014. The one or more wrench flats 1106 are configured such that a wrench engages the one or more wrench flats 1106 for assembling the hammer rod 1014 to the hammer head 1012. The one or more fastener openings 1117 may receive fasteners for securing the components of the hammer 1004 together. The strike surface 1108 provides a damper on a bottom side of the hammer head 1012 for damping impacts of the hammer head 1012 of a bottom inner surface of the drive assembly 1002 during a downstroke of the hammer 1004. The strike surface 1108, therefore, is on a separate component (e.g., the cylindrical component 1115) that is fastened to the hammer head 1012. This allows the user to customize and optimize the mass and the stroke of the hammer 1004.

With continued reference to FIGS. 12A to 14, the feed head assembly 1006 includes a base plate 1016, a reload segment 1022, a drive segment 1030, and an output segment 1050. Just as with the feed head assembly 106 shown in FIGS. 2-9L, the feed head assembly 1006 shown in FIGS. 10-15C attaches, using the base plate 1016, in a sealed manner to the drive assembly 1002 of the nail gun 1000. The base plate 1016 has, on an upper surface thereof, the mating flange 1018 that extends at least partially into the drive assembly 1002 and seals against the bottom surface of the drive assembly 1002 using the main housing seal (e.g., the seal 1019). The mating flange 1018 has a bumper 1011, which is configured to absorb impacts at the end of the hammer stroke and during dry fires (e.g., during actuations when no nail is present in the output segment 1050). The bumper 1011 has a hammer hole 1020 formed therethrough (e.g., in the direction of the longitudinal axis 1001), through which the hammer rod 1014 extends when driving a nail 10 out of the feed head assembly 1006. The base plate 1016 also includes a bushing 1017 and a mounting bracket 1021.

The feed head assembly 1006 also comprises the reload segment 1022 that is pivotably attached to the base plate 1016 and is configured for selectively depositing nails 10 into the drive segment 1030. The reload segment 1022 is substantially similar to the reload segment 122 of the feed head assembly 106 shown in FIGS. 2-9L, and operates in a substantially similar manner (e.g., by sliding, at the distal end thereof, over the stop plate 1044). As in the feed head assembly 106 shown in FIGS. 2-9L, the reload segment 1022 is pivotably biased towards the drive segment 1030 by one or more biasing springs 1025. There are two biasing springs 1025 attached between the reload segment 1022 and the base plate 1016 in the example embodiment of the feed head assembly 1006 shown in FIGS. 10-15C. The reload segment 1022 is pivotably attached to the drive segment 1030 by a pivot mechanism 1024 and the biasing spring 1025. The pivot mechanism 1024 includes one or more ball-lock pins, about which the reload segment 1022 pivots. The reload segment 1022 includes a reload chamber 1026 having a first end 1023 and a reload chamber outlet 1027 that defines a second end of the reload segment 1022. The reload segment 1022 includes a nail feed fitting 1028 at the first end 1023.

The feed head assembly 1006 comprises, attached to the bottom of the base plate 1016, the drive segment 1030. The drive segment 1030 is substantially similar to the drive segment 130 of the feed head assembly 106 shown in FIGS. 2-9L. The drive segment 1030 includes an exterior surface 1031 and a drive chamber 1032. The drive chamber 1032 includes an inlet region 1034, a primary region 1036, and a hammer rod passage 1038. The inlet region 1034 has a drive chamber inlet surface 1035. The primary region 1036 has a primary region inner wall 1037. The hammer rod passage 1038 has a bushing section 1039, an upper section 1041, and a lower section 1043. The drive segment 1030 also includes a notch 1040, a nail reload passage 1042, and a stop plate 1044. The drive segment 1030 includes a plurality of latch slots 1049 for coupling the output segment 1050 to the drive segment 1030, as detailed further below.

In the example embodiment of the feed head assembly 1006 shown in FIGS. 10-15C, the feed head assembly 1006 includes a support bracket 1070 rigidly attached to and/or about the drive segment 1030. The support bracket 1070 is attached below (e.g., closer to the output segment 1050) the stop plate 1044 and has a nail sensor 1072 attached thereto. In the embodiment of FIGS. 10-15C, the nail sensor 1072 is a beam sensor, also referred to as a proximity sensor. The nail sensor 1072 is generally U-shaped and has a light emitter 1074, also referred to as a beam emitter (e.g., a laser or other suitable light source) on one end of the U-shaped nail sensor 1072 and a light sensor 1076 on the other end of the U-shaped nail sensor 1072. The light emitter 1074 emits a beam 1078 (e.g., a laser beam) such that the beam 1078 is incident upon (e.g., directly upon) the light sensor 1076. The nail sensor 1072 is used to determine when a nail 10 is in a driving position (see, e.g., FIG. 16A). The support bracket 1070 is used to rigidly attach the nail sensor 1072 to the drive segment 1030, so as to maintain a precise alignment between the nail sensor 1072 and the output segment 1050 (e.g., so as to prevent relative movement between the nail sensor 1072 and the output segment 1050). While a beam sensor is detailed herein, the nail sensor 1072 can include any type of sensor for detecting when a nail 10 is in the driving position within the output segment 1050.

Figure 15A:
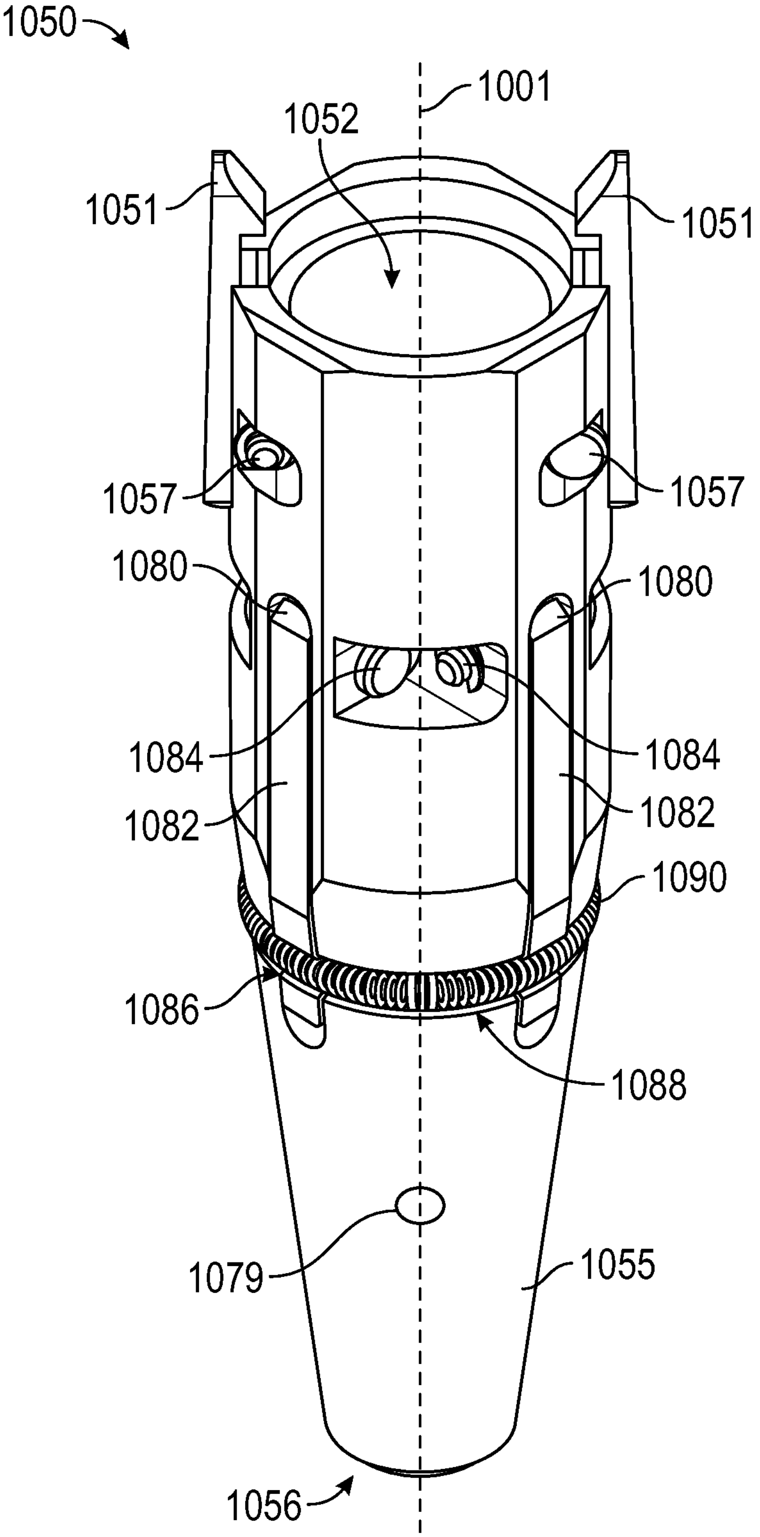
FIG. 15A is an isometric view of an output segment of the feed head assembly
Figure 15C:
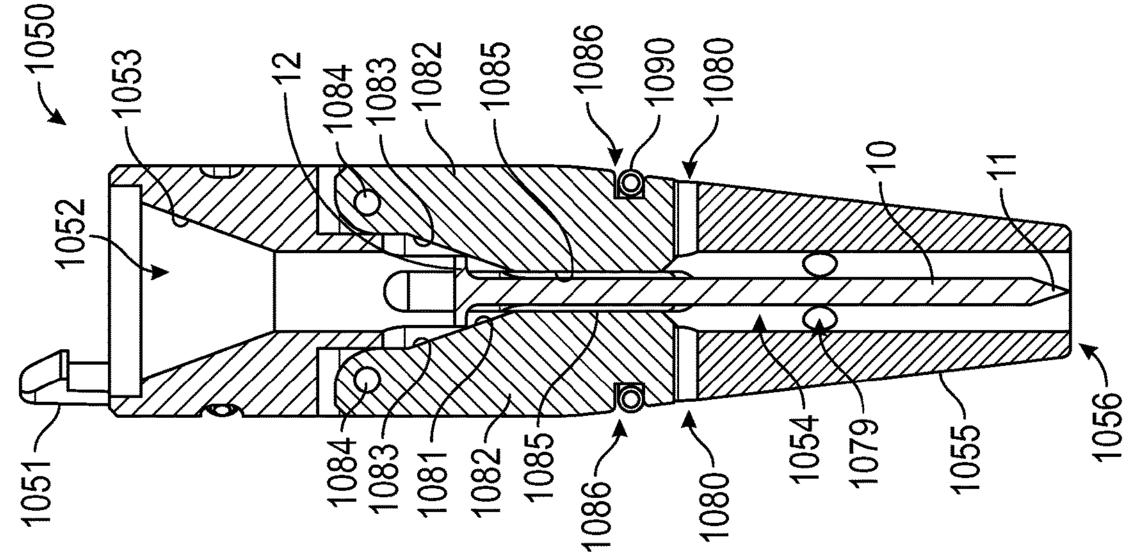
FIGS. 15B and 15C are cross-sectional views of the output segment of FIG. 15A, taken along a longitudinal centerline axis of the output segment.
Figure 15B:
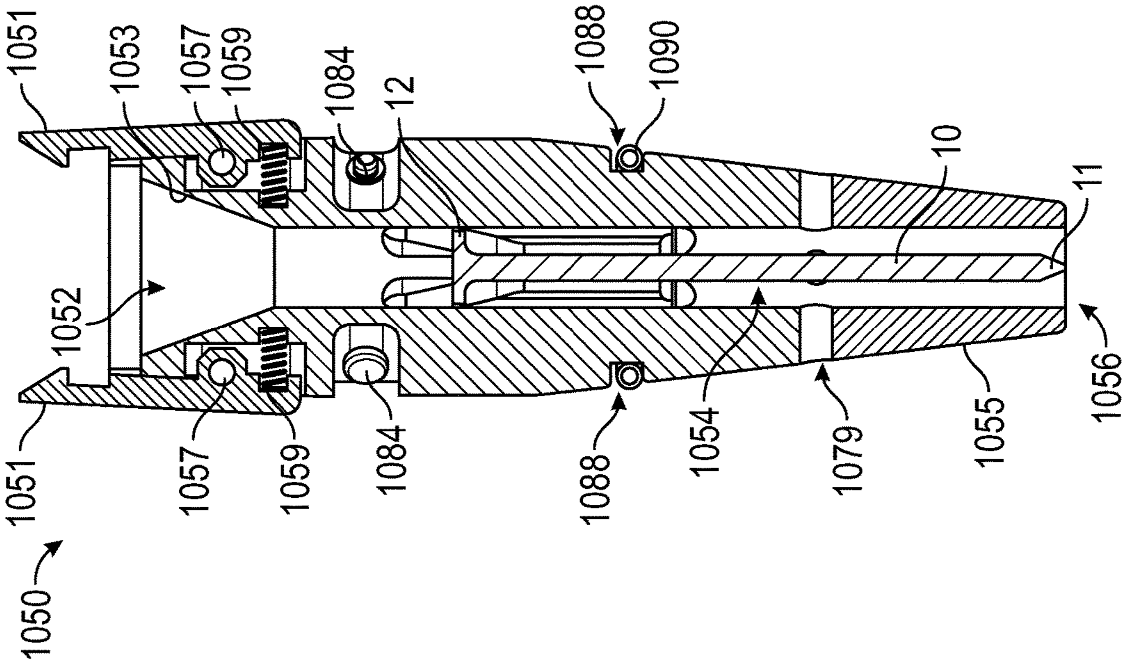

Aspects of the output segment 1050 are shown in FIGS. 15A-15C. The output segment 1050 is removably attached to a distal end of the drive segment 1030. The distal end of the drive segment 1030 is the end opposite to where the drive segment 1030 is attached to the base plate 1016. The attachment of the support bracket 1070 to the drive segment 1030 allows the output segment 1050 to be removed from the drive segment 1030 without also decoupling the support bracket 1070 and/or the nail sensor 1072 from the feed head assembly 1006. The output segment 1050 includes an output chamber inlet 1052, an output chamber inlet surface 1053, an output chamber 1054, and a nail outlet 1056. The output segment 1050 includes a nose 1055 that has a generally frustoconical shape that is tapered from a proximal end of the nose 1055 to the nail outlet 1056. The nail outlet 1056 is defined in the nose 1055.

The output segment 1050 comprises a plurality of (e.g., two) latches 1051 that are attached on a proximal end of the output segment 1050. The proximal end of the output segment 1050 is attached to the distal end of the drive segment 1030. The latches 1051 are provided within the latch slots 1049 formed on the exterior surface of the output segment 1050. The latches 1051 shown in the example embodiment disclosed herein are of a hook-type, in which the hook extends into and engages within a corresponding recess (e.g., the latch slots 1049) formed in the exterior surface of the distal end of the drive segment 1030. The latches 1051 are each pivotable about a respective latch pivot pin 1057 secured within a hole formed through the output segment 1050. The latches 1051 are biased into an engaged position (e.g., in which the hook is engaged in the latch slots 1049 of the drive segment 1030) by a latch spring 1059. The latch spring 1059 shown is a compression spring. Thus, as the latches 1051 pivot about the latch pivot pin 1057, the latch spring 1059 is compressed, which in turn exerts a force on the latch 1051 that causes the latch 1051 to pivot towards the engaged position. The compression direction of the latch spring 1059 is generally perpendicular to the longitudinal axis 1001 of the output segment 1050.

The output segment 1050 also comprises a plurality of finger slots 1080 formed about and extending radially inwardly from the exterior surface of the output segment 1050. The output segment 1050 also includes a plurality of centering fingers 1082. A respective one of the centering fingers 1082 is installed in a respective one of the finger slots 1080. As shown in FIG. 15C, the finger slots 1080 extend radially inwardly to form a path from the output chamber 1054 to the exterior of the output segment 1050. In other words, the finger slots 1080 extend through an entire thickness of the outer wall of the output segment 1050. The centering fingers 1082 are pivotably attached to the output segment by a finger pivot pin 1084. The centering fingers 1082 are closer to the distal end of the output segment 1050 than the latches 1051. In order to provide clearance to allow for the pivoting movement of the centering fingers 1082, the finger slots 1080 are larger in the direction of the longitudinal axis 1001 than the centering fingers 1082. The centering fingers 1082 have an internal surface, also referred to as a centering surface 1081. The centering surface 1081 includes a tapered portion, also referred to as a tapered centering surface 1083, and a straight portion (e.g., parallel with the longitudinal axis 1001), also referred to as a straight centering surface 1085, such that the nail 10 is centered within the output chamber 1054. The tapered centering surface 1083 tapers from the proximal end of the centering fingers 1082 to the straight centering surface 1085. Thus, a distance between the straight centering surface 1085 of opposing centering fingers 1082 is less than the diameter of the output chamber 1054.

The exterior surface of the centering fingers 1082 and also of the output segment 1050 each have a notch, also referred to as a spring notch, formed therein. In particular, the centering fingers 1082 each have a centering finger spring notch 1086, and the output segment 1050 has an output segment spring notch 1088. The centering finger spring notch 1086 that is formed in the exterior surface of the centering fingers 1082 is coplanar with (e.g., in a plane perpendicular to the longitudinal axis 1001) the output segment spring notch 1088 that is formed in the exterior surface of the output segment 1050, so that the centering finger spring notch 1086 and the output segment spring notch 1088 form a substantially continuous annularly-shaped depression, or ring about the output segment 1050. A centering spring 1090 is provided within this annularly shaped depression, or ring. The centering spring 1090 is a substantially endless coil spring in the example embodiment shown, but any suitable type of centering spring may be used.

Figure 16B:
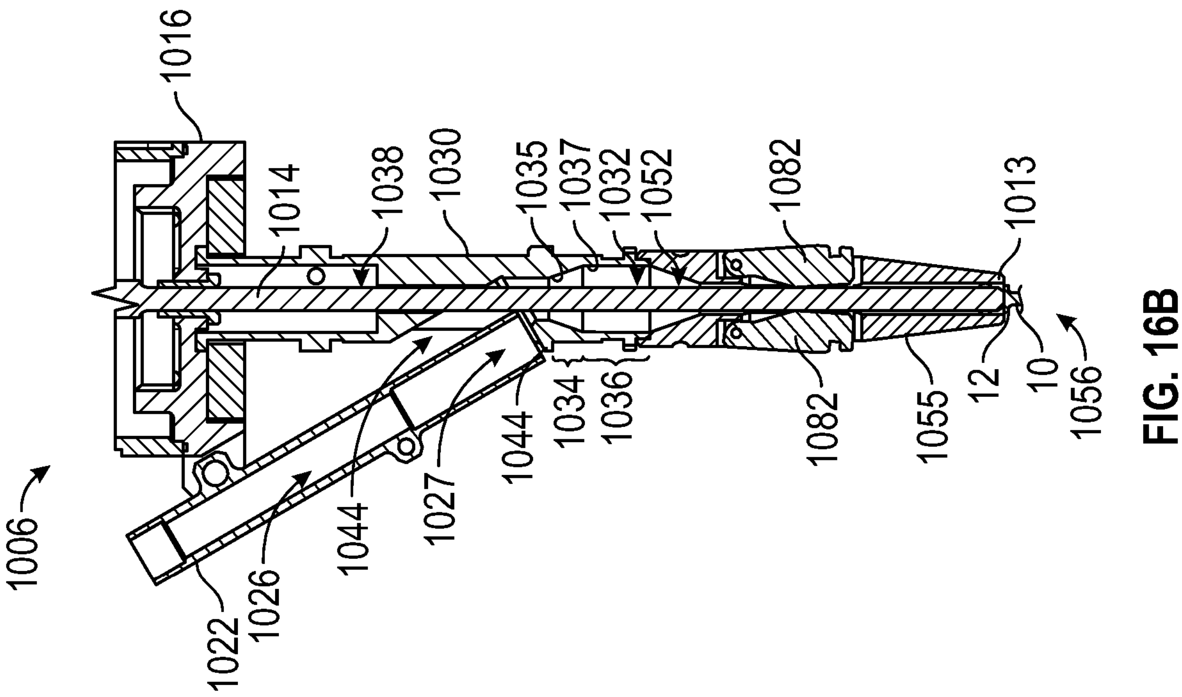
FIGS. 16A and 16B are cross-sectional views of the feed head assembly of FIG. 13.
Figure 16A:
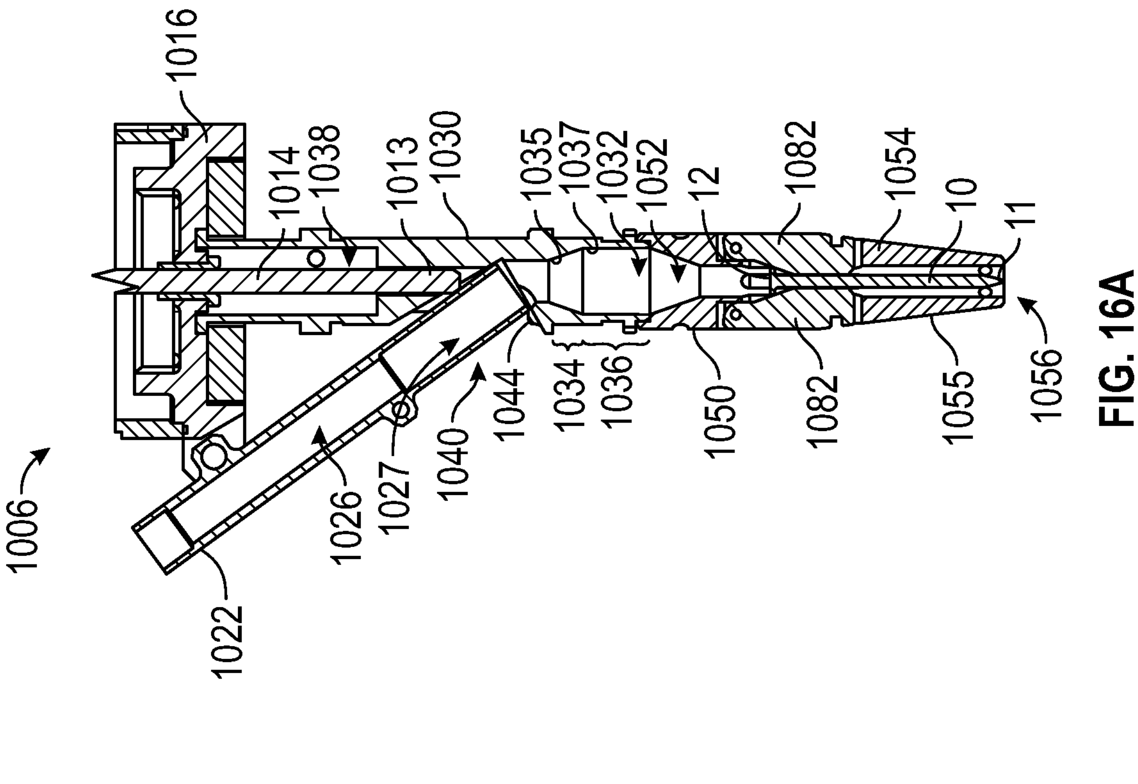

FIGS. 16A and 16B show the arrangement of various structural elements and of the nail 10 during an impact stroke. The feed head assembly 1006 operates substantially similar to the feed head assembly 106 of FIGS. 9A to 9L, and FIGS. 16A and 16B correspond to the operations of FIGS. 9E and 9H, respectively. The description of the operations of the nail gun 100 above also applies to this embodiment, and a complete detailed description of these operations is omitted here.

FIG. 16A shows the nail 10 is disposed within the output chamber 1054 and is secured by the centering surface 1081 (e.g., the straight centering surface 1085) of each of the centering fingers 1082. When the nail 10 is driven out of the output chamber 1054 via being struck by the hammer rod 1014 (see, e.g., FIG. 16B), the nail head 12 and the hammer rod 1014 engage against the centering surface 1081 (e.g., the tapered centering surface 1083 and the straight centering surface 1085) of each of the centering fingers 1082, which causes a corresponding pivoting movement of each of the centering fingers 1082 about the corresponding finger pivot pin 1084. Each of the centering fingers 1082 pivot such that the centering surface 1081 moves radially outwards from the output chamber 1054. This pivoting movement of the centering fingers 1082 away from the output chamber 1054 causes, in the example embodiment disclosed herein, an elongation of the centering spring 1090. This elongation of the centering spring 1090 induces a corresponding centering force that causes the centering fingers 1082 to pivot back into the centering position shown in FIG. 16A after the retraction of the hammer rod 1014 axially beyond (e.g., towards the proximal end of the output chamber 1054) the respective centering surface of the centering fingers 1082. In FIG. 16B, the centering fingers 1082 are in the pivoted position. The straight centering surface 1085 of the centering fingers 1082 prevent passage of the nail 10 beyond the centering surfaces 1081 of the centering fingers 1082 and cause the nail 10 to be centered within the output chamber 1054.

With reference back to FIGS. 15A to 15C, the output segment 1050 comprises a plurality of holes, also referred to as beam holes 1079, formed through an entire thickness of the outer walls of the output segment 1050. The beam holes 1079 are formed between the nail outlet 1056 and the finger slots 1080. The beam holes 1079 are formed in pairs that are spaced circumferentially apart from each other, such that each pair of beam holes 1079 is coaxial. The support bracket 1070 holds the nail sensor 1072 such that the beam emitted from the light emitter 1074 passes through a pair of the beam holes 1079 to be incident on the light sensor 1076 of the nail sensor 1072, which is arranged on the opposite side of the output segment 1050 from the light emitter 1074. Thus, the light from the light emitter 1074 passes internally through the output chamber 1054 before striking the light sensor 1076. As such, a nail 10 within the output chamber 1054 (e.g., in FIG. 16A) blocks the light from the light emitter 1074 from being incident on the light sensor 1076. When the nail sensor 1072 does not detect the light from the light emitter 1074, an actuation cycle is triggered. Thus, the nail sensor 1072 is used for controlling actuation of the hammer 1004.

Figure 17:
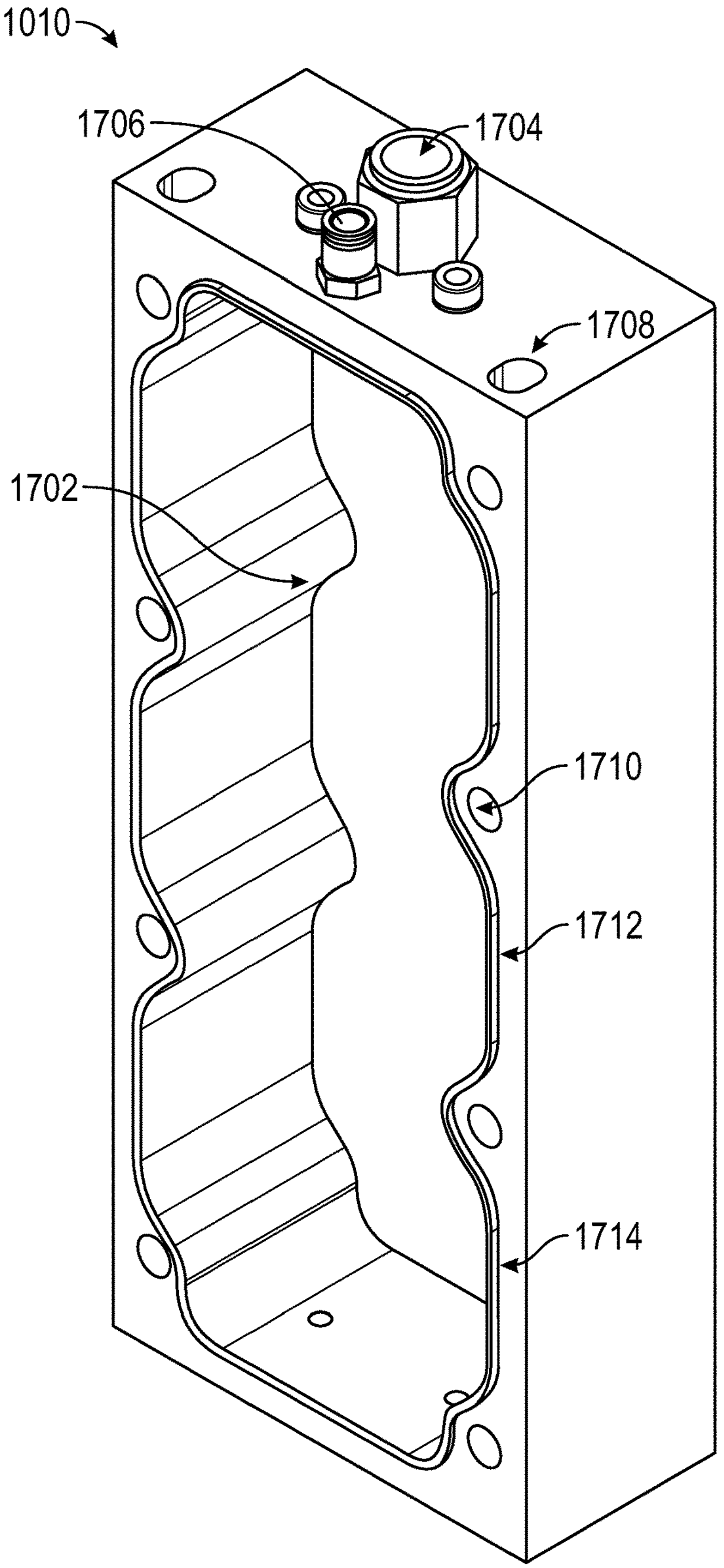
FIG. 17 is an isometric view of a reservoir assembly for the nail gun of FIG. 10.

FIG. 17 is a perspective view of the reservoir assembly 1010 isolated from the nail gun 1000, according to the present disclosure. The reservoir assembly 1010 includes a reservoir 1702, a supply air inlet 1704, a supply air outlet 1706, one or more first reservoir mounting slots 1708, one or more second reservoir mounting slots 1710, also referred to as one or more second reservoir mounting holes 1710, a gasket rim 1712, and a gasket sealing surface 1714.

Referring to FIGS. 10 and 17, the reservoir assembly 1010 is mounted to the nail gun 1000. The one or more first reservoir mounting slots 1708 allow for mounting the nail gun 1000 externally. Although two first reservoir mounting slots 1708 are illustrated, more or fewer may be provided. The one or more second reservoir mounting slots 1710 allow for mounting the reservoir assembly 1010 to a main housing of the nail gun (e.g., the drive assembly 1002 as illustrated in FIG. 10). Although eight second reservoir mounting slots 1710 are illustrated, more or fewer may be provided. The gasket rim 1712 provides a seal for the reservoir assembly 1010 such that pressurized air in the reservoir 1702 does not leak or dissipate out of the reservoir assembly 1010.

During operation of the nail gun 1000, compressed air is supplied to the reservoir 1702 via the supply air inlet 1704. The compressed air within the reservoir 1702 is then supplied to a solenoid valve (not depicted) via the supply air outlet 1706. The compressed air accelerates the drive assembly 1002 (FIG. 10) to drive a nail into a work surface or work piece.

Figure 24:
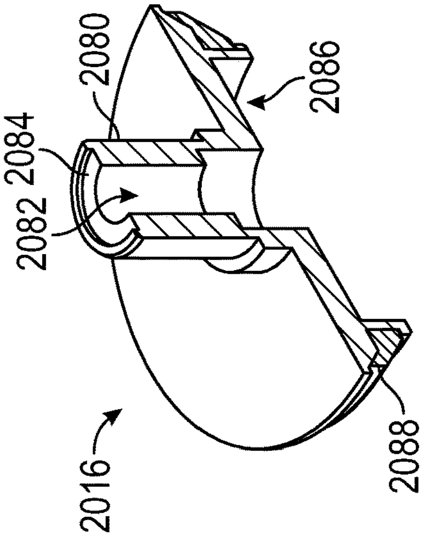
FIG. 24 is an isometric view of a dump valve head of the dump valve of FIGS. 20A-20D.

FIG. 18 is a perspective view of a cylinder 1800 of the drive motor 1008 isolated from the nail gun 1000, according to the present disclosure. The cylinder 1800 includes a cylinder bore 1802, a cylinder sealing surface 1804, one or more first cylinder seals 1806, and one or more second cylinder seals 1808. The cylinder bore 1802 is a drive bore that houses the hammer 1004 (FIG. 11A). That is, the hammer 1004 is located within the cylinder bore 1802. The cylinder sealing surface 1804 seals with a dump valve head 2016 (FIG. 24). The one or more first cylinder seals 1806 seal with an inner surface of a main housing 1900 (FIG. 19A) of the drive motor 1008. Although two first cylinder seals 1806 are illustrated, more or fewer may be provided. The one or more second cylinder seals 1808 operate as a check valve such that compressed air is allowed to flow only in a positive radial direction. Although a single second cylinder seal 1808 is illustrated, more may be provided. The one or more first cylinder seals 1806 and/or the one or more second cylinder seals 1808 may be O-rings.

Figure 19C:
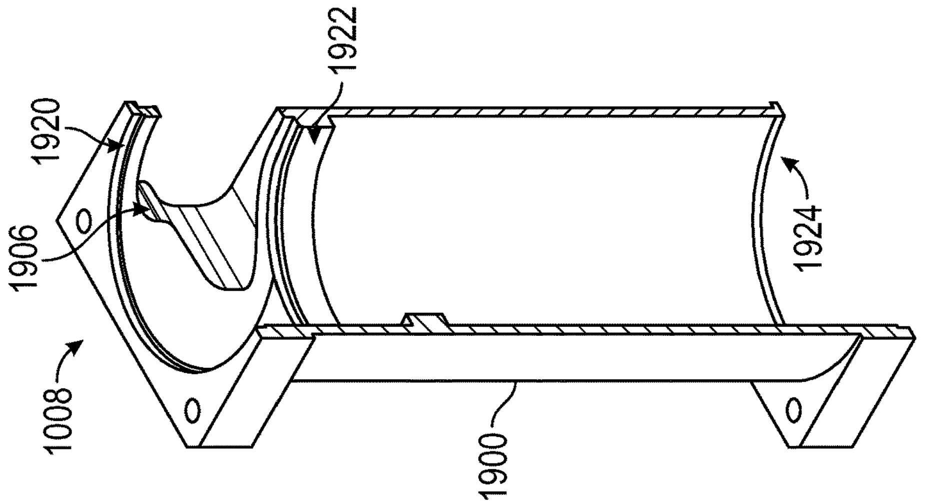
FIGS. 19A-19C show various aspects of main housing of a drive motor of the nail gun of FIG. 10.
Figure 19B:
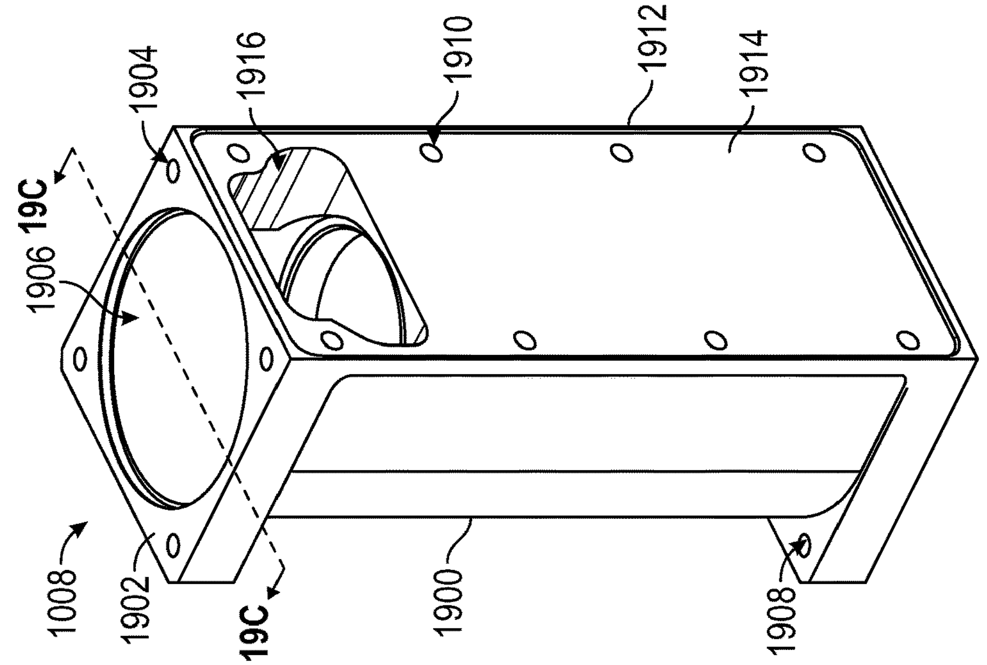
Figure 19A:
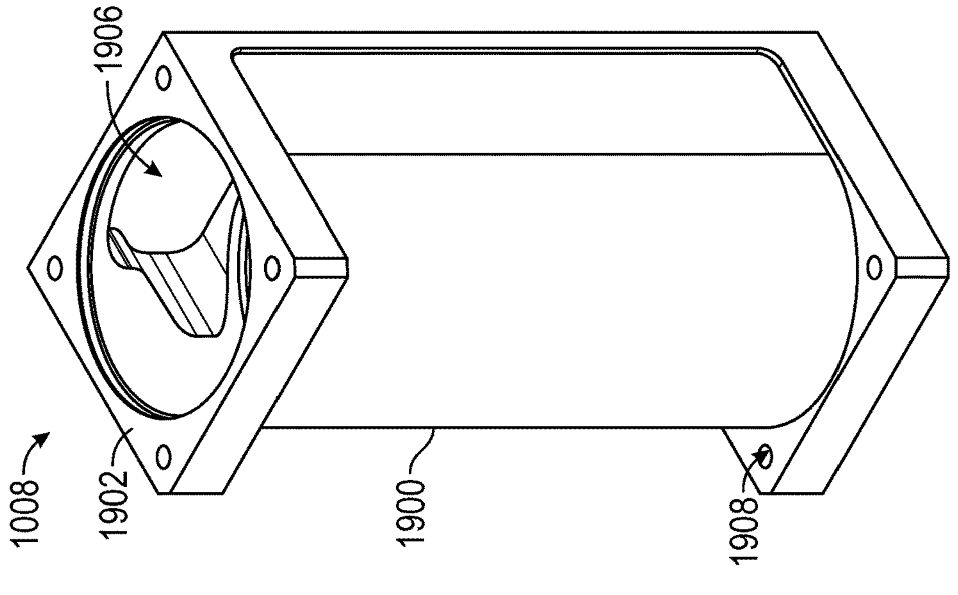

FIGS. 19A to 19C show various aspects of the main housing 1900 of the drive motor 1008 isolated from the nail gun 1000, according to the present disclosure. The main housing 1900 includes a first main housing sealing surface 1902, one or more first main housing mounting holes 1904, a main housing bore 1906, one or more second main housing mounting holes 1908, one or more third main housing mounting holes 1910, a reservoir gasket outer rim 1912, a second main housing sealing surface 1914, a main housing opening 1916, a first locating bore 1920, a second locating bore 1922, and a third locating bore 1924.

Figure 22:
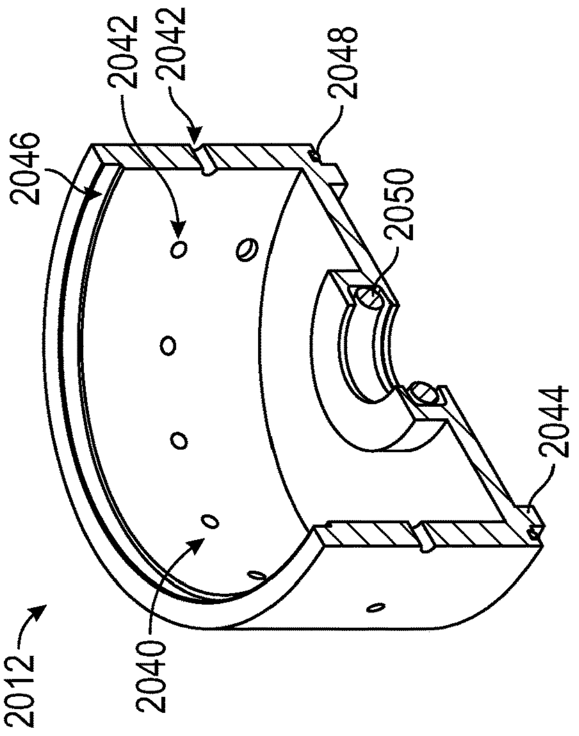
FIG. 22 is an isometric view of a dump valve housing of the dump valve of FIGS. 20A-20D.

The first main housing sealing surface 1902 provides a sealing surface with a dump valve housing seal 2048 of a dump valve housing 2012 (FIG. 22). The second main housing sealing surface 1914 provides a sealing surface with the gasket rim 1712 of the reservoir assembly 1010 (FIG. 17). The reservoir gasket outer rim 1912 provides a seal with the gasket sealing surface 1714 (FIG. 17). The one or more third main housing mounting holes 1910 align with the one or more second reservoir mounting holes 1710 (FIG. 17). One or more fasteners are provided in the aligned holes and slots to secure the reservoir assembly 1010 to the main housing 1900 of the drive motor 1008.

As illustrated in FIG. 17, the hole pattern of the one or more second reservoir mounting holes 1710 is rectangular. In this manner, the second reservoir mounting holes 1710 allow for the reservoir assembly 1010 to align with the drive motor 1008 at zero degrees (e.g., the alignment illustrated in FIG. 10) or at 180 degrees (e.g., parallel to the alignment illustrated in FIG. 10, but, having the supply air outlet 1706 and the supply air inlet 1704 facing downward, that is, 180 degree rotation from the orientation of FIG. 17). The hole pattern thus allows for flexibility in assembly and installation of the nail gun 1000.

Figure 13:
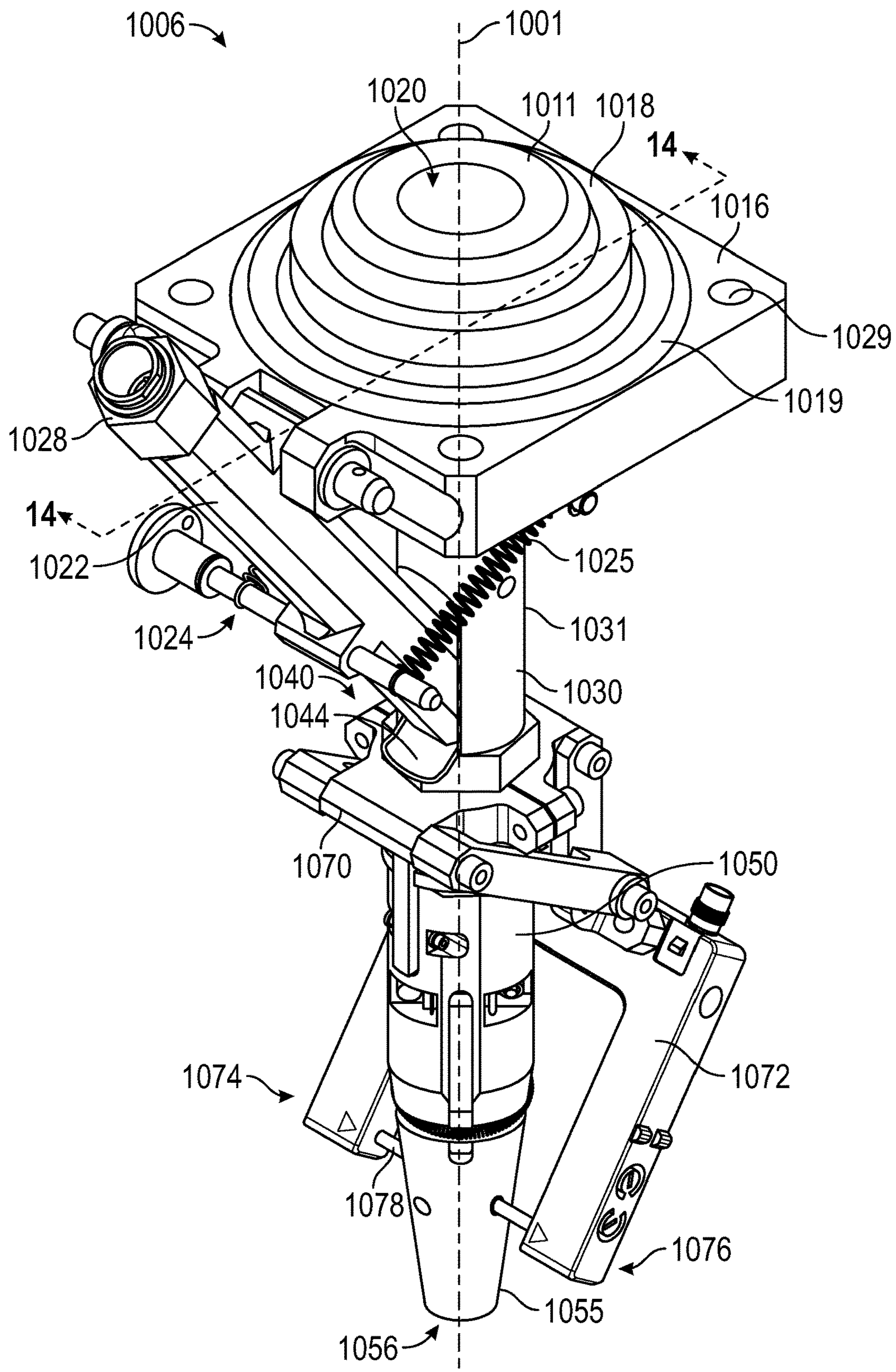
FIG. 13 is an isometric view of the feed head assembly of the nail gun assembly of FIG. 10.
Figure 14:
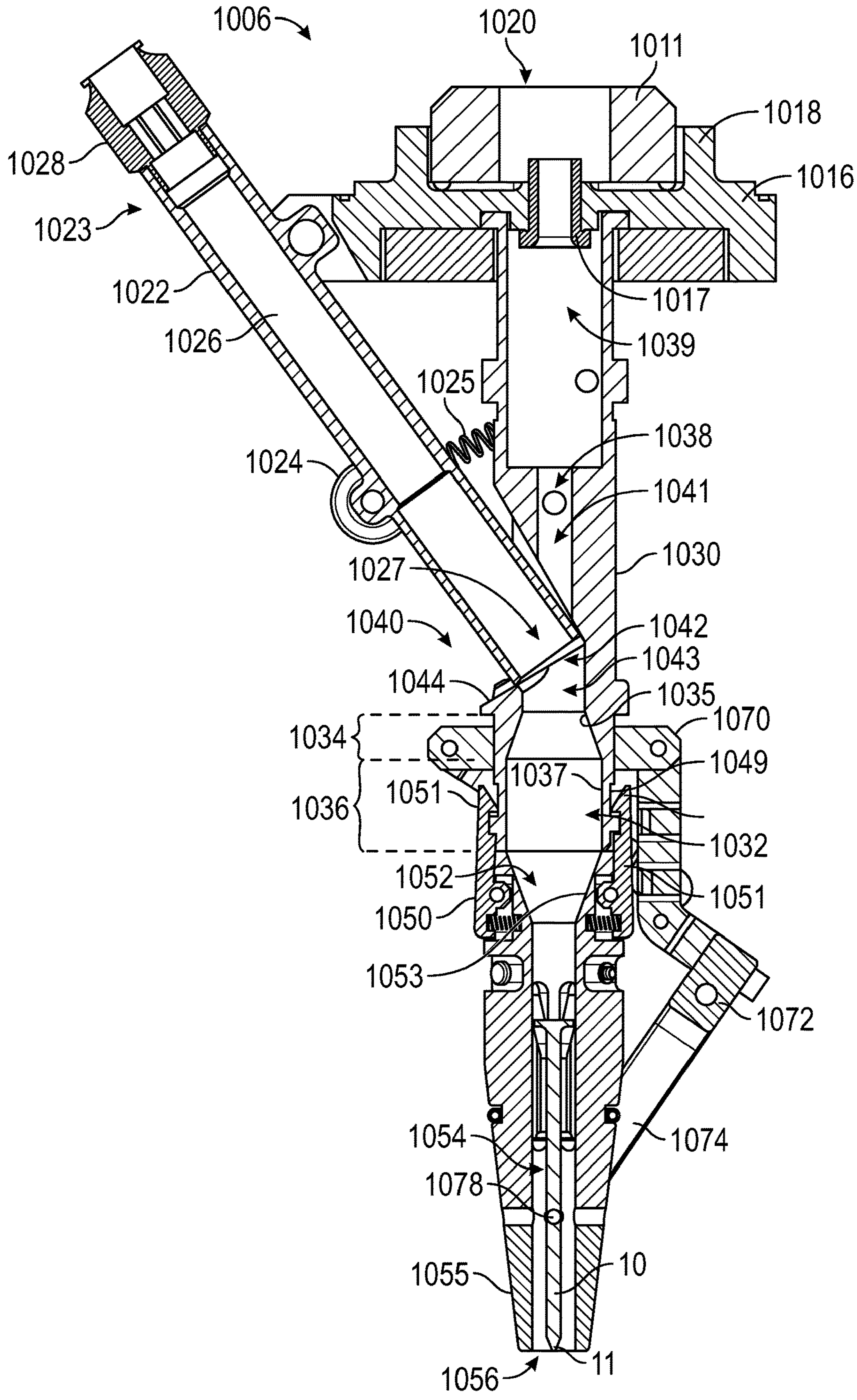
FIG. 14 is a cross-sectional view of the feed head assembly shown in FIG. 13, taken along a longitudinal centerline axis of the feed head assembly.
Figure 20B:
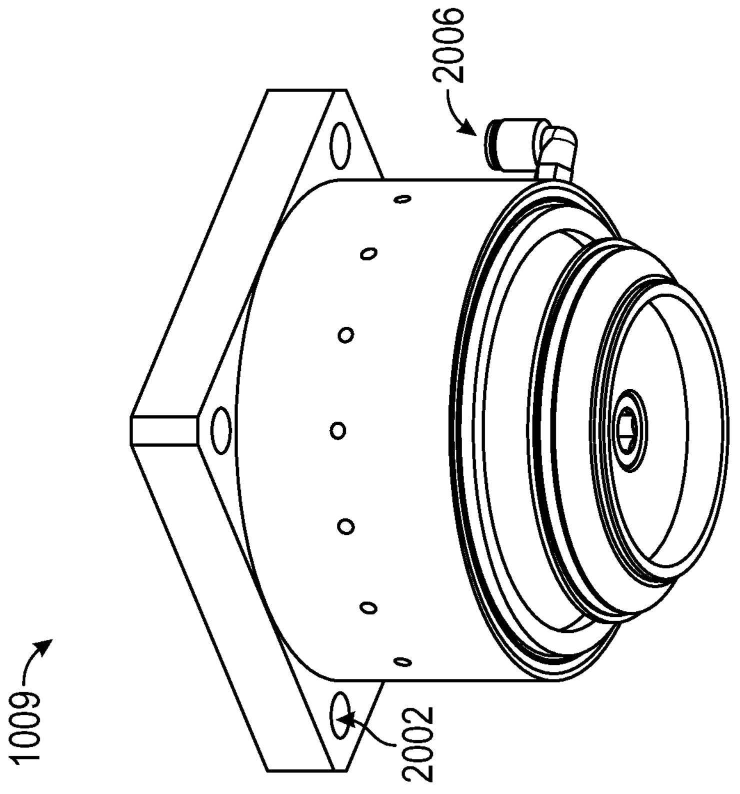
FIGS. 20A-20D show various aspects of a dump valve of the nail gun of FIG. 10.
Figure 20A:
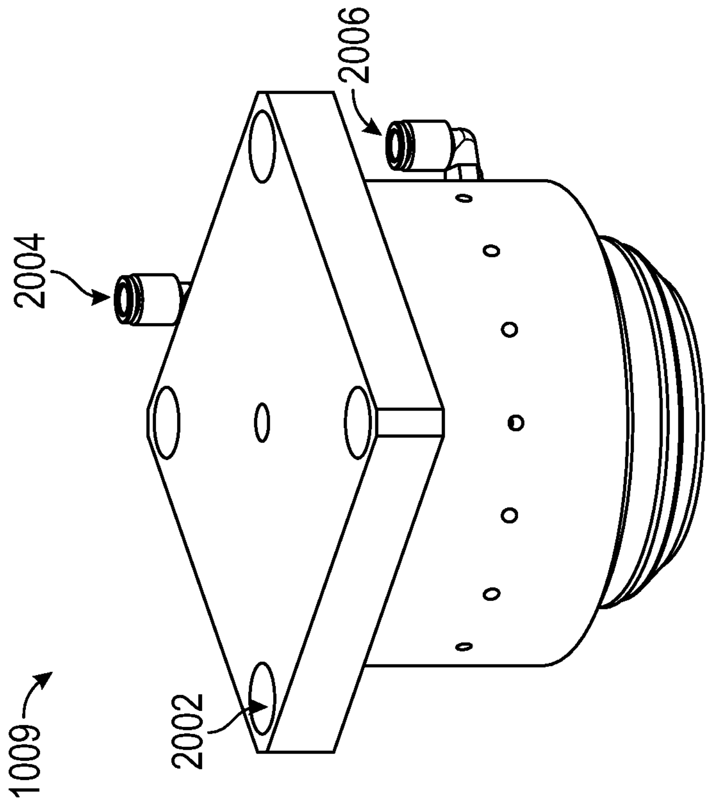

The one or more first main housing mounting holes 1904 align with one or more dump valve mounting holes 2002 of the dump valve 1009 (FIG. 20A). One or more fasteners are provided in the aligned holes to secure the dump valve 1009 to the main housing 1900 of the drive motor 1008. The one or more second main housing mounting holes 1908 align with one or more feed head assembly mounting holes 1029 of the feed head assembly 1006 (FIG. 13). One or more fasteners are provided in the aligned holes to secure the drive motor 1008 to the feed head assembly 1006.

As illustrated in FIG. 13, the hole pattern of the one or more feed head assembly mounting holes 1029 is rectangular. In this manner, the feed head assembly mounting holes 1029 allow for the feed head assembly 1006 to align with the drive motor 1008 at zero degrees, 90 degrees, 180 degrees, or 270 degrees about the longitudinal axis 1001. The hole pattern thus allows for flexibility in assembly and installation of the nail gun 1000.

The main housing bore 1906 receives the cylinder 1800 (FIG. 18). The one or more first cylinder seals 1806 seal with the second locating bore 1922. The main housing opening 1916 aligns with the reservoir 1702 of the reservoir assembly 1010 (FIG. 17). An upper surface of the cylinder 1800 (FIG. 18) is axially aligned with the second locating bore 1922 such that compressed air present in the reservoir 1702 flows through the aligned main housing opening 1916 and into the cylinder bore 1802 of the cylinder 1800. The first locating bore 1920 receives the dump valve housing seal 2048 of the dump valve 1009 (FIG. 24). The third locating bore 1924 receives the seal 1019 of the feed head assembly 1006.

FIGS. 20A to 20D show various aspects of the dump valve 1009 of the nail gun 1000, according to the present disclosure. The dump valve 1009 includes one or more dump valve mounting holes 2002, a top chamber flowpath 2004, a bottom chamber flowpath 2006, a dump valve cap 2010, a dump valve housing 2012, a dump valve disc 2014, a dump valve head 2016, a dump valve spring 2018, a dump valve screw 2020, a top dump valve chamber 2022, and a bottom dump valve chamber 2024.

As discussed above, the one or more dump valve mounting holes 2002 of the dump valve cap 2010 align with the first main housing mounting holes 1904 (FIG. 19B) to allow for securing the dump valve 1009 (by way of the dump valve cap 2010) to the main housing 1900. The top chamber flowpath 2004 and the bottom chamber flowpath 2006 are coupled to the solenoid (not visible) that receives compressed air from the supply air outlet 1706 (FIG. 17).

As illustrated in FIG. 20A, the hole pattern of the one or more dump valve mounting holes 2002 is rectangular. In this manner, the dump valve mounting holes 2002 allow for the dump valve 1009 to align with the drive motor 1008 at zero degrees, 90 degrees, 180 degrees, or 270 degrees about the longitudinal axis 1001. The hole pattern thus allows for flexibility in assembly and installation of the nail gun 1000.

The dump valve housing 2012 surrounds the components of the valve (e.g., the dump valve disc 2014, the dump valve spring 2018, the dump valve screw 2020) and the top dump valve chamber 2022 and the bottom dump valve chamber 2024. Below the dump valve housing 2012 is the dump valve head 2016 which is received within the first locating bore 1920 (FIG. 19C) of the main housing 1900.

Figure 20C:
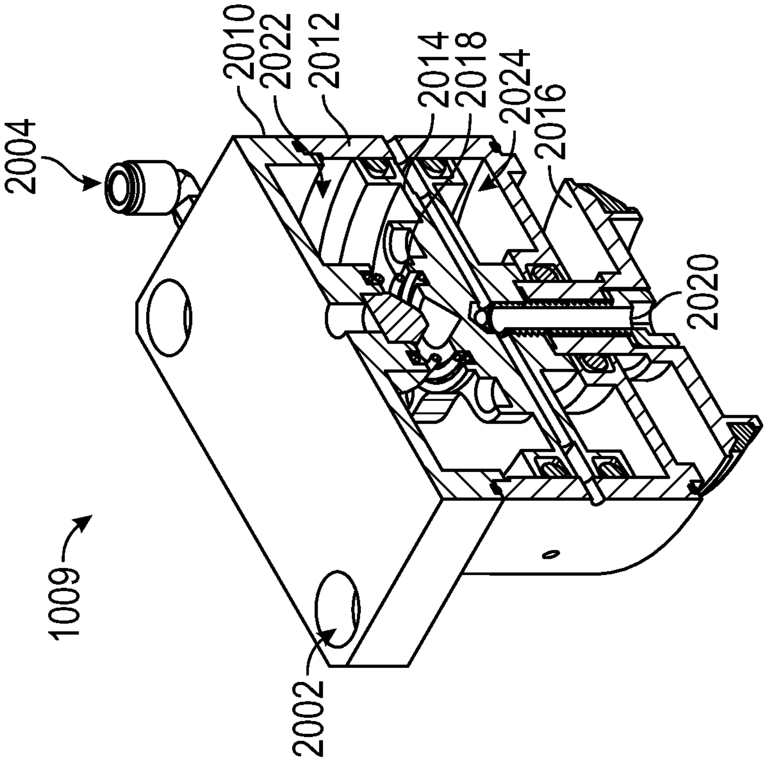
Figure 20D:
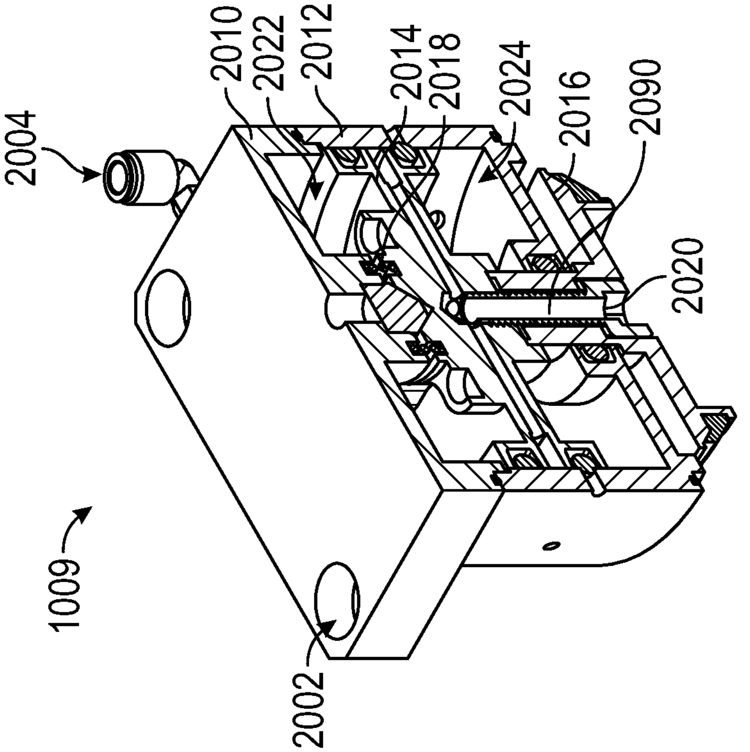
Figure 21:
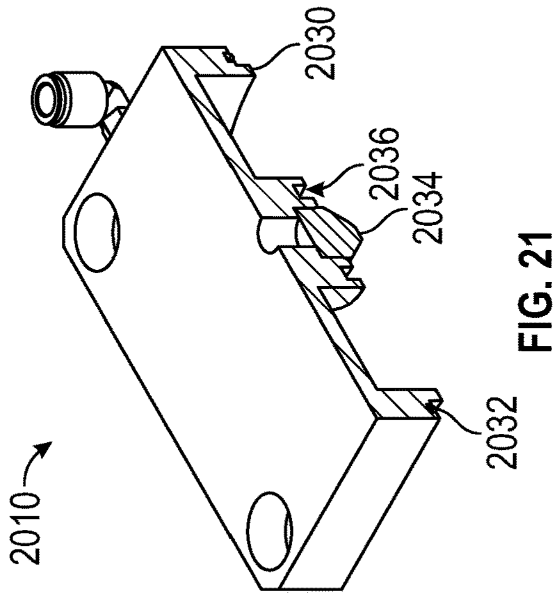
FIG. 21 is an isometric view of a dump valve cap of the dump valve of FIGS. 20A-20D.
Figure 23:
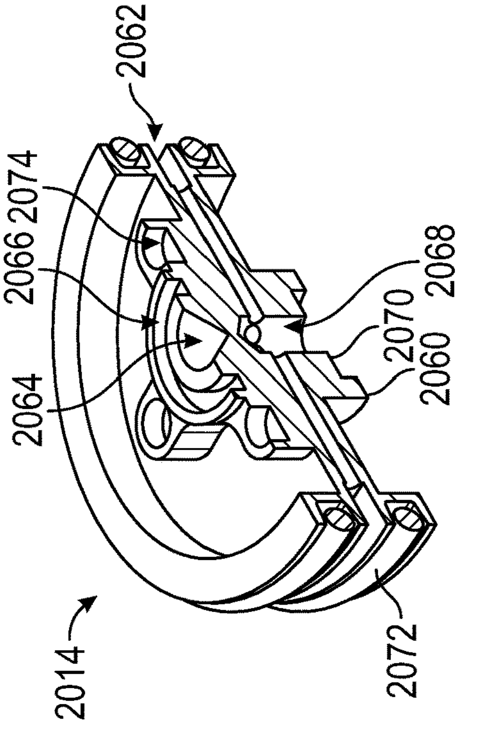
FIG. 23 is an isometric view of a dump valve disc of the dump valve of FIGS. 20A-20D.

FIG. 21 is a perspective view of the dump valve cap 2010 of FIGS. 20C and 20D isolated from the dump valve 1009. The dump valve cap 2010 includes a dump valve locating feature 2030 for locating the dump valve cap 2010 with respect to the dump valve housing 2012 (as illustrated in FIGS. 20C and 20D). The dump valve cap 2010 includes a dump valve cap seal 2032 to provide a seal for the top dump valve chamber 2022 when the dump valve cap 2010 is located on the dump valve housing 2012. The dump valve cap 2010 includes a dump valve cap disc bumper 2034 configured to engage a dump valve disc bumper surface 2064 (FIG. 23). The dump valve cap 2010 includes a dump valve cap spring groove 2036 for receiving an upper end of the dump valve spring 2018 (FIG. 20C).

FIG. 22 is a perspective view of the dump valve housing 2012 of FIGS. 20C and 20D isolated from the dump valve 1009. The dump valve housing 2012 includes a dump valve housing bore 2040 that form the top dump valve chamber 2022 and the bottom dump valve chamber 2024 (FIG. 20D). The dump valve housing 2012 includes one or more dump valve housing vent holes 2042 that vent pressurized air from the cylinder bore 1802 (FIG. 18). In some examples, the one or more vent holes 2042 may align with one or more dump valve disc vent holes 2062 (FIG. 23) and a passage 2090 within the dump valve screw 2020 (FIG. 20D). In some examples, the one or more vent holes 2042 and the one or more dump valve disc vent holes 2062 do not align. The dump valve disc 2014 may rotate within the dump valve housing 2012, and, in this case, the holes of the dump valve disc 2014 (e.g., holes 2062) may move into and out of alignment of the holes of the dump valve housing 2012 (e.g., holes 2042). Therefore, alignment of the holes 2042 and 2062 is not required for proper venting through the dump valve 1009.

The dump valve housing 2012 includes a first dump valve housing locating feature 2044 that aligns with the first locating bore 1920 of the main housing 1900 (FIG. 19C). The dump valve housing 2012 includes a second dump valve housing locating feature 2046 that aligns with the dump valve locating feature 2030 (FIG. 21). The dump valve housing includes a first dump valve housing seal 2048 and a second dump valve housing seal 2050. The first dump valve housing seal 2048 provides a seal with the first main housing sealing surface 1902 (FIG. 19A) and the second dump valve housing seal 2050 provides a seal with a dump valve head stem 2080 (FIG. 24).

FIG. 23 is a perspective view of the dump valve disc 2014 of FIGS. 20C and 20D isolated from the dump valve 1009. The dump valve disc 2014 includes a dump valve disc locating feature 2060 that receives an upper end of the dump valve head stem 2080. The dump valve disc 2014 includes the one or more dump valve disc vent holes 2062 that, as discussed above, may or may not align with the one or more vent holes 2042 (FIG. 22) and/or may move into and out of alignment with the one or more vent hole 2042 through rotation of the dump valve disc 2014. Although a plurality are shown, more or fewer vent holes 2062 and vent holes 2042 may be provided. In some examples, the number of vent holes 2062 is equal to the number of vent holes 2042.

The dump valve disc 2014 includes a dump valve disc bumper surface 2064 that receives the dump valve cap disc bumper 2034 (FIG. 21). The dump valve disc 2014 includes a dump valve disc spring groove 2066 that receives a bottom end of the dump valve spring 2018. The dump valve disc 2014 includes a dump valve disc vent screw hole 2068 that aligns with the dump valve screw 2020 to allow flow from the passage 2090 of the dump valve screw 2020 through the one or more vent holes 2062 and aligned vent holes 2042. The dump valve disc 2014 includes a dump valve disc sealing seat 2070 that receives the dump valve head sealing seat 2084 (FIG. 24). The dump valve disc 2014 includes a dump valve disc seal 2072 that seals with an inner surface of the dump valve housing 2012. Although two dump valve disc seals 2072 are shown, more or fewer may be provided. The dump valve disc 2014 includes one or more dump valve disc holes 2074. The one or more dump valve disc holes 2074 may receive a tool (not shown). The tool may secure the dump valve disc 2014 to the dump valve screw 2020. Accordingly, the dump valve disc vent screw hole 2068 may include a threaded surface to receive the threads of the dump valve screw 2020. In some examples, the tool is a spanner wrench.

FIG. 24 is a perspective view of the dump valve head 2016 of FIGS. 20C and 20D isolated from the dump valve 1009. As mentioned, the dump valve head sealing seat 2084 mates with the dump valve disc sealing seat 2070. A dump valve head vent screw hole 2082 is provided within the dump valve head stem 2080 to allow passage of the dump valve screw 2020. As discussed above, the dump valve head stem 2080 mates with the second dump valve housing seal

2050. The dump valve head 2016 includes a dump valve head driver pocket 2086 to receive the hammer head 1012 of the hammer 1004 (FIG. 11A). The dump valve head 2016 includes a dump valve head seal 2088 that mates with the cylinder sealing surface 1804 (FIG. 18).

Figure 25A:
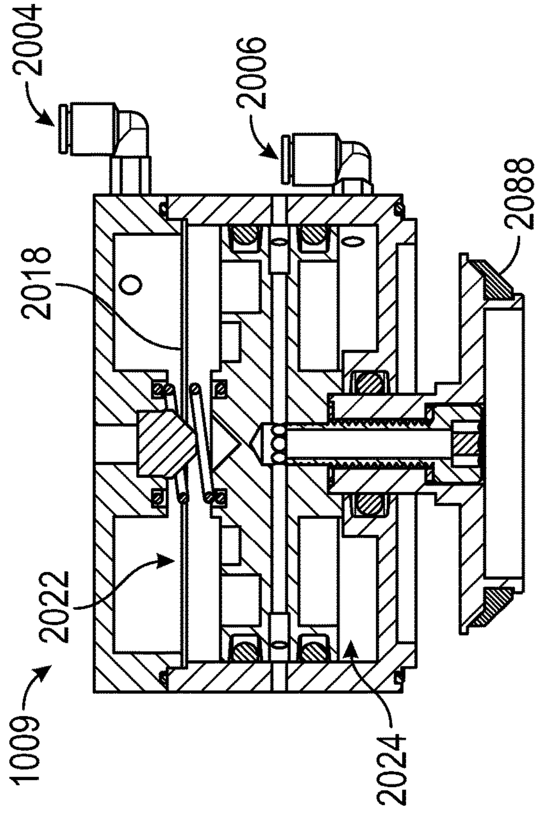
FIGS. 25A-25D show an operation of the dump valve of FIGS. 20A-20D in a closed position.
Figure 25B:
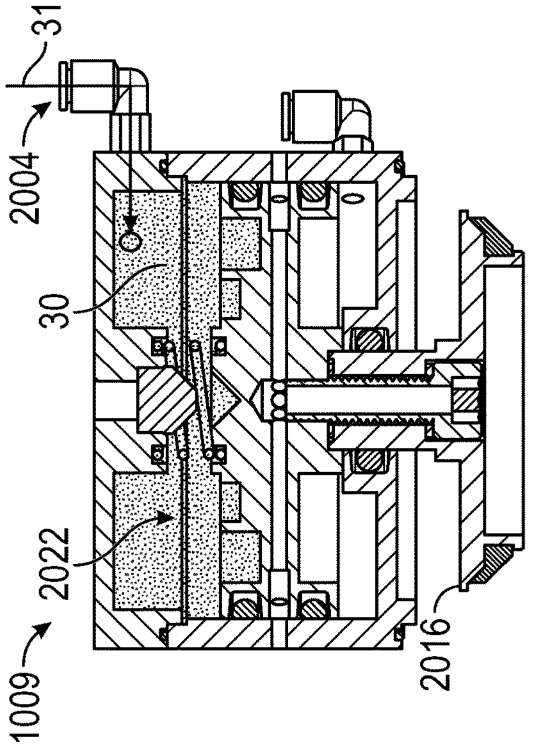

FIGS. 25A to 25D show an operation of the dump valve 1009 in a closed position. In the closed position, the dump valve spring 2018 is in an extended position. In FIG. 25A, no fluid (e.g., no compressed air) is located within either the top dump valve chamber 2022 or the bottom dump valve chamber 2024. In FIG. 25B, compressed air 30 is provided to the top dump valve chamber 2022 via the top chamber flowpath 2004 as illustrated by the air flow 31. Pressurizing the top dump valve chamber 2022, as shown in FIG. 25B, moves the dump valve head 2016 to seal against the cylinder 1800 and maintains a seal between the dump valve head seal 2088 and the cylinder sealing surface 1804, thus maintaining a seal of the cylinder bore 1802. With the cylinder bore 1802 sealed, the reservoir 1702 (FIG. 17) provides pressurized air to the cylinder bore 1802 by way of the main housing opening 1916 (FIG. 19A). In the state illustrated in FIG. 25B, the bottom dump valve chamber 2024 is at atmospheric pressure. The passages internal to the dump valve disc 2014 and the dump valve screw 2020 are at atmospheric pressure.

Figure 25C:
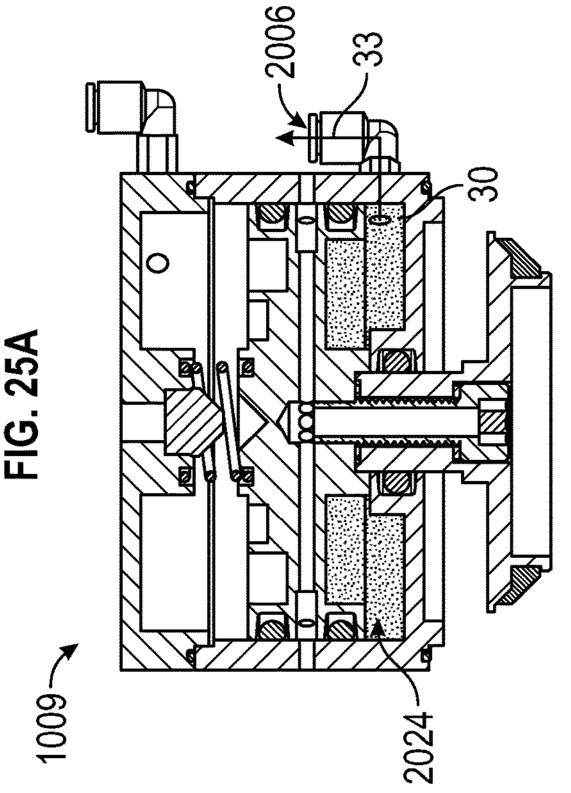
Figure 25D:
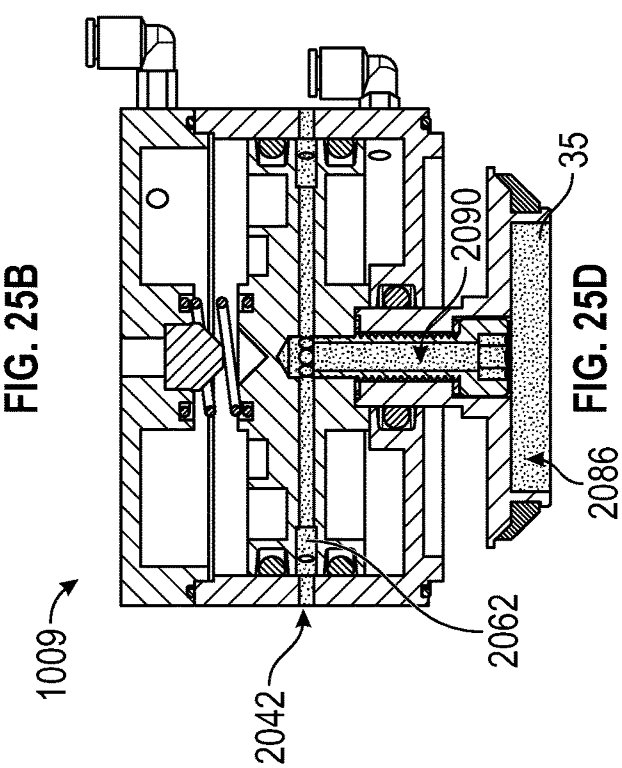

In FIG. 25C, air 30 in the bottom dump valve chamber 2024 is allowed to vent and flows through the bottom chamber flowpath 2006 as illustrated by air flow 33. In FIG. 25D, compressed air 35 from the cylinder 1800 is allowed to vent through the dump valve head driver pocket 2086, the passage 2090, the dump valve disc vent holes 2062, and the one or more vent holes 2042. The compressed air 35 vents through the aforementioned passages to the atmosphere around the nail gun 1000.

Stated another way, the default state of the nail gun 1000 is with the dump valve 1009 closed, as illustrated in FIGS. 25A to 25D. This maintains the cylinder 1800 sealed and allows the reservoir 1702 to be charged with supply air. The top dump valve chamber 2022 is pressurized and keeps the seal against the cylinder 1800. The bottom dump valve chamber 2024 is at atmospheric pressure. The passages internal to the valve disc 2014 and the valve screw 2020 are also at atmospheric pressure.

Figure 26B:
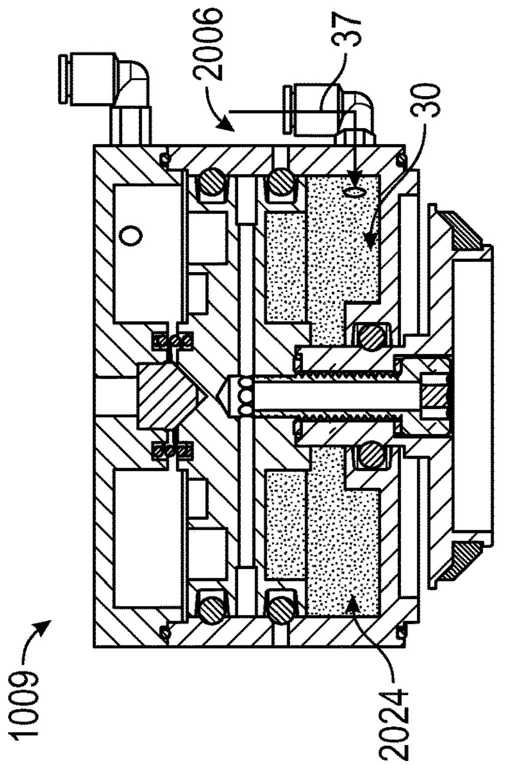
FIGS. 26A-26D show an operation of the dump valve of FIGS. 20A-20D in an opened position.
Figure 26D:
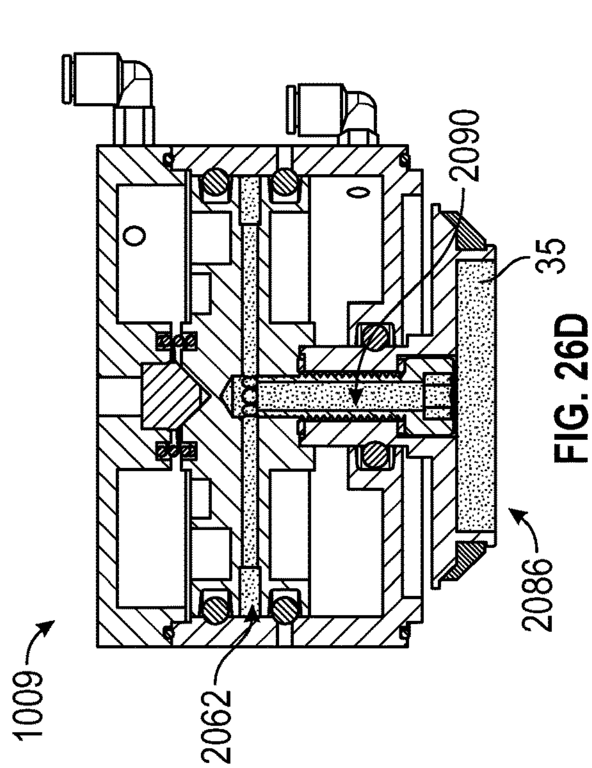
Figure 26A:
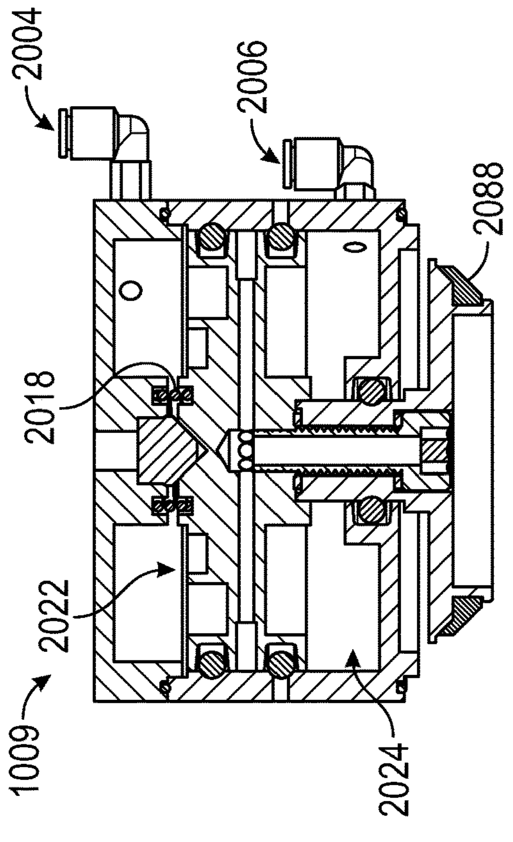

FIGS. 26A to 26D show an operation of the dump valve 1009 in an opened position. In the opened position, the dump valve spring 2018 is in a compressed position. In FIG. 26A, no fluid (e.g., no compressed air) is located within either the top dump valve chamber 2022 or the bottom dump valve chamber 2024. In FIG. 26B, compressed air 30 is provided to the bottom dump valve chamber 2024 via the bottom chamber flowpath 2006 as illustrated by the air flow 37. In the state illustrated in FIG. 26B, the top dump valve chamber 2022 is at atmospheric pressure. The passages internal to the dump valve disc 2014 and the dump valve screw 2020 are at atmospheric pressure.

Figure 26C:
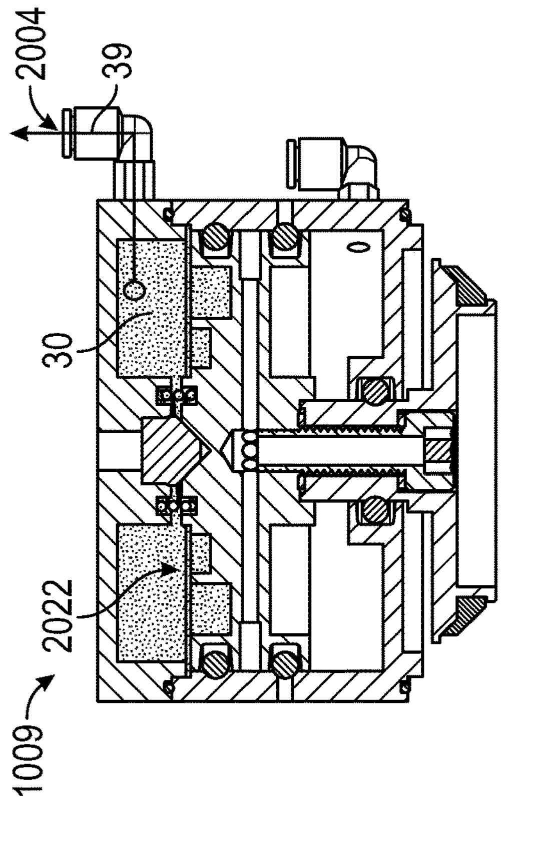

In FIG. 26C, air 30 in the top dump valve chamber 2022 is allowed to vent and flows through the top chamber flowpath 2004 as illustrated by air flow 39. In FIG. 26D, compressed air 35 from the cylinder 1800 is allowed to vent through the dump valve head driver pocket 2086, the passage 2090, the dump valve disc vent holes 2062, and the one or more vent holes 2042. The compressed air 35 does not vent in the configuration of FIG. 26C as the dump valve housing vent holes 2042 are blocked by the dump valve disc seals 2072. In FIGS. 26A-26C, the pressure of the supply air flow 37 is greater than atmospheric pressure such that the dump valve head 2016 moves up and allows supply air 30 into the cylinder 1800.

Figure 27B:
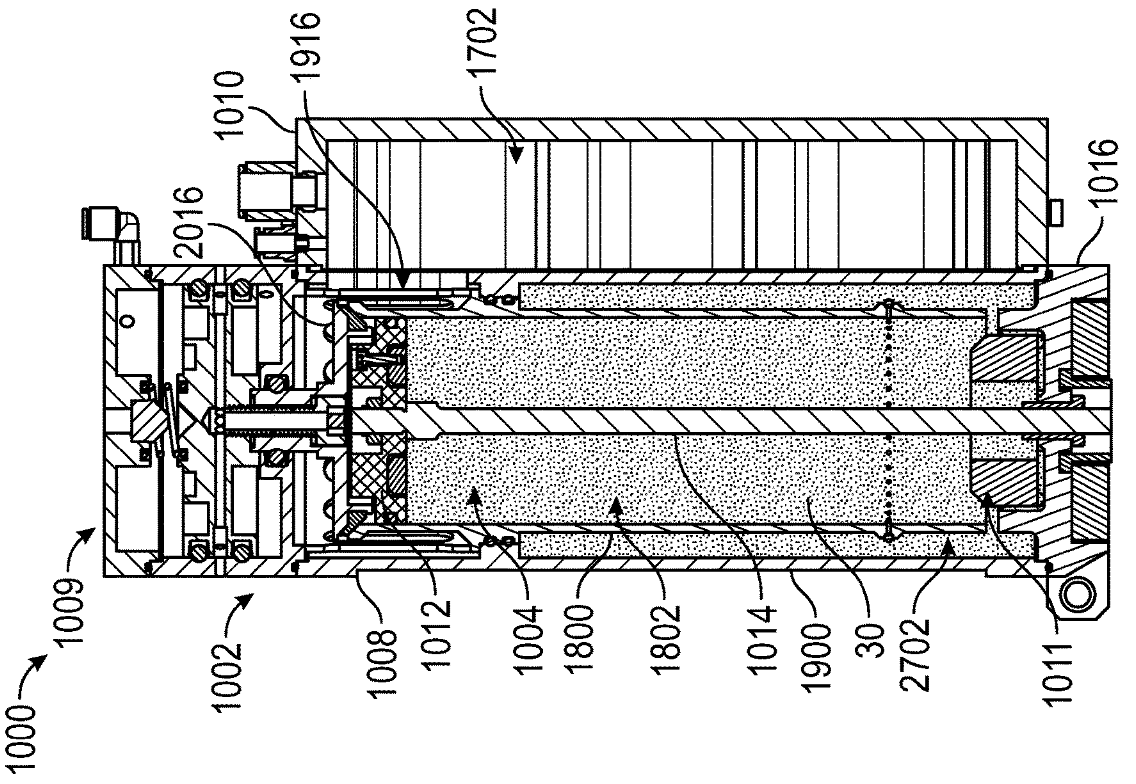
FIGS. 27A-27C show an operation of the drive assembly of FIGS. 11A and 11B at a top of an upstroke.
Figure 27A:
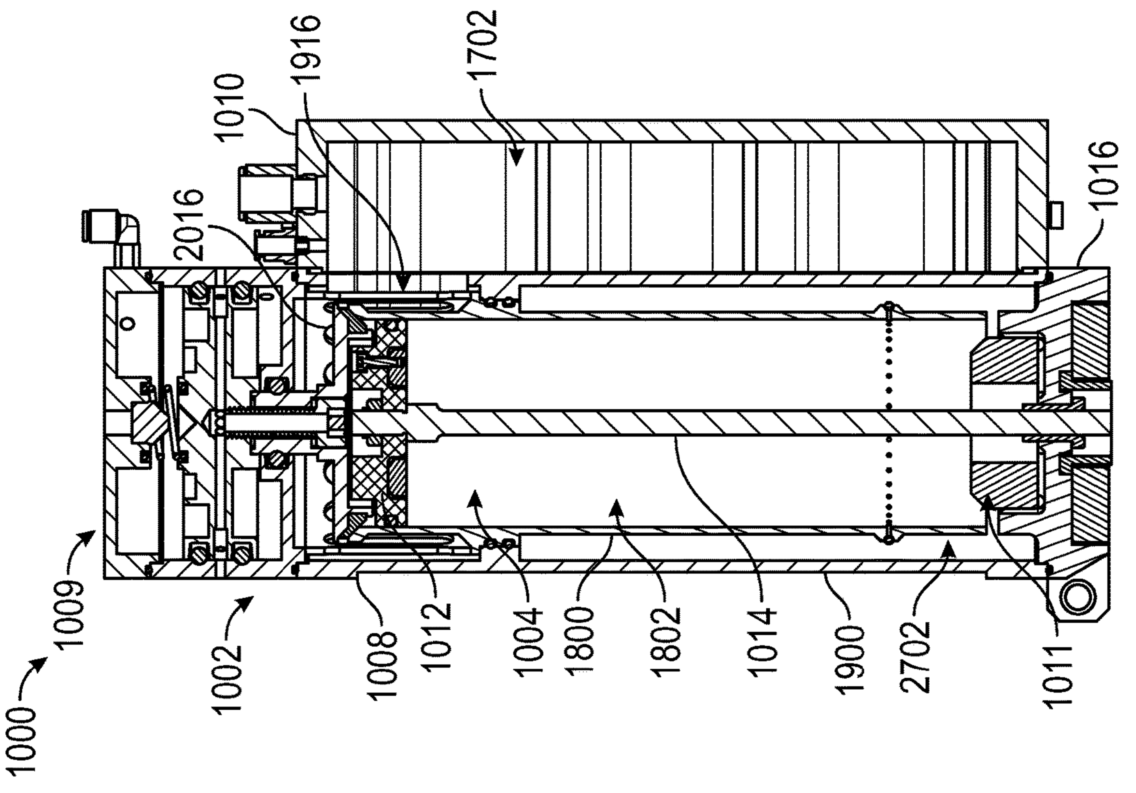
Figure 27C:
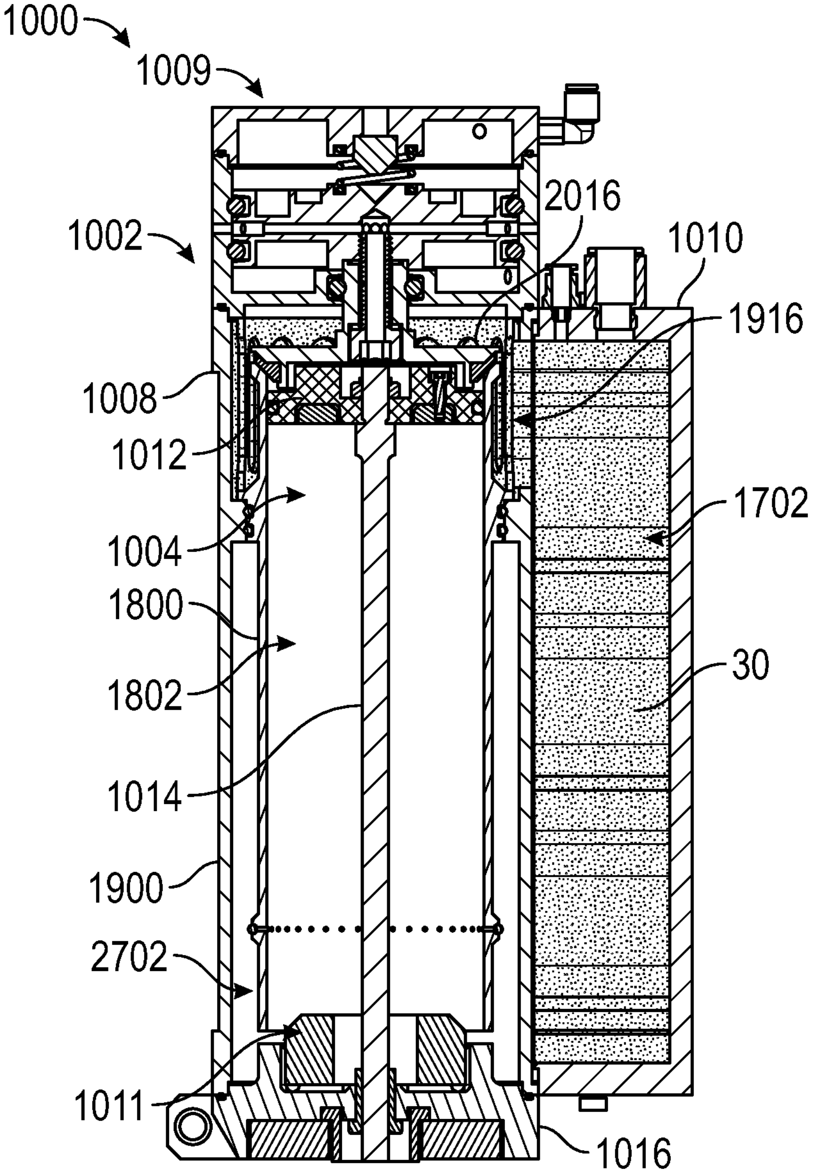

FIGS. 27A to 27C show an operation of the drive assembly 1002 for driving the hammer 1004 with the hammer 1004 at a top of an upstroke. In FIGS. 27A to 27C, the dump valve 1009 is closed as described with respect to FIGS. 25A to 25D. A spring chamber 2702 is defined between the main housing 1900 and the cylinder 1800. FIG. 27B illustrates that the spring chamber 2702 and the cylinder bore 1802 are at atmospheric pressure and FIG. 27C illustrates that the reservoir 1702 is at the supply pressure. With the dump valve 1009 closed, the hammer 1004 does not move, but the cylinder 1800 is in a sealed condition.

Stated another way, in FIGS. 27A to 27C, the bottom dump valve chamber 2024 of the dump valve 1009 is at atmospheric pressure, the top dump valve chamber 2022 of the dump valve 1009 is at supply pressure, the dump valve disc 2014 is at atmospheric pressure, the spring chamber 2702 and the cylinder chamber or cylinder bore 1802 are at atmospheric pressure, and the reservoir 1702 is at supply pressure.

Figure 28B:
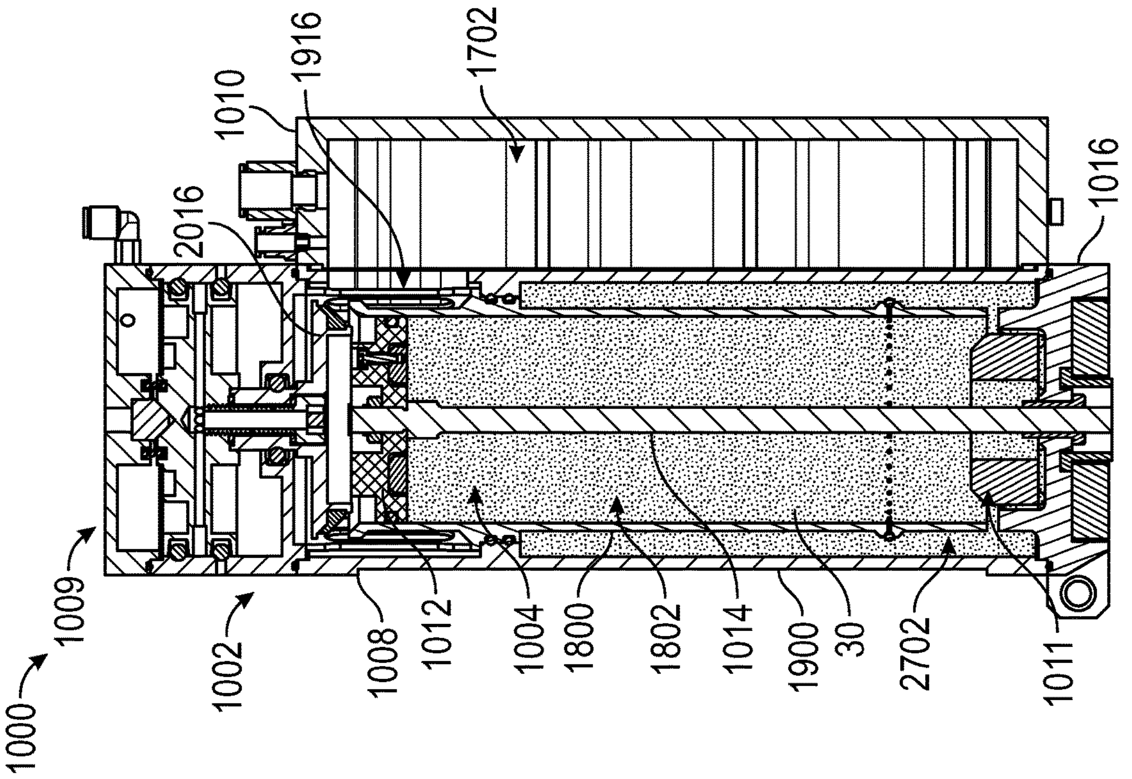
FIGS. 28A-28C show an operation of the drive assembly of FIGS. 11A and 11B at a beginning of a downstroke.
Figure 28A:
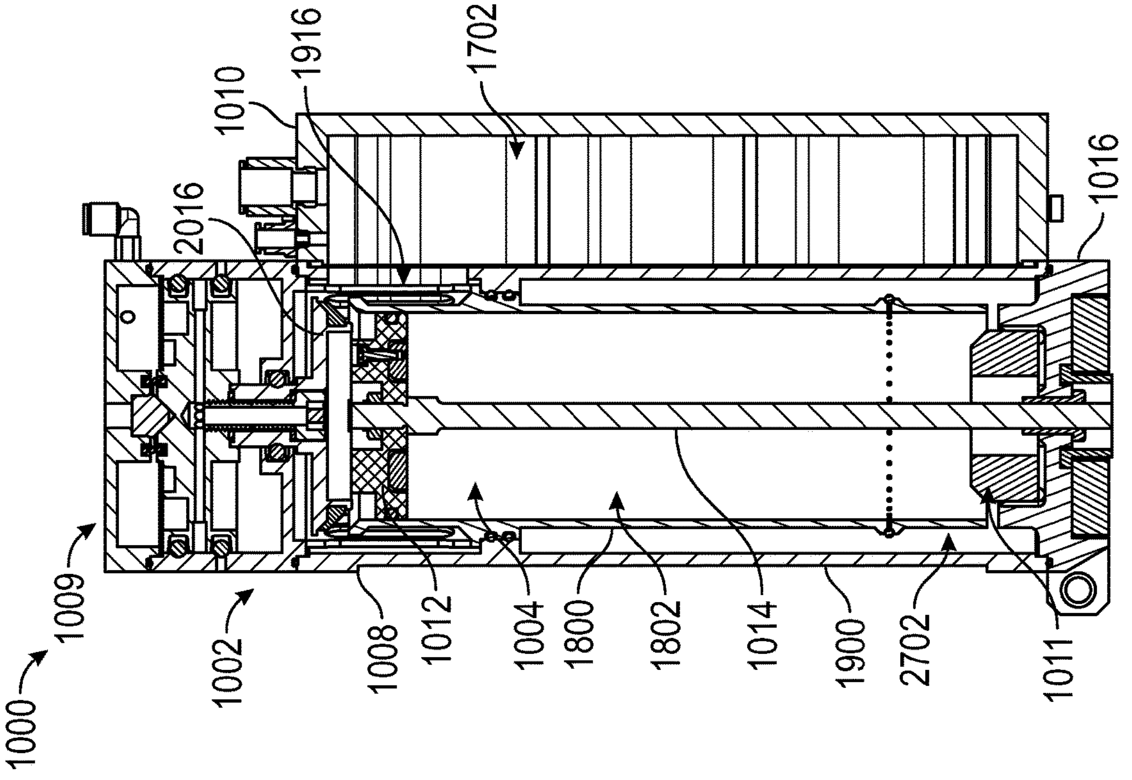
Figure 28C:
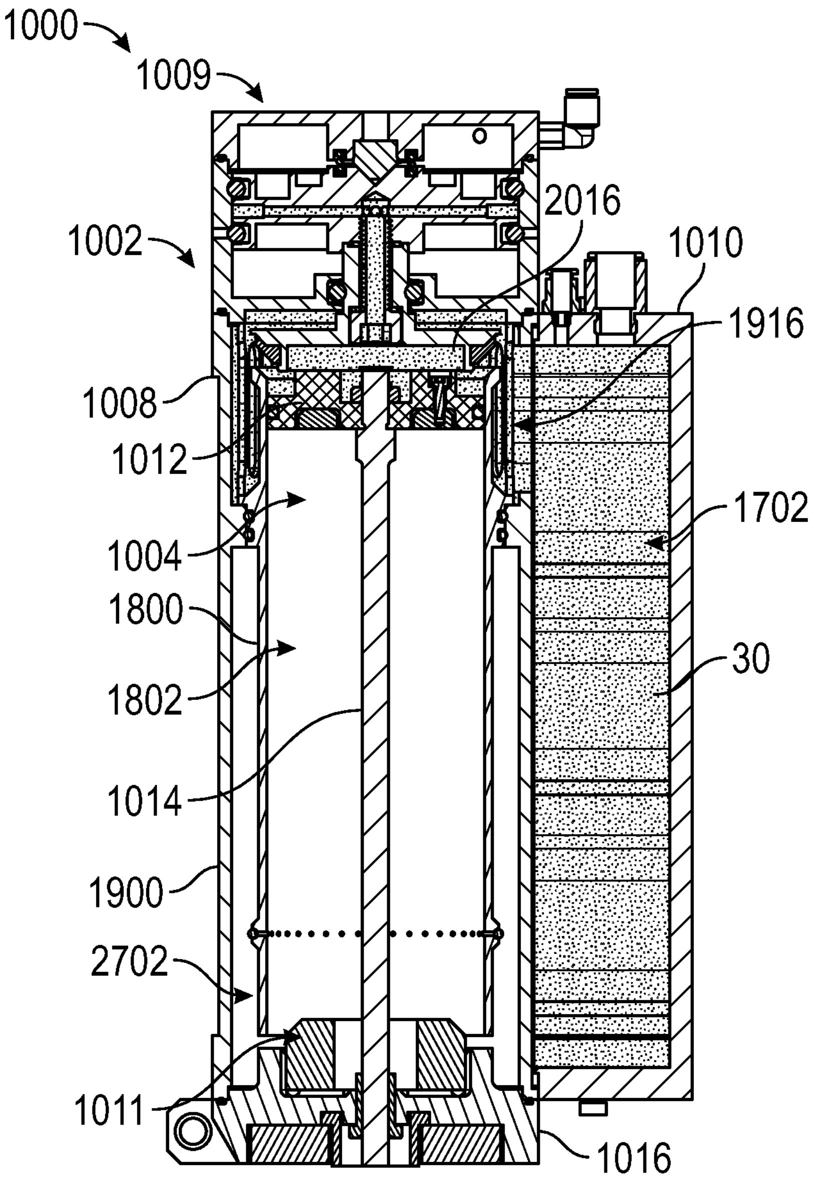

FIGS. 28A to 28C show an operation of the drive assembly 1002 for driving the hammer 1004 at a beginning of a downstroke. In FIGS. 28A to 28C, the dump valve 1009 is open as described in FIGS. 26A to 26D. FIG. 28B illustrates that the spring chamber 2702 and cylinder bore 1802 are at atmospheric pressure and FIG. 28C illustrates that the reservoir 1702 is at supply pressure. Since the dump valve 1009 is opened (e.g., the dump valve head 2016 is off of the cylinder 1800), there is a large pressure differential on either side of hammer head 1012. The pressure differential thus forces the hammer 1004 downward to begin the downstroke.

Stated another way, in FIGS. 28A to 28C, the bottom dump valve chamber 2024 of the dump valve 1009 is at supply pressure, the top dump valve chamber 2022 of the dump valve 1009, the spring chamber 2702, and the cylinder chamber 1802 are all at atmospheric pressure. The dump valve disc 2014 is at supply pressure with the reservoir 1702 such that a large pressure differential exists on either side of the hammer head 1012 to extend the hammer 1004.

Figure 29B:
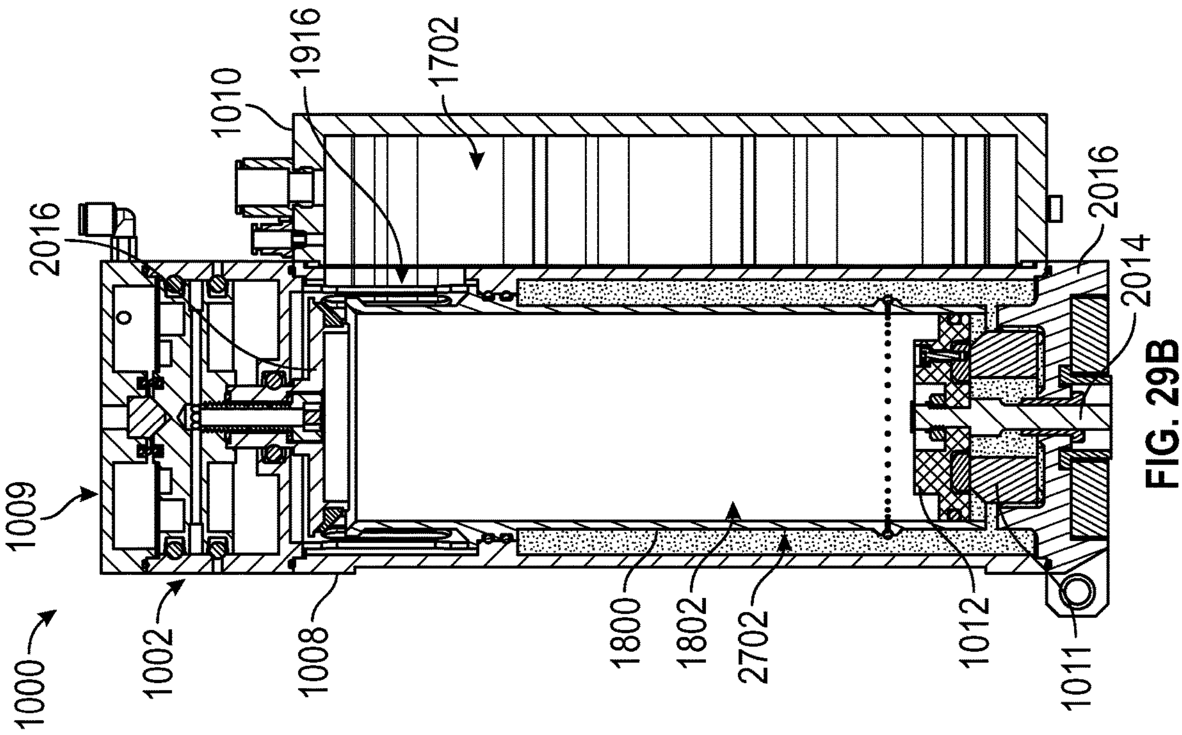
FIGS. 29A-29C show an operation of the drive assembly of FIGS. 11A and 11B at an end of a downstroke.
Figure 29A:
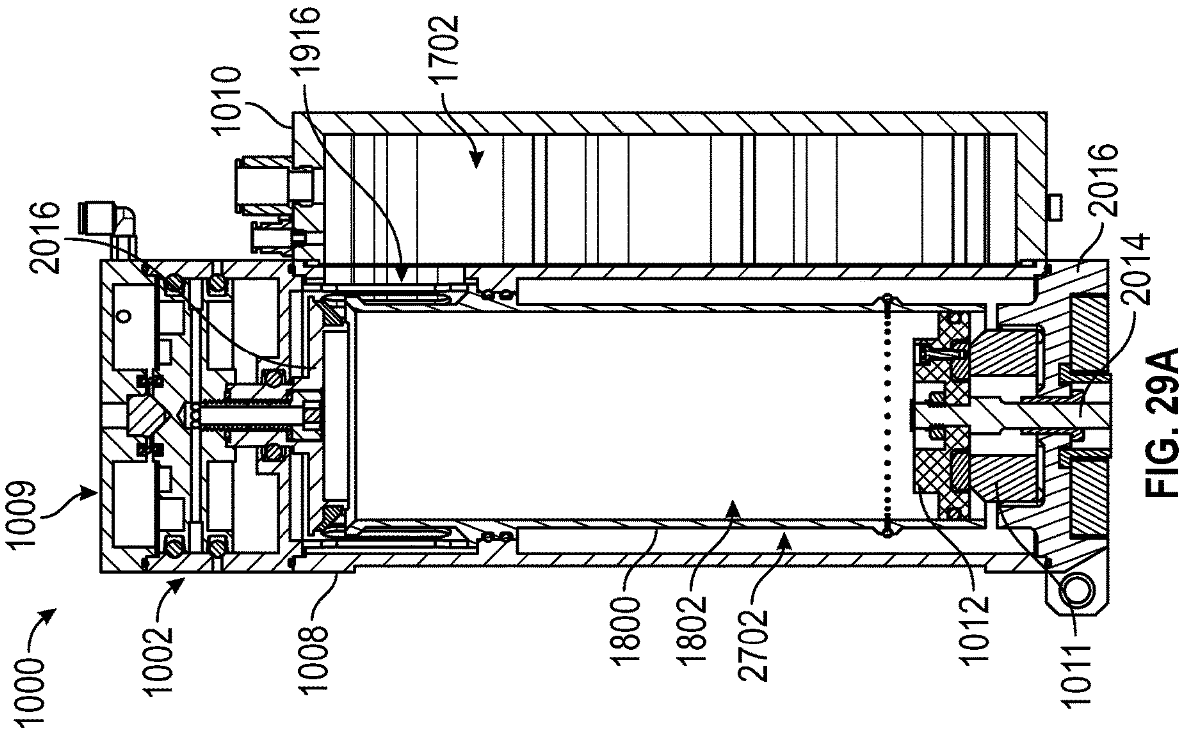
Figure 29C:
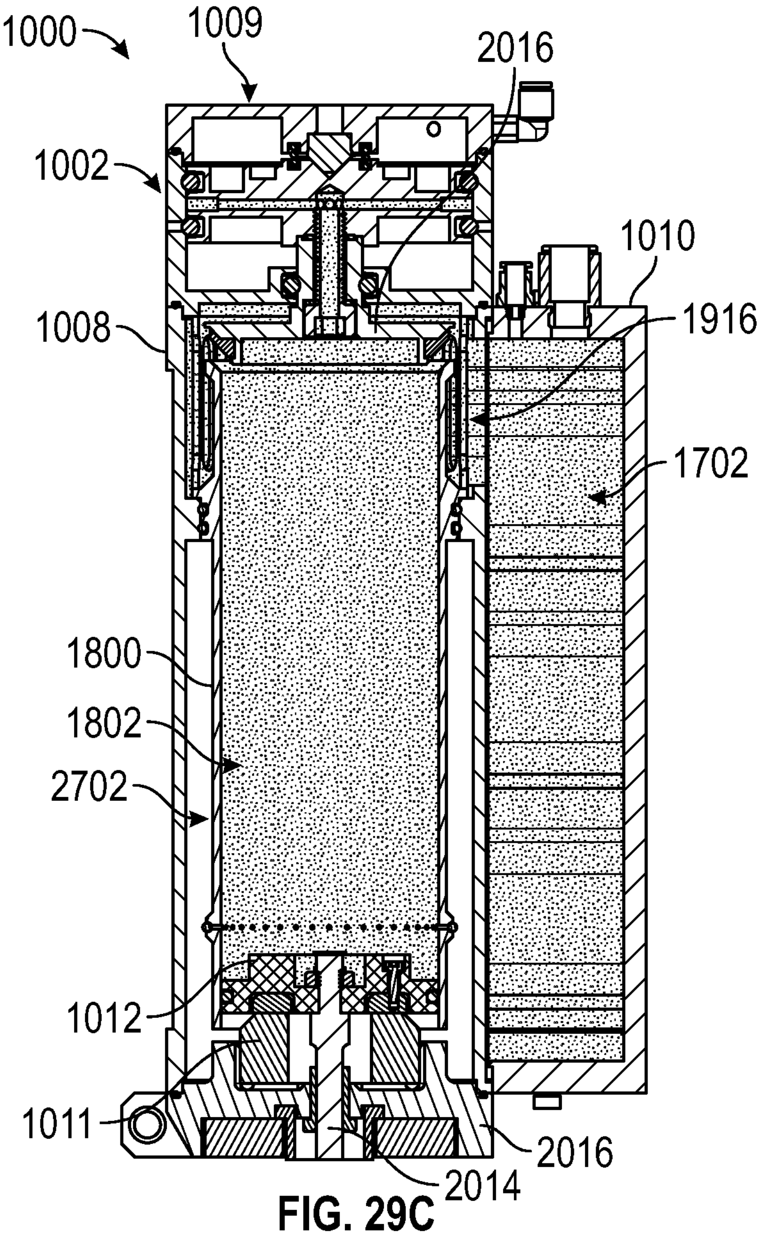

FIGS. 29A to 29C show an operation of the drive assembly 1002 for driving the hammer 1004 at an end of the downstroke. In FIGS. 29A to 29C, the dump valve 1009 is still open. As compared to FIGS. 28A to 28C, the hammer 1004 has now been driven downward. The hammer head 1012 contacts the bumper 1011 and the impact end 1013 of the hammer rod 1014 (FIG. 11A) has contacted a nail 10 to drive the nail 10 into a substrate, structure, workpiece, work surface, etc. The spring chamber 2702 and the cylinder bore 1802 are charged by the hammer 1004 motion. This moves the supply air 30 into the spring chamber 2702 (FIG. 29B) such that the spring chamber 2702 is at the supply pressure. The cylinder bore 1802 receives the supply air 30 from the reservoir 1702 (through the main housing opening 1916) such that cylinder bore 1802 is at supply pressure (FIG. 29C).

In other words, FIGS. 29A to 29C illustrate a condition when the nail has been fully driven by the nail gun 1000. In FIGS. 29A to 29C, the bottom dump valve chamber 2024 of the dump valve 1009 is at supply pressure and the top dump valve chamber 2022 of the dump valve is at atmospheric pressure. The spring chamber 2702 and the cylinder bore 1802 are charged by the hammer 1004 motion and are supplied with pressure. The cylinder chamber 1802 is now also at supply pressure, along with the dump valve disc 2014 and the reservoir 1702.

Figure 30B:
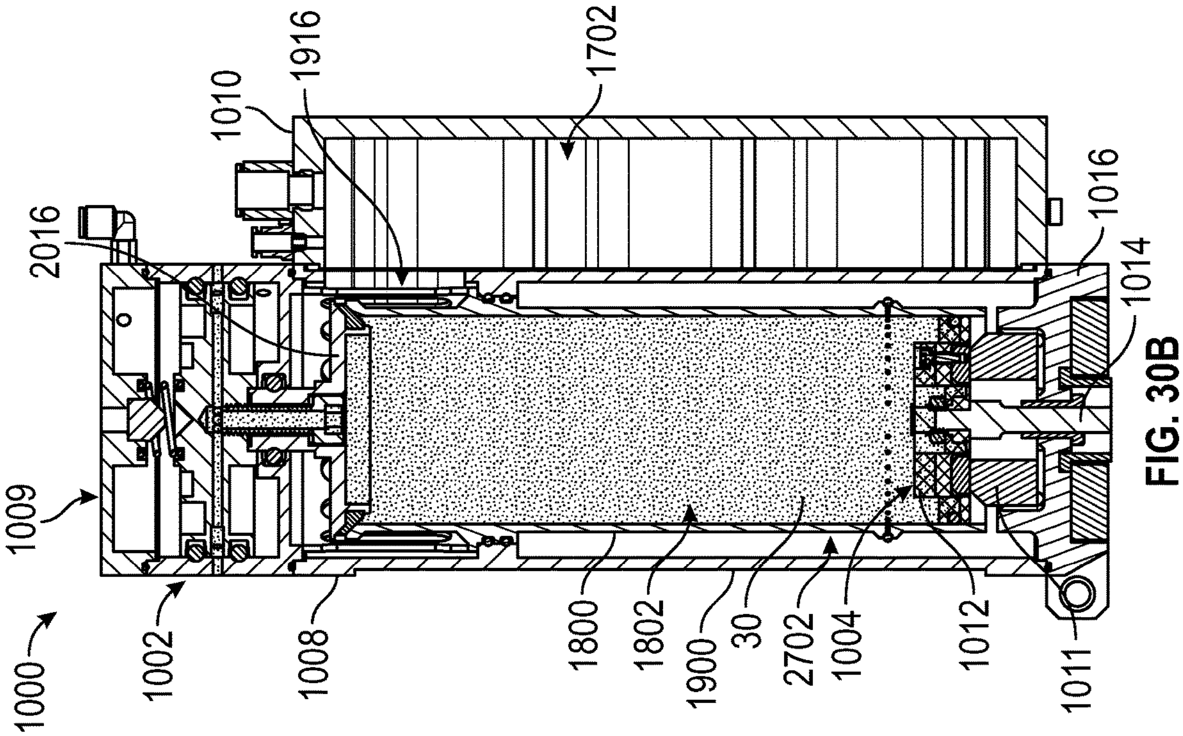
FIGS. 30A-30D show an operation of the drive assembly of FIGS. 11A and 11B at beginning of an upstroke.
Figure 30A:
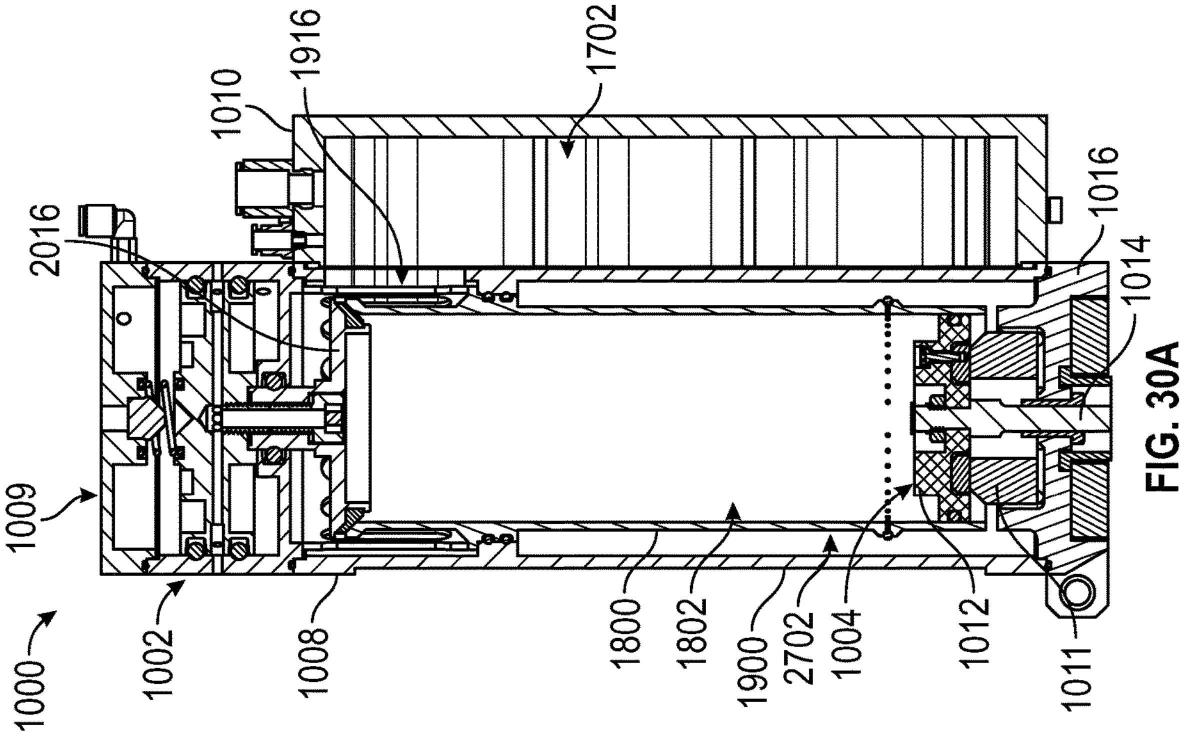
Figure 30D:
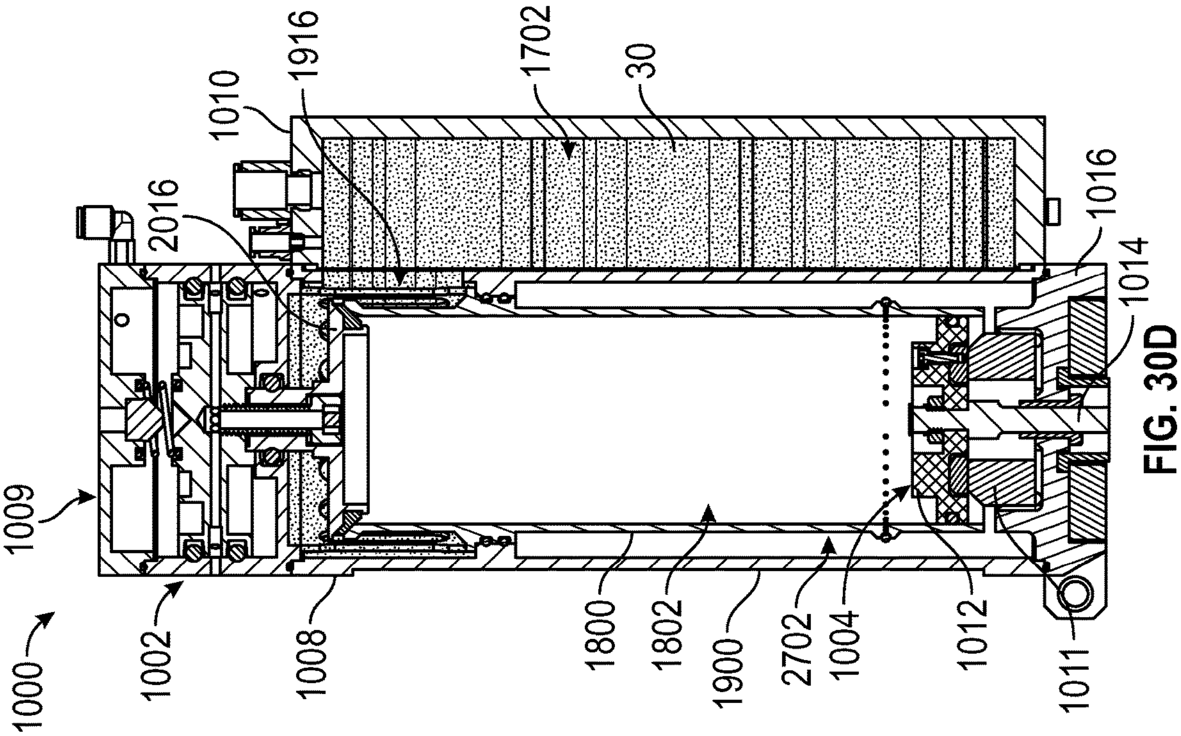
Figure 30C:
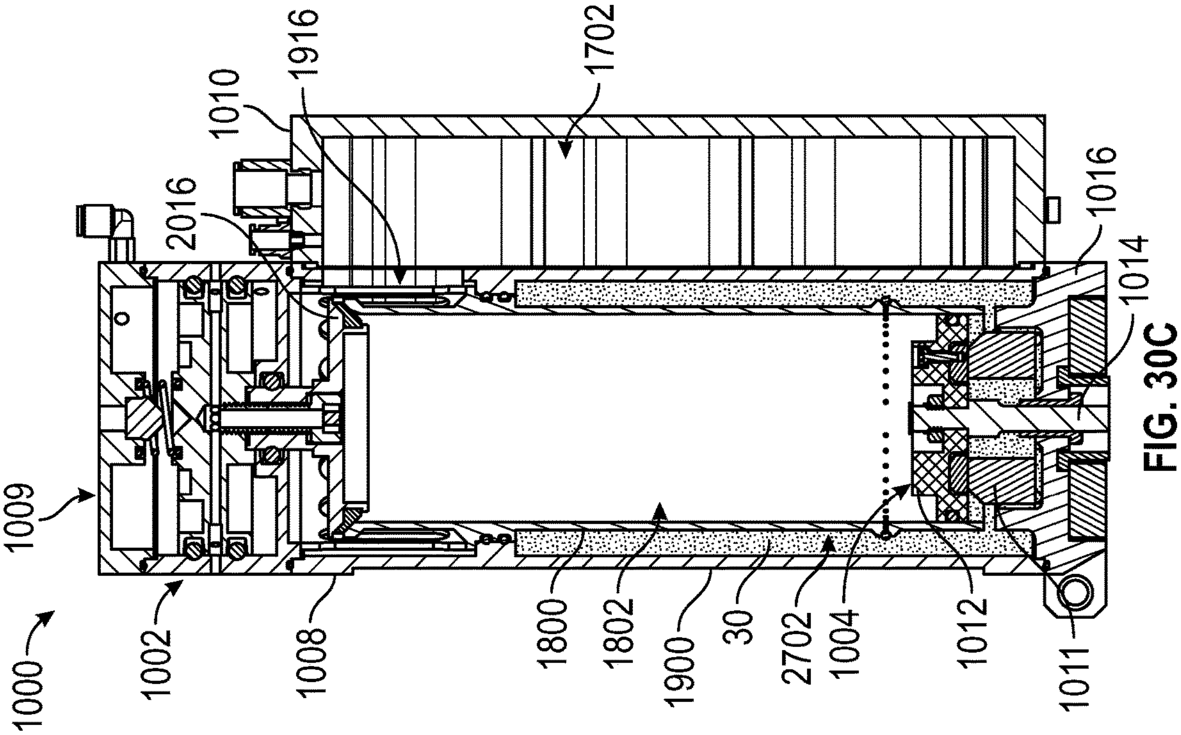

FIGS. 30A to 30D show an operation of the drive assembly 1002 for driving the hammer 1004 at a beginning of an upstroke. In FIGS. 30A to 30D, the dump valve is moved to the closed position and the pressurized air in assembly is vented. In FIGS. 30A to 30D, the dump valve 1009 closes as described with respect to FIGS. 25A to 25D. The cylinder bore 1802 is at atmospheric pressure (FIG. 30B). The spring chamber 2702 and the reservoir 1702 are at supply pressure such that there is a large pressure differential on the hammer head 1012. The pressure differential causes the hammer 1004 to retract (e.g., move upward within the cylinder bore 1802; FIGS. 30C and 30D).

That is, the bottom dump valve chamber 2024 of the dump valve 1009 is at atmospheric pressure, the top dump valve chamber 2022 of the dump valve 1009 is at supply pressure, and the dump valve disc 2014 and cylinder bore 1802 are both at atmospheric pressure. The spring chamber 2702 is at supply pressure and the pressure differential on either side of the hammer head 1012 causes the hammer 1004 to retract. The reservoir 1702 is at supply pressure.

Accordingly, FIGS. 27A to 30D illustrate a stroke of the nail gun 100 (FIG. 10) to drive a nail into a substrate. First, cylinder 1800 is sealed (FIGS. 27A to 27C), then the dump valve 1009 is opened and the supply pressure is provided from the reservoir 1702 to drive the hammer 1004 (which in turn drives the nail; FIGS. 28A to 28C). After the hammer 1004 (and, thus, the nail) has been driven (FIGS. 19A to 29C), the nail gun 1000 is vented (FIGS. 30A to 30D). The cycle is then repeated as necessary to drive further nails into the substrate.

FIGS. 31 to 41 show various aspects of another example embodiment of a nail gun 3100 having a feed head assembly 3106 that is similar to that which is shown in FIG. 1, except that the feed head assembly 3106 of this example embodiment is provided with nails 10 attached together to form a coil or a magazine 14, meaning that the nails 10 are attached to each other until being driven out of the feed head assembly 3106 by a hammer 3104.

Figure 31:
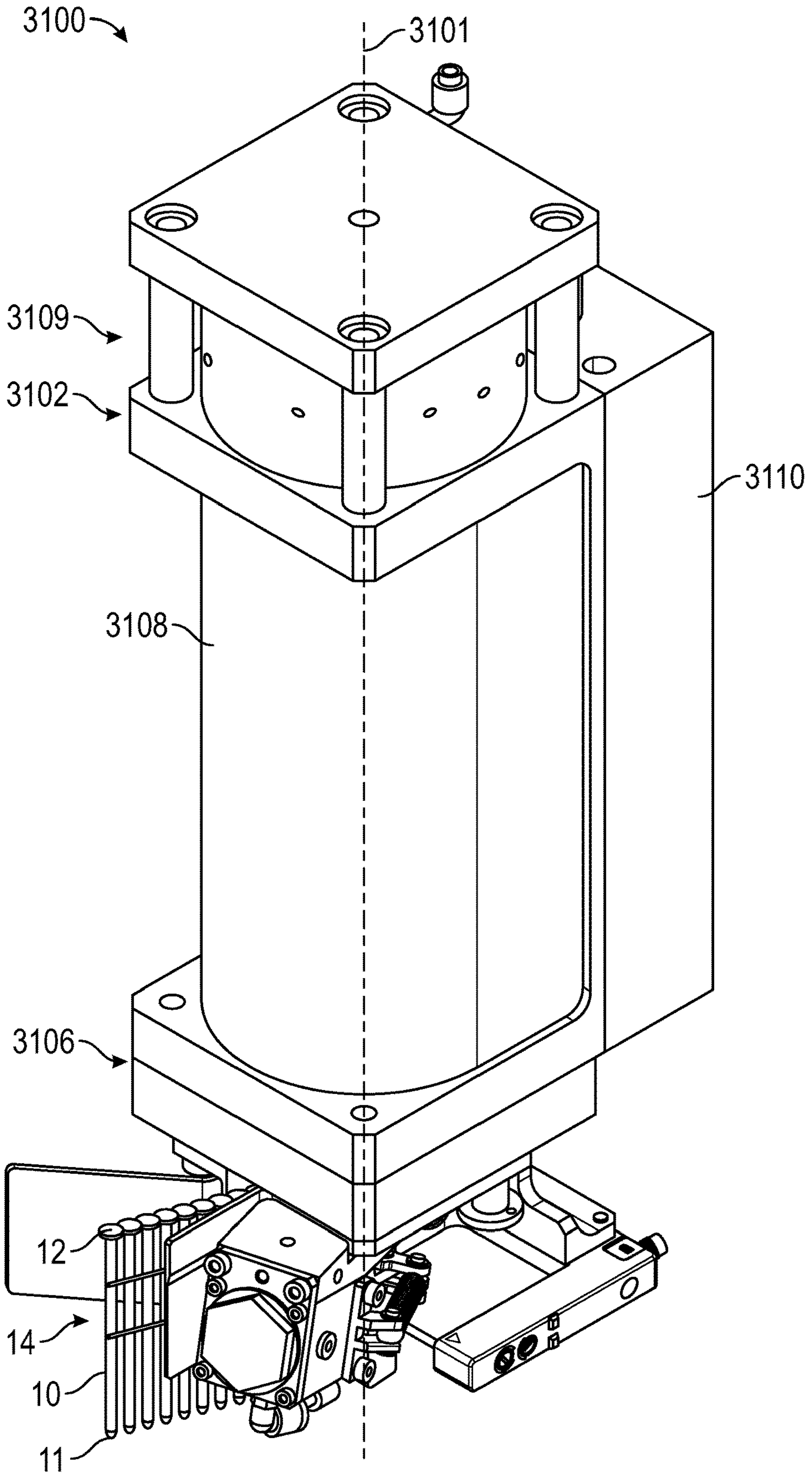
FIG. 31 is an isometric view of another example embodiment of nail gun having a feed head assembly.

Unless described otherwise herein, the components of the nail gun 3100 and the method of operation of the nail gun 3100 shown in FIG. 31 is substantially similar to the nail gun 100 shown in FIG. 1 and the nail gun 1000 shown in FIG. 10. Similar reference numerals will be used for components of the nail gun 3100 that are the same as or similar to the components of the nail gun 100 and the nail gun 1000, discussed above. The description of these components above also applies to this embodiment, and a detailed description of these components is omitted here.

Figure 32A:
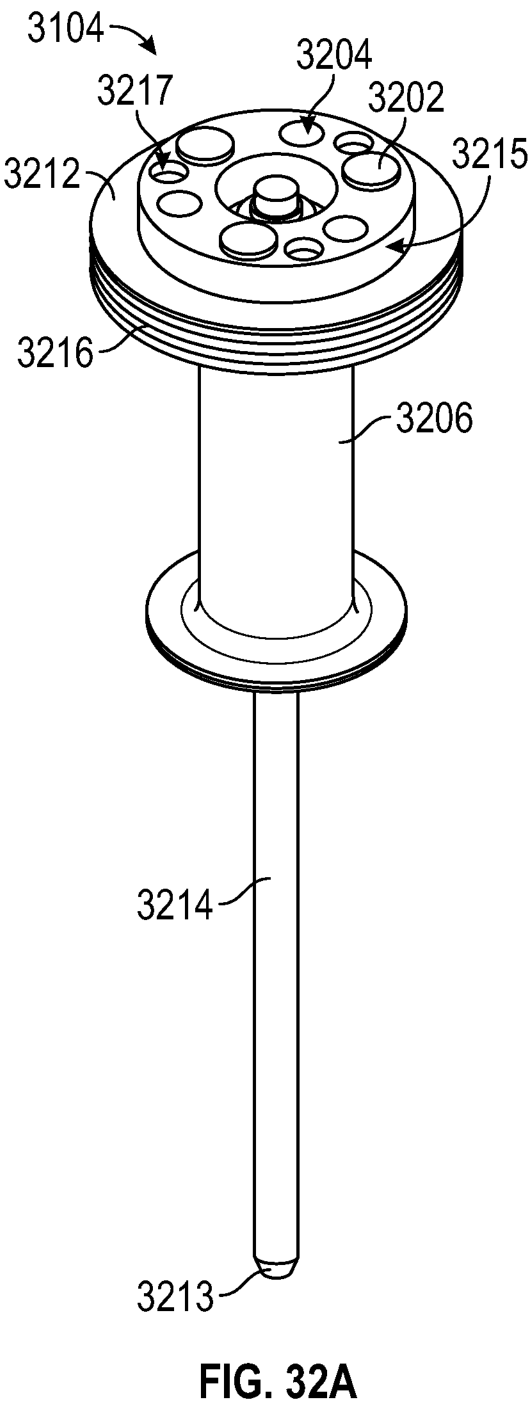
FIGS. 32A and 32B are isometric views of a drive assembly for the nail gun of FIG. 31.
Figure 32B:
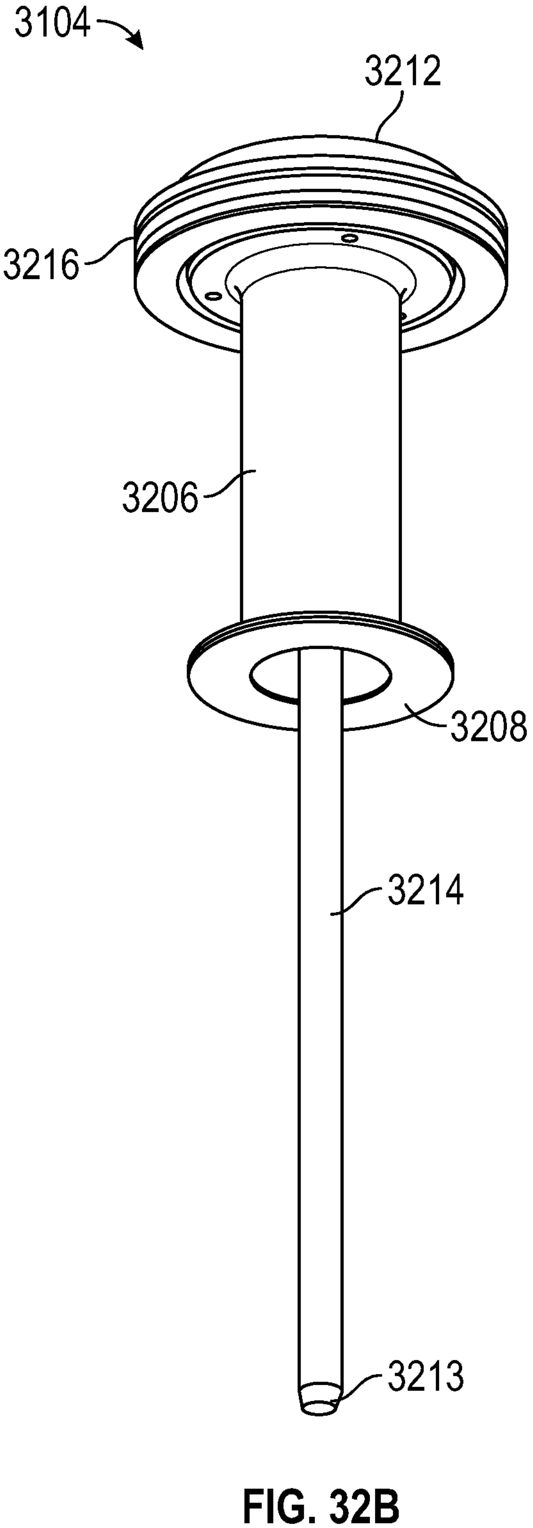

The nail gun 3100 has a longitudinal axis 3101. The nail gun 3100 includes a drive assembly 3102, a hammer 3104, a feed head assembly 3106, a drive motor 3108, a dump valve 3109, and a controller, also referred to as a reservoir assembly 3110. The hammer 3104 includes a hammer head 3212, an impact end 3213, a hammer rod 3214, and a seal 3216. As shown in FIGS. 32A and 32B, the hammer 3104 includes a cylindrical component 3215 having one or more hammer bumpers 3202, one or more wrench holes 3204, and one or more fastener holes 3217. The hammer 3104 includes a collar 3206 and a strike surface 3208. The function of the aforementioned components is the same as described with respect to FIGS. 10 to 11B and is not repeated herein.

With continued reference to FIGS. 33A to 36, the feed head assembly 3106 includes a base plate 3316 that attaches in a sealed manner to the drive assembly 3102 of the nail gun 3100. The base plate 3316 has, on an upper surface thereof, a mating flange 3318 that extends at least partially into the drive assembly 3102 and seals against the bottom surface of the drive assembly 3102 with a main housing seal 3319. The mating flange 3318 has a bumper 3311, which is configured to absorb impacts at the end of the hammer stroke and during dry fires. The bumper 3311 has a hammer hole 3320 formed therethrough (e.g., in the direction of the longitudinal axis 3101), through which the hammer rod 3214 extends when driving a nail 10 out of the feed head assembly 3106. The feed head assembly 3106 includes a drive segment 3130, also referred to herein as an output segment 3130.

The feed head assembly 3106 includes a guide assembly 3322. The guide assembly 3322 includes a guide plate 3728 for guiding the nail coil or nail magazine 14. The feed head assembly 3106 includes a feed cylinder assembly 3324 and a sensor assembly 3376. The sensor assembly 3376 includes a beam sensor 3372, a sensor bracket 3370, and a sensor beam 3378, which is described in more detail to follow.

Figure 37:
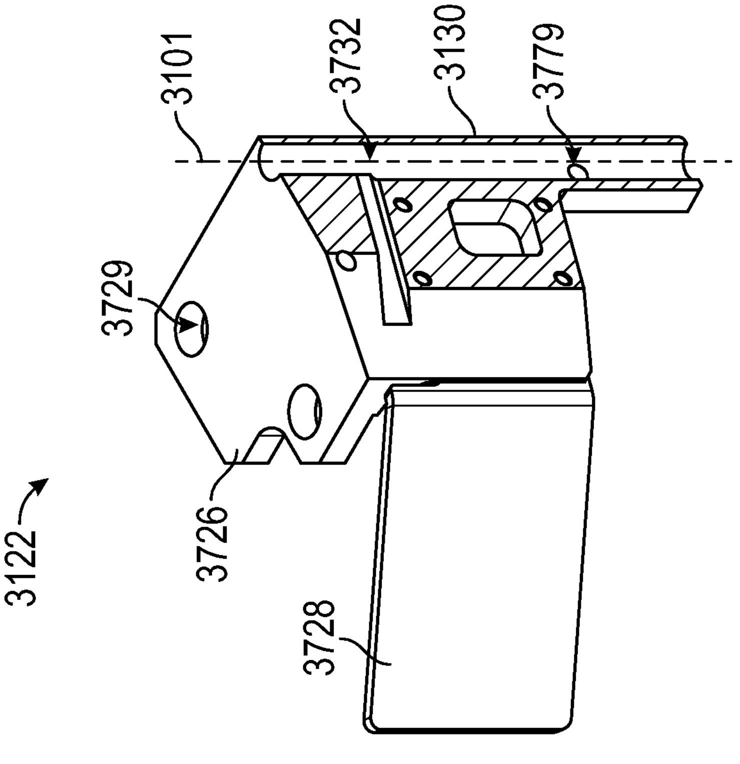
FIG. 37 is an isometric view of a guide assembly of the feed head assembly of FIGS. 33A and 33B.

FIG. 37 illustrates the guide assembly 3322. The guide assembly 3322 includes the guide plate 3728, a bracket 3726, one or more base plate mounting holes 3729. The guide assembly 3122 is integral with or coupled to the drive segment 3130. The drive segment 3130 includes a bore 3732 for receiving the nail to be driven. The drive segment 3130 includes one or more beam holes 3779.

Figure 38:
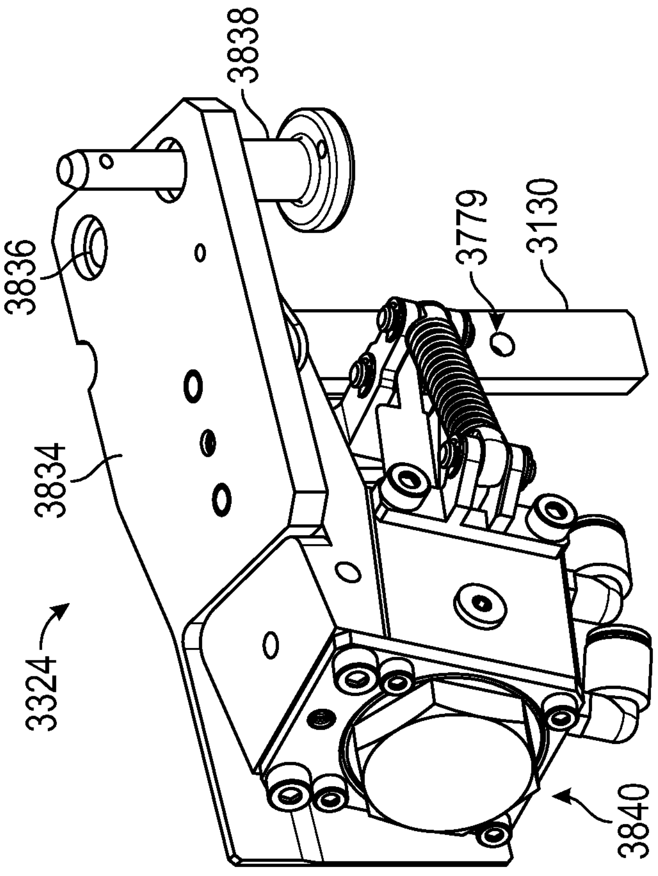
FIG. 38 is an isometric view of a guide plate of the feed head assembly of FIGS. 33A and 33B.

FIG. 38 illustrates the feed cylinder assembly 3324. The feed cylinder assembly 3324 includes a mounting bracket 3834 having a bushing 3836 to allow for pivoting movement of the feed cylinder assembly 3324. The feed cylinder assembly 3324 includes a pivot lock pin 3838. The feed cylinder assembly 3324 includes a feed actuator 3840.

Figure 39:
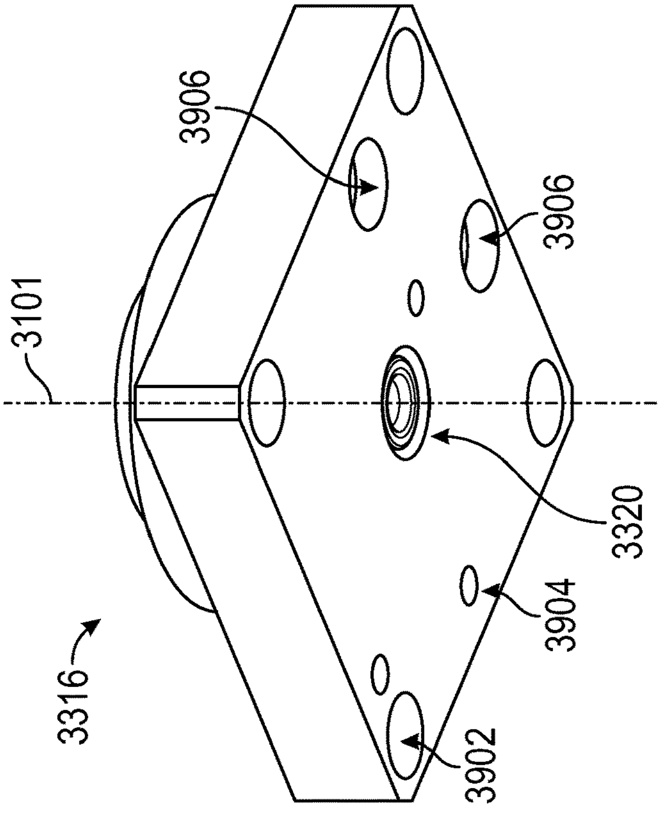
FIG. 39 is an isometric view of a base plate of the feed head assembly of FIGS. 33A and 33B.

FIG. 39 illustrates the base plate 3316 having one or more main housing mounting holes 3902, one or more guide assembly mounting holes 3904, and one or more bushings 3906 to receive one or more pivot lock pins 3838. The one or more main housing mounting holes 3902 align with mounting holes on the main housing (e.g., similar to main housing 1900 of FIG. 19) for securing thereto. The one or more guide assembly mounting holes 3904 align with the one or more base plate mounting holes 3729 of the guide assembly 3322 for securing thereto.

As illustrated in FIG. 39, the hole pattern of the one or more main housing mounting holes 3902 is rectangular. In this manner, the main housing mounting holes 3902 allow for the base plate 3316 to align with the drive motor 3108 at zero degrees, 90 degrees, 180 degrees, or 270 degrees about the longitudinal axis 1001. The hole pattern thus allows for flexibility in assembly and installation of the nail gun 3100.

Figure 40:
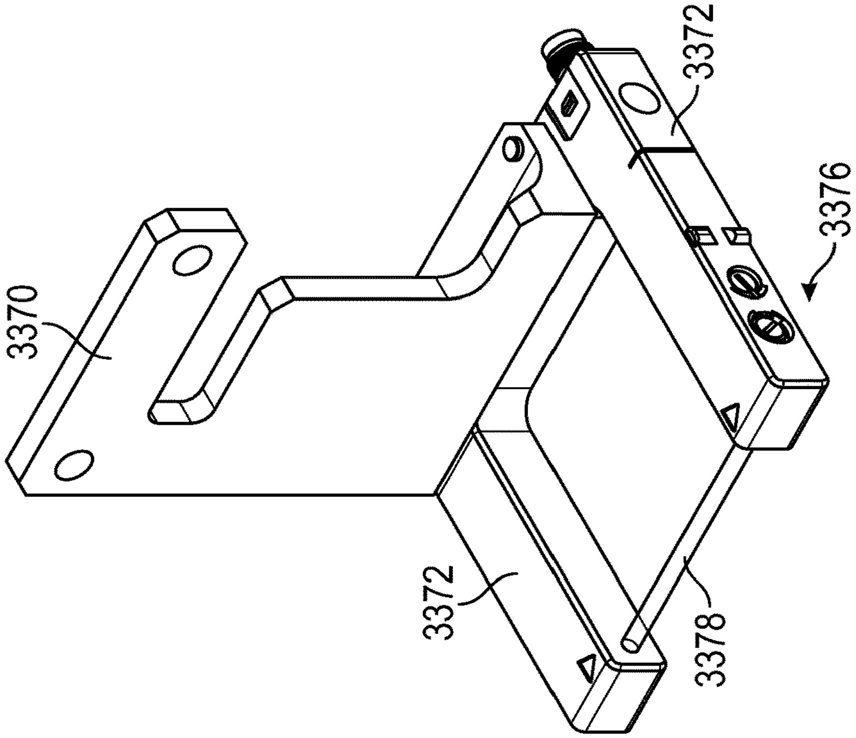
FIG. 40 is an isometric view of a sensor of the nail gun of FIGS. 33A and 33B.

FIG. 40 illustrates the sensor assembly 3376. As noted previously, the sensor assembly includes beam sensors 3372, a sensor beam 3378, and a sensor bracket 3370. The sensor bracket 3370 mounts the sensor assembly 3376 to the base plate 3316.

Figure 41:
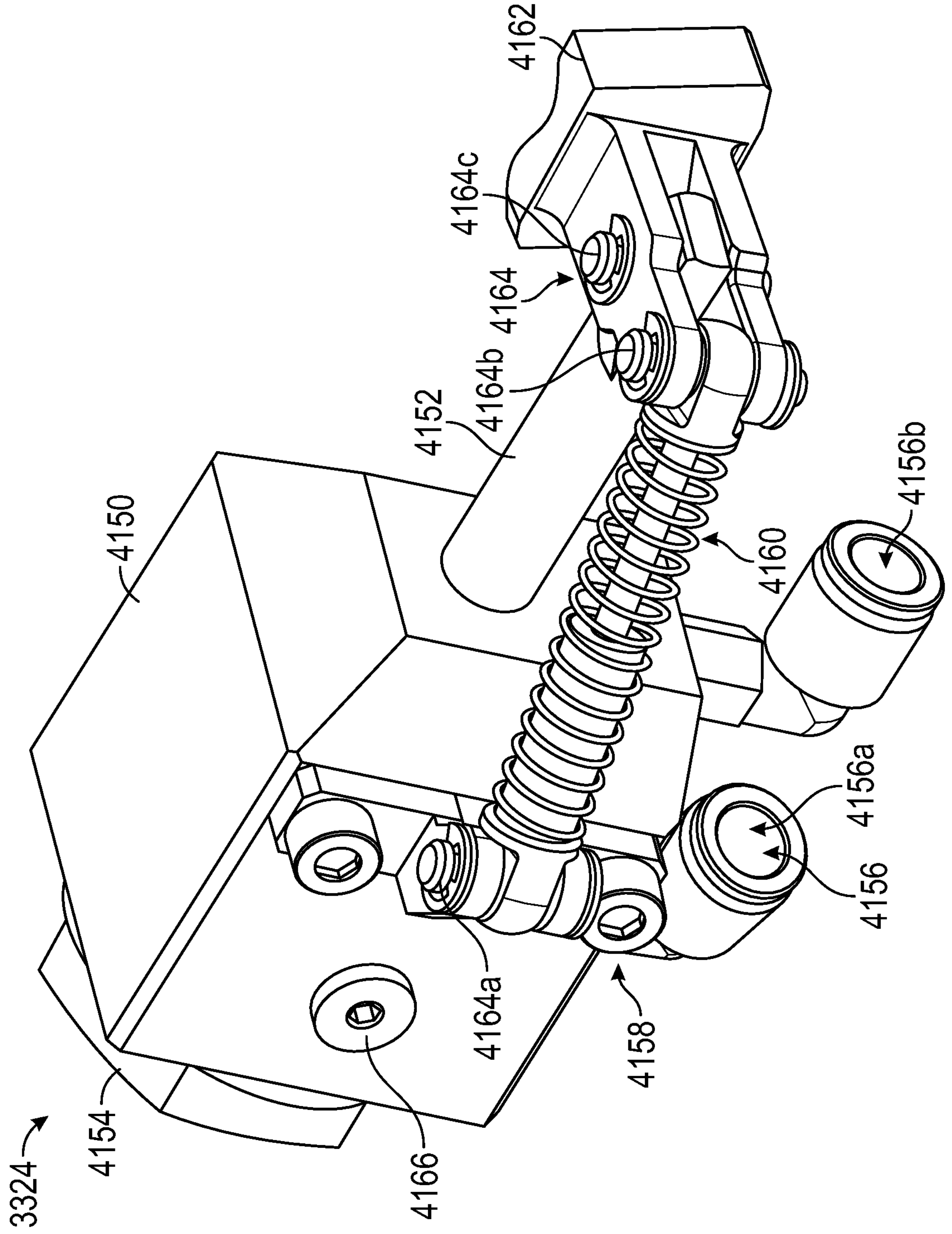
FIG. 41 is an isometric view of a feed cylinder assembly of the feed head assembly of FIGS. 33A and 33B.

FIG. 41 illustrates the feed actuator or feed cylinder assembly 3324. The feed cylinder assembly 3324 includes a feed actuator cylinder body 4150, a feed actuator cap 4154, and a feed actuator plug 4166. The feed cylinder assembly 3324 includes a feed actuator cylinder rod 4152 and a feed actuator shock assembly 4160. The feed actuator shock assembly 4160 includes a shock bracket 4158, a plurality of pivot pins 4164, and a plurality of air inlets 4156. The plurality of pivot pins 4164 includes a first pivot pin 4164*a* coupling the shock assembly 4160 to the cylinder body 4150, a second pivot pin 4164*b* coupling the shock assembly 4160 to a push arm 4162, and a third pivot pin 4164*c* coupling the cylinder rod 4152 to the push arm 4162. The plurality of air inlets 4156 includes a cylinder rod extension air inlet 4156*a* and a cylinder rod retraction air inlet 4156*b*.

Figure 42:
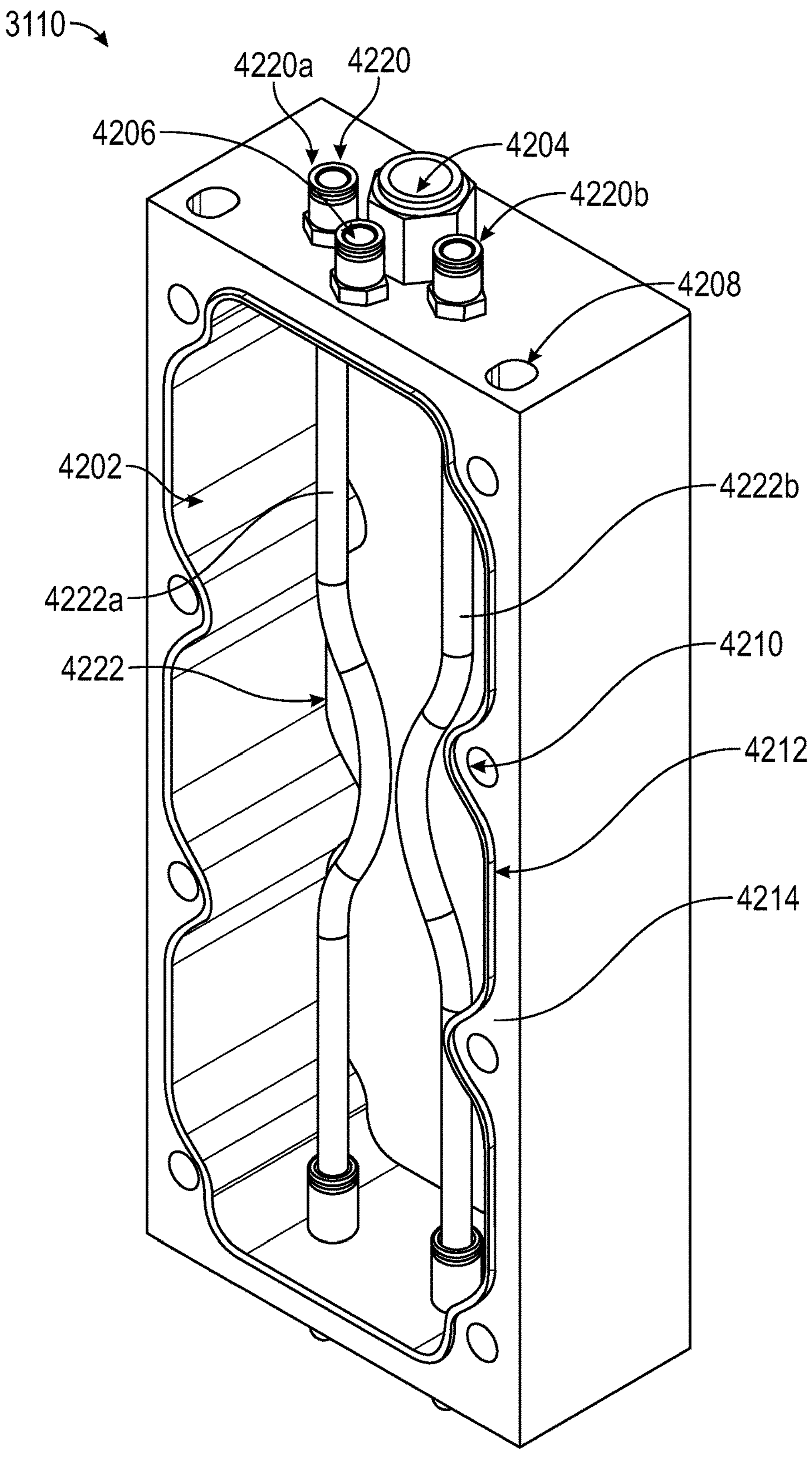
FIG. 42 is an isometric view of a reservoir assembly for the nail gun of FIG. 31.

FIG. 42 is a perspective view of the reservoir assembly 3110 isolated from the nail gun 3100, according to the present disclosure. The reservoir assembly 3110 includes a reservoir 4202, a supply air inlet 4204, a supply air outlet 4206, and a plurality of air inlets 4220. The plurality of air inlets 4220 include a first air inlet 4220*a* from a secondary solenoid valve (not depicted) and a second air inlet 4220*b* from the secondary solenoid valve. The reservoir assembly 3110 includes one or more first reservoir mounting slots 4208, one or more second reservoir mounting slots 4210, a gasket rim 4212, and a gasket sealing surface 4214. The reservoir assembly 3110 includes a plurality of transfer tubes 4222. The plurality of transfer tubes include a first transfer tube 4222*a* coupling the first air inlet 4220*a* to retract the nail feed cylinder and a second transfer tube 4222*b* coupling the second air inlet 4220*b* to extend the nail feed cylinder. During operation of the nail gun 3100, compressed air is supplied to the reservoir 4202 via the supply air inlet 4204 from a primary solenoid valve, as discussed with respect to FIGS. 10 to 30, to drive a nail into a work surface.

Figure 43:
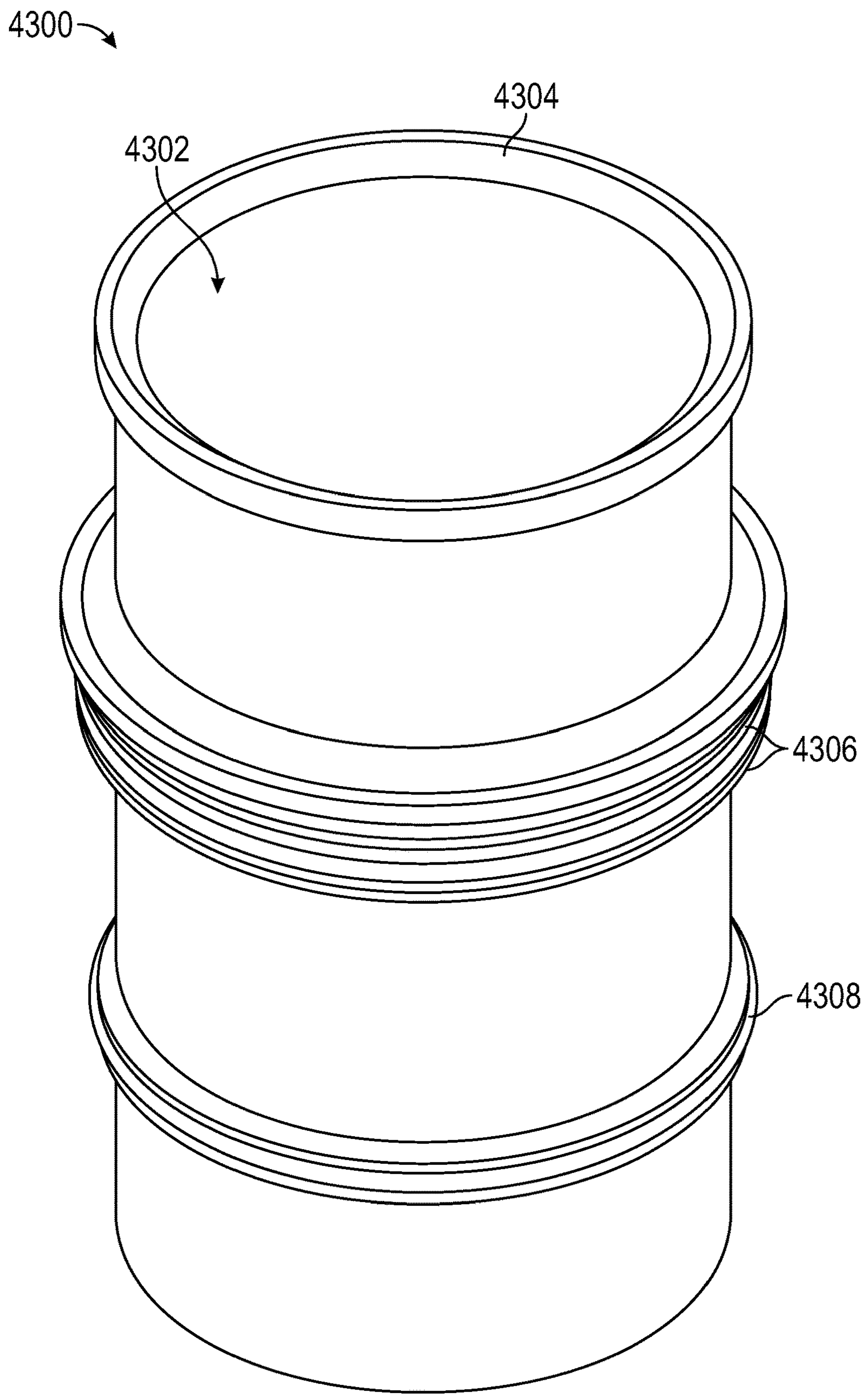
FIG. 43 is an isometric view of a cylinder of a drive motor of the nail gun of FIG. 31.

FIG. 43 is a perspective view of a cylinder 4300 of the drive motor 3108 isolated from the nail gun 3100, according to the present disclosure. The cylinder 4300 includes a cylinder bore 4302, a cylinder sealing surface 4304, one or more first cylinder seals 4306, and one or more second cylinder seals 4308. The cylinder bore 4302 is a drive bore that houses the hammer 3104 (FIG. 32A). That is, the hammer 3104 is located within the cylinder bore 4302. The cylinder sealing surface 4304 seals with a dump head valve 3109 (FIG. 31). The one or more first cylinder seals 4306 seal with an inner surface of a main housing (e.g., FIG. 19A, 1900) of the drive motor 3108. Although two first cylinder seals 4306 are illustrated, more or fewer may be provided. The one or more second cylinder seals 4308 operate as a check valve such that compressed air is allowed to flow only in a positive radial direction. Although a single second cylinder seal 4308 is illustrated, more may be provided. The one or more first cylinder seals 4306 and/or the one or more second cylinder seals 4308 may be O-rings.

Figure 44A:
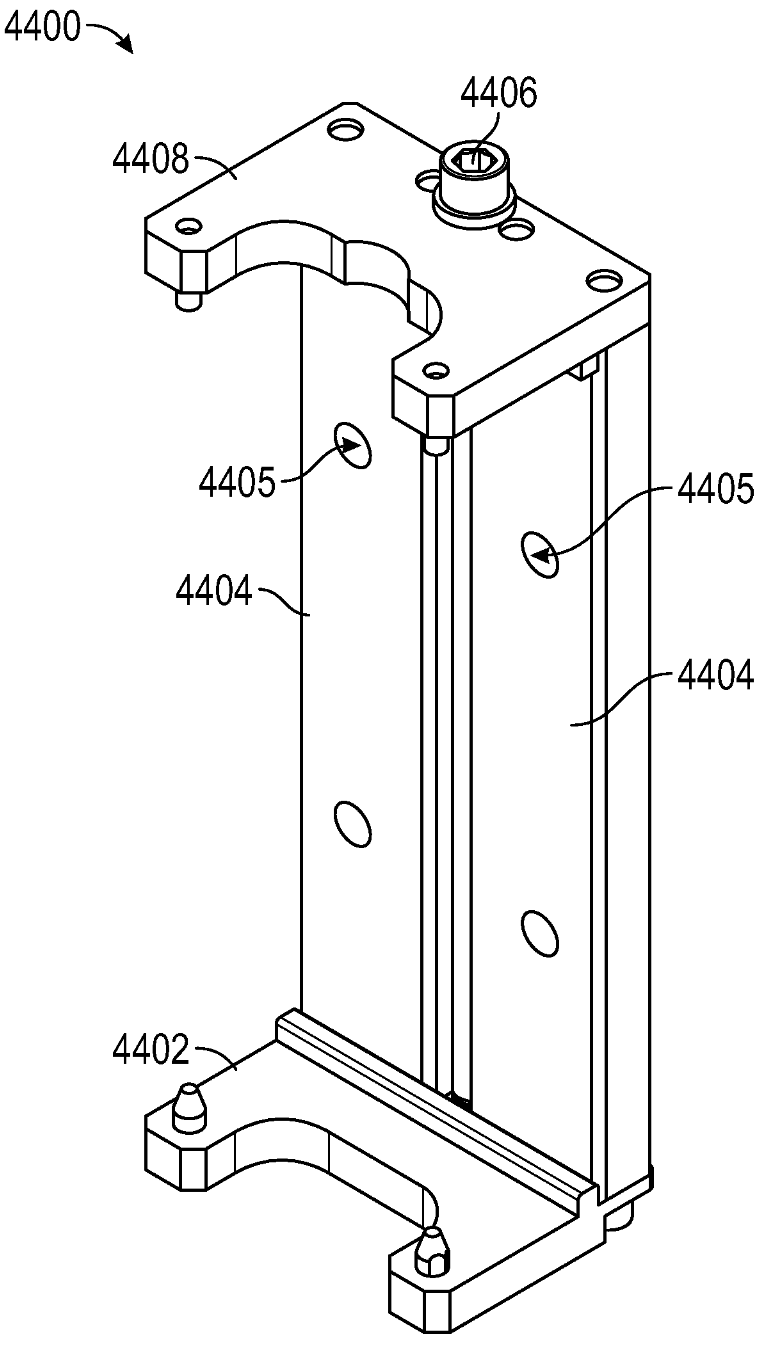
FIGS. 44A and 44B are isometric views of a flexible mounting for the nail gun of FIG. 31.
Figure 44B:
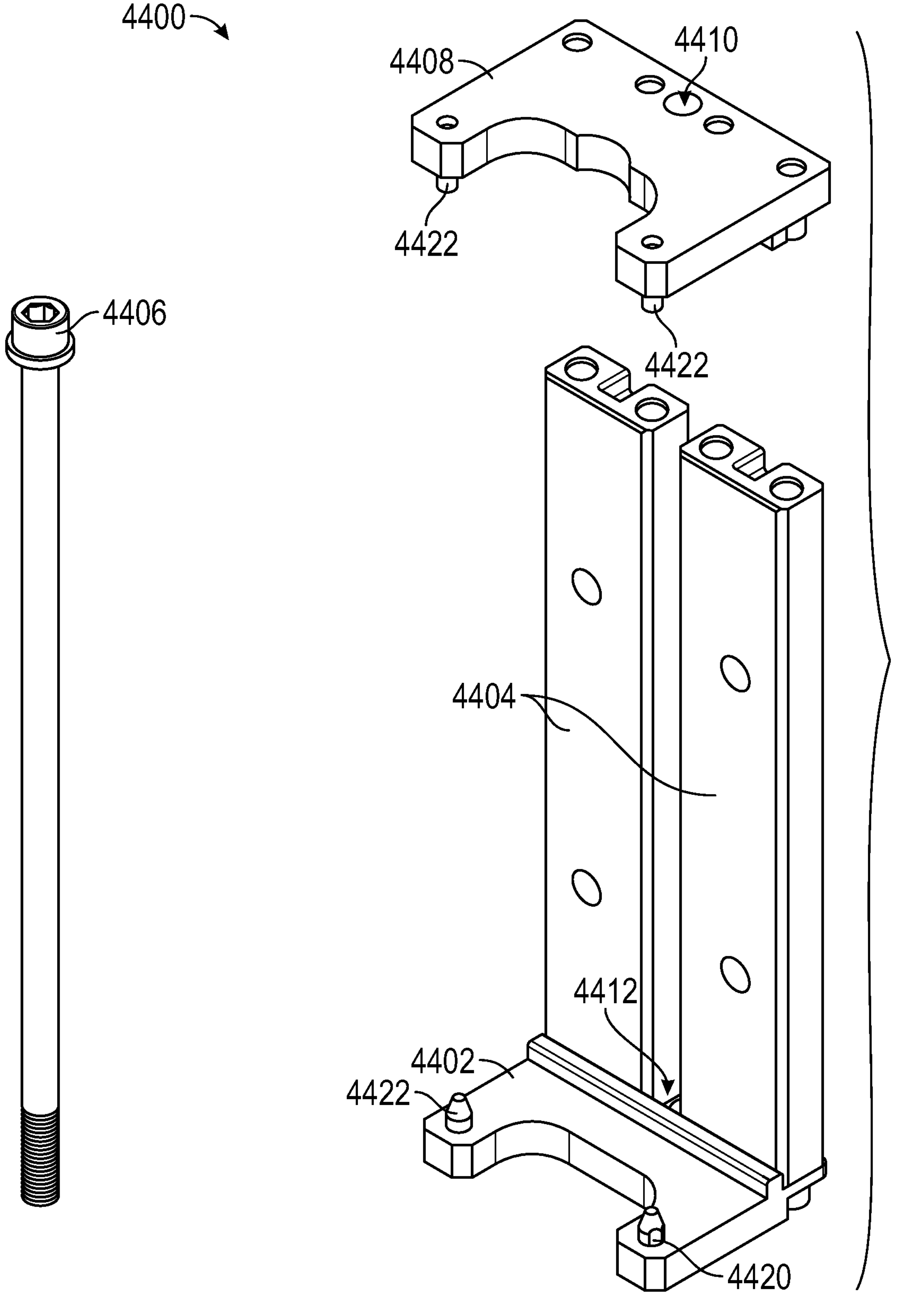

FIGS. 44A and 44B illustrate a mounting system 4400. The mounting system 4400 includes a bottom bracket 4402, a lateral strut 4404, one or more mounting holes 4405, and a top bracket 4408. The mounting system 4400 includes a clamp screw 4406, a plurality of round pins 4422, and a diamond pin 4420. The clamp screw 4406 extends through a top opening 4410 in the top bracket 4408 and a bottom opening 4412 in the bottom bracket 4402.

As described with respect to the nail gun 100 and the nail gun 1000, the feed head assembly 3106 of the nail gun 3100 attaches, using the base plate 3316, in a sealed manner to the drive assembly (e.g., the drive motor 3108) of the nail gun 3100. As discussed, the base plate 3316 has, on an upper surface thereof, a mating flange 3318 that extends at least partially into the drive assembly and seals against the bottom surface of the drive assembly using the main housing seal 3319. The mating flange 3318 has a bumper, which is configured to absorb impacts at the end of the hammer stroke and during dry fires. The bumper has a hammer hole 3320 formed therethrough (e.g., in the direction of the longitudinal axis 3101), through which the hammer rod 3214 extends when driving a nail out of the feed head assembly 3106.

Figure 33A:
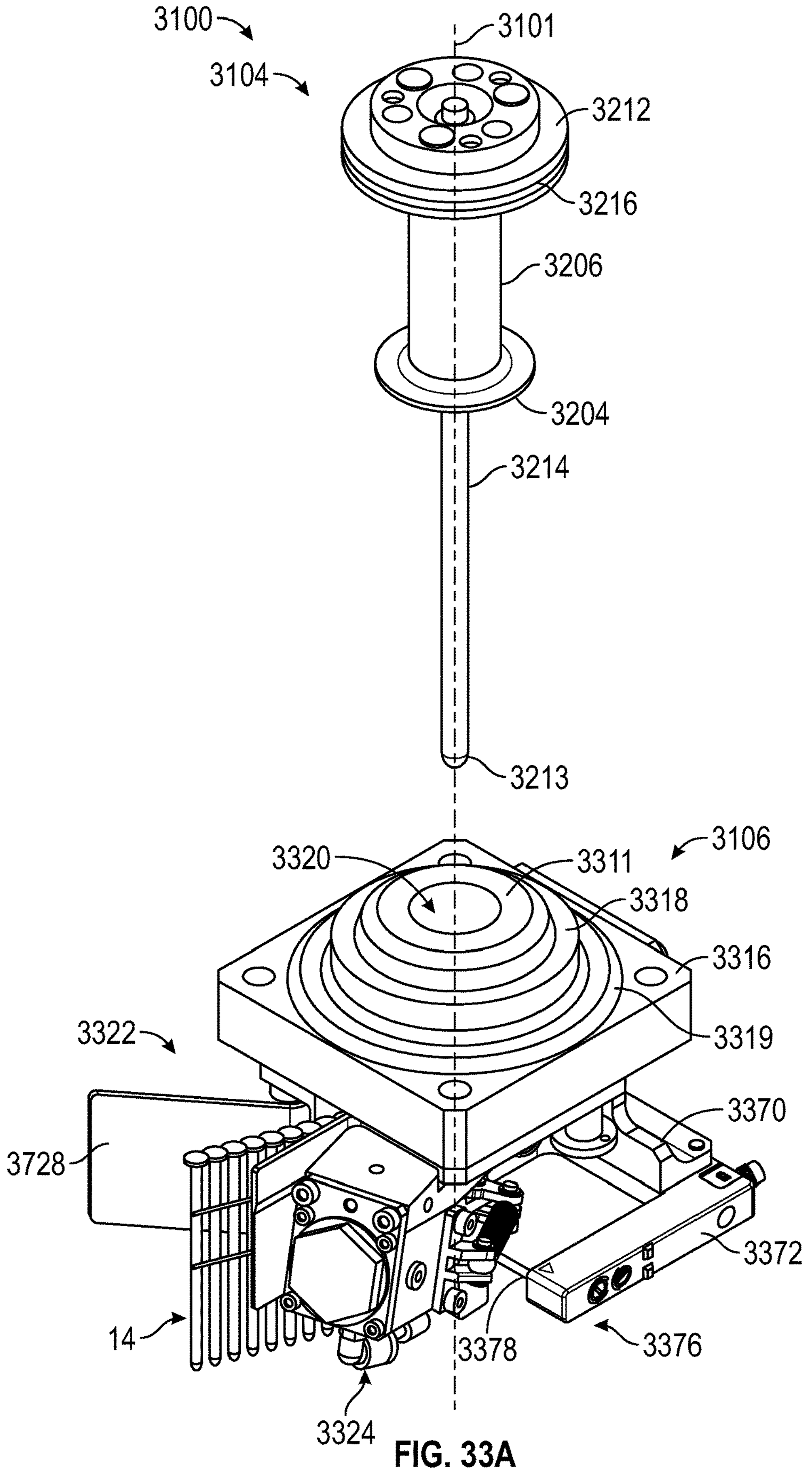
FIGS. 33A and 33B are isometric views of a feed head assembly and drive assembly of the nail gun of FIG. 31.
Figure 33B:
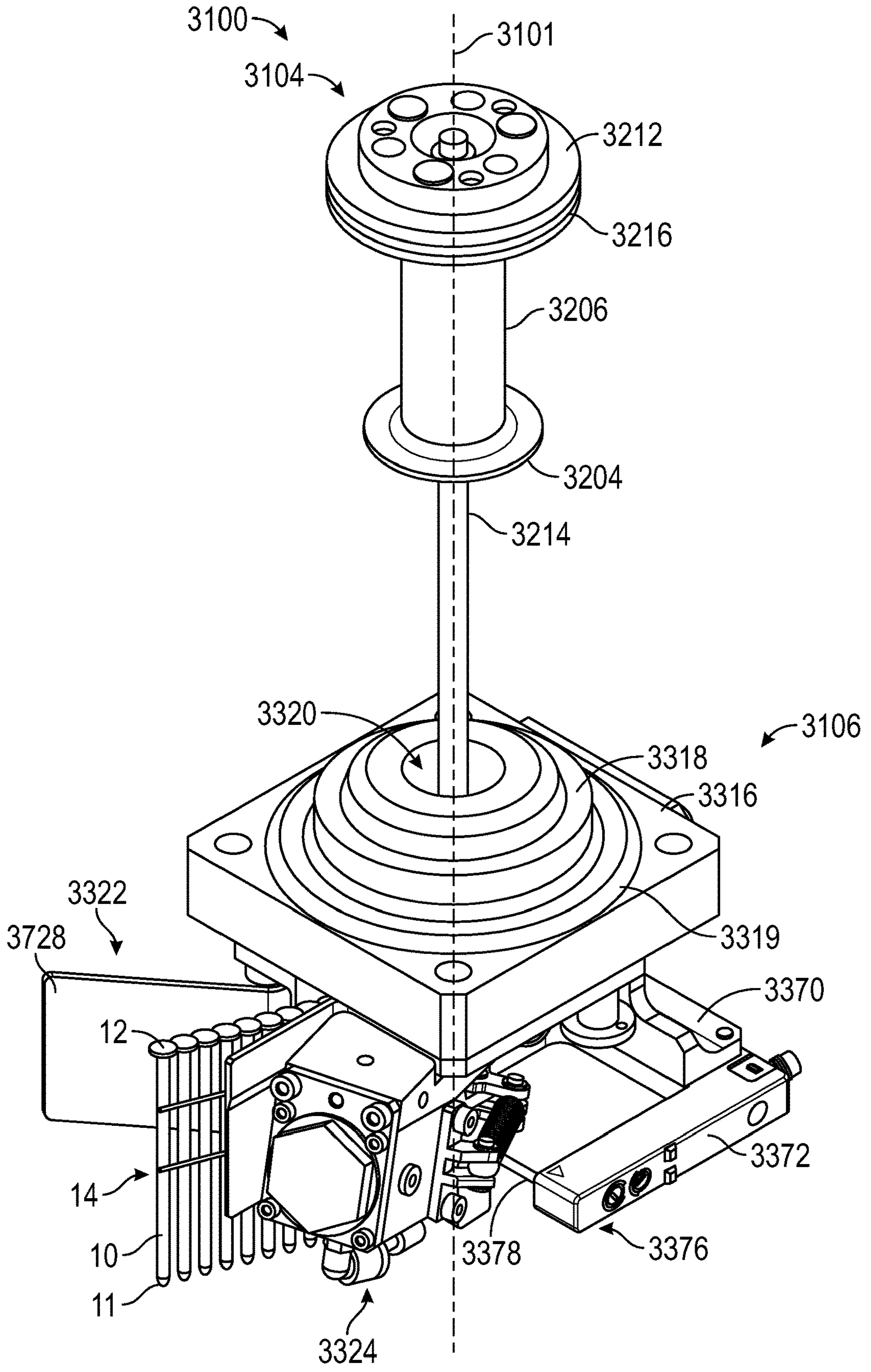
Figure 34:
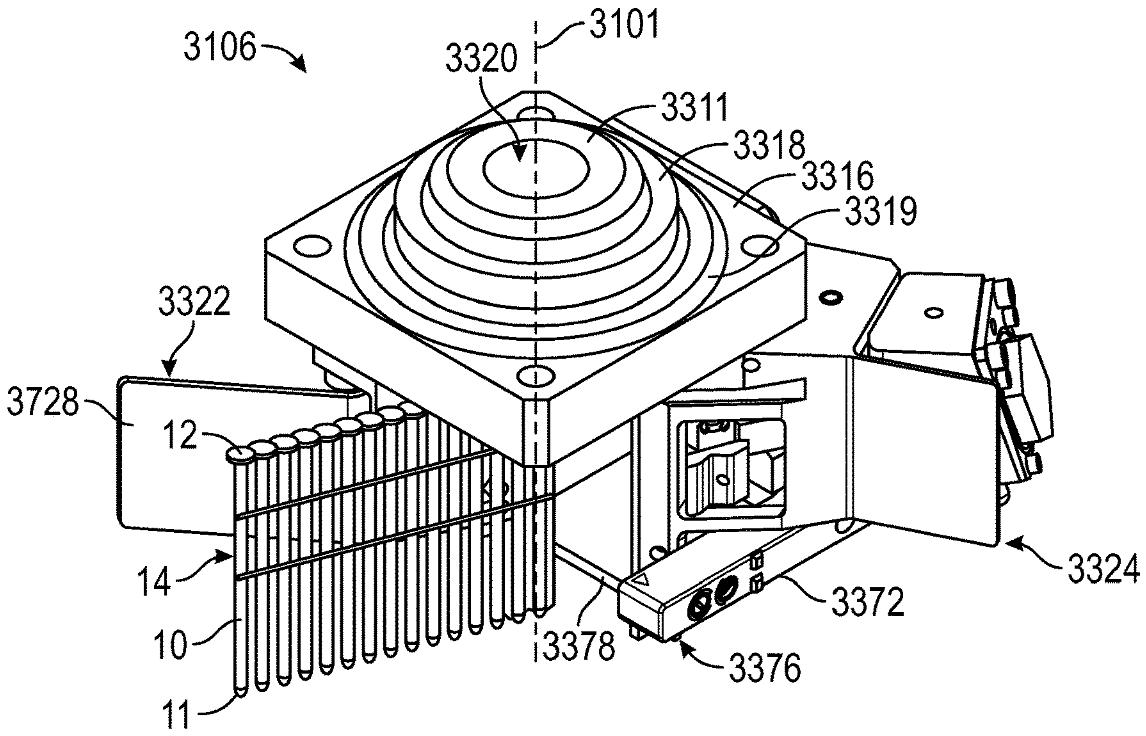
FIGS. 34 and 35 are isometric views of the feed head assembly of the nail gun assembly of FIG. 31.
Figure 35:
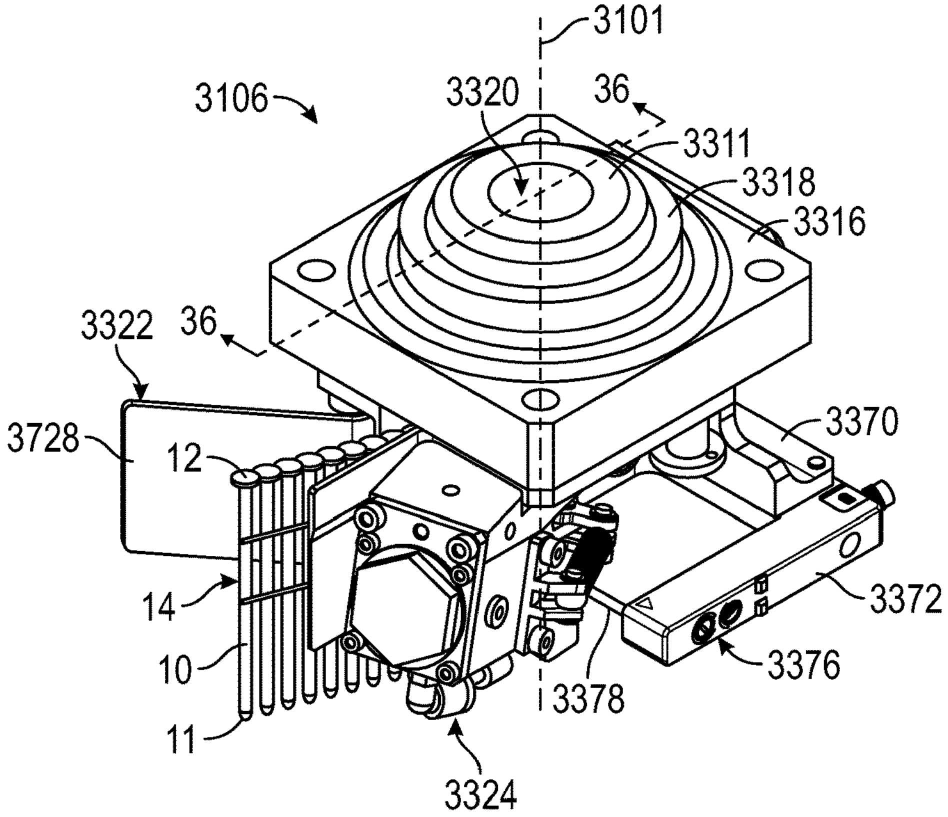
Figure 36:
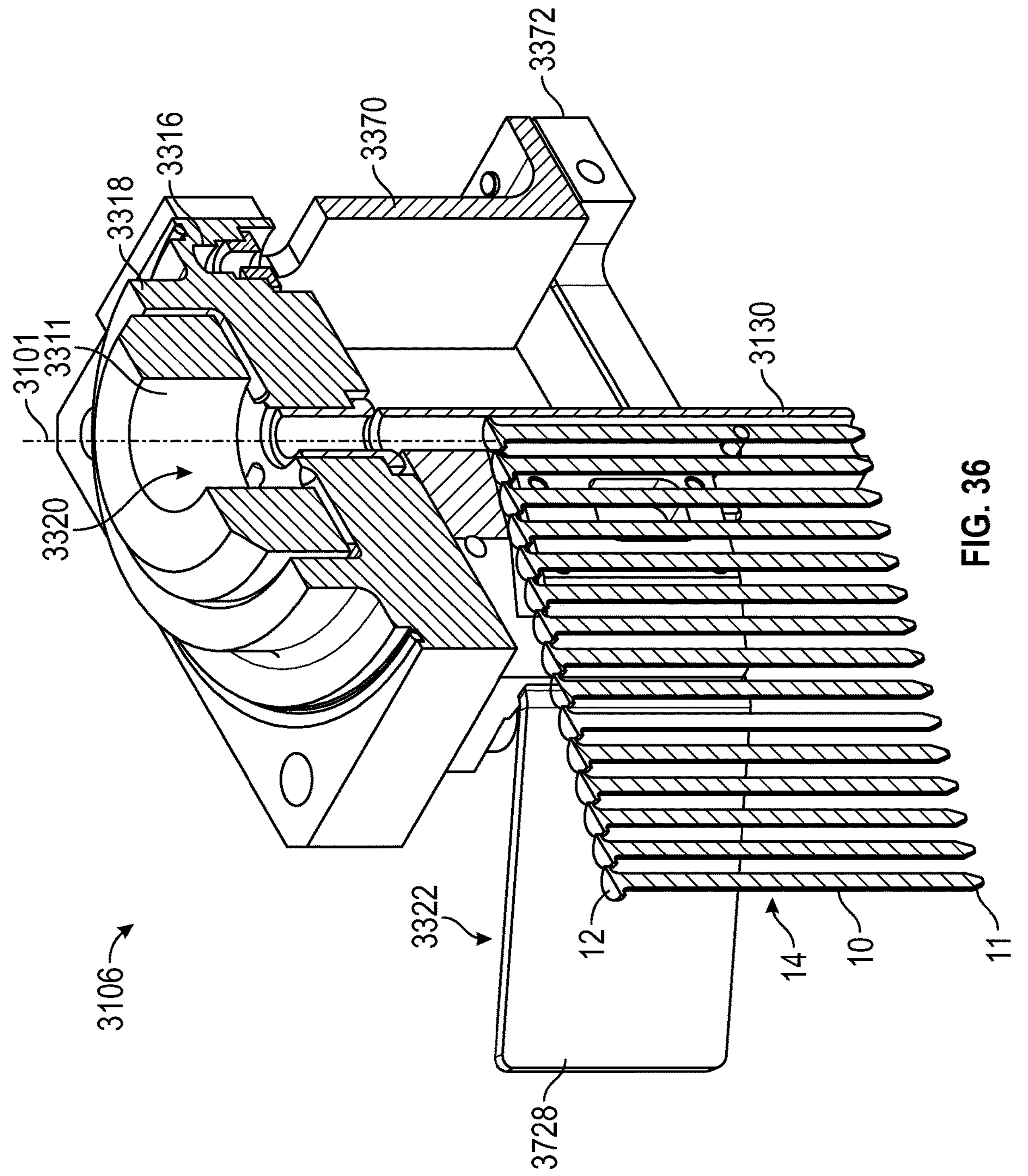
FIG. 36 is a cross-sectional view of the feed head assembly shown in FIG. 34, taken along a longitudinal centerline axis of the feed head assembly.

With continued reference to FIGS. 31 to 41, the feed head assembly 3106 comprises the guide assembly 3322 rigidly attached to the bottom surface of the base plate 3316, the sensor assembly 3376 attached to the base plate 3316 (e.g., on a lateral side thereof), and a feed cylinder assembly 3324 that is pivotably attached to the bottom surface of the base plate 3316, such that the feed cylinder assembly 3324 is movable between a closed position, shown in FIG. 33A, and an open position, shown in FIG. 34.

Due to the shorter depth of the feed head assembly 3106 in the example embodiment shown in FIGS. 31 to 41 compared to the feed head assembly in the example embodiment shown in FIGS. 10-15C, a different hammer 3104 is shown in FIGS. 32A and 32B for use with the feed head assembly 3106 in the example embodiment shown in FIGS. 31 to 41. The hammer 3104 comprises, at a proximal end thereof, a hammer head 3212 that has a seal 3216 provided circumferentially around the hammer head 3212. In order to prevent the hammer rod 3214 from protruding out of the output segment during use, the hammer rod 3214 comprises the collar 3206 that extends axially away from the hammer head 3212. The hammer collar 3206 comprises, at an end thereof closest to the distal end of the hammer, the strike surface 3208. The strike surface is configured to impact the bumper for damping vibration. The hammer rod 3214 extends beyond the strike surface 3208. The distance from the strike surface 3208 to the end of the hammer rod 3214 at the distal end of the hammer 3104 is substantially similar to the distance in the longitudinal direction between the upper surface of the bumper and the distal end of the nail/driver guide of the guide assembly.

The guide assembly 3322 comprises the bracket 3726 that is rigidly attached to the bottom surface of the base plate 3316. The guide plate 3728 is rigidly attached to the bracket 3726 and is used to guide the nails into the feed head assembly 3106. The bracket 3726 has mounting holes that are used for attaching the bracket to the base plate. The bracket 3726 comprises, formed integrally therein (e.g., in a monolithic or unitary manner), a nail/driver guide 3130. The nail/driver guide 3130 has a hemispherically-shaped hollow region extending along the longitudinal axis. The nail/driver guide 3130 has a hole formed through the entire thickness thereof for the passage of the beam from the beam sensor therethrough for detecting the presence of a nail within the nail/driver guide.

The feed cylinder assembly 3324 is pivotably mounted to the bottom surface of the base plate 3316. The feed cylinder assembly 3324 pivots about a fastener (e.g., a screw) passing through the bushing formed in the mounting bracket. The pivot lock pin is mobile in the direction of the longitudinal axis so as to move in/out of the bushings formed in the bottom surface of the base plate when axially aligned therewith. The positions of the bushings correspond to the open and closed positions of the feed cylinder assembly 3324. The mounting bracket 3834 has a feed actuator 3840 rigidly attached thereto. The mounting bracket 3834 also comprises a nail/driver guide 3130, also referred to herein as a drive segment 3130. The nail/driver guide has a hemispherically-shaped hollow region extending along the longitudinal axis. The nail/driver guide has a hole formed through the entire thickness thereof for the passage of the beam from the beam sensor therethrough for detecting the presence of a nail within the nail/driver guide. The hole formed in the feed cylinder assembly 3324 is substantially coaxial with the hole formed in the guide assembly when the feed cylinder assembly is in the closed position. The feed actuator 3840 is used for controlling the induction of the nails into the space defined between the respective nail/driver guides of the feed cylinder assembly and the guide assembly.

The sensor assembly 3376 comprises a sensor bracket 3370 that is rigidly attached to the base plate 3316 and a beam sensor 3372 that is rigidly attached to the sensor bracket. The operation and positioning of the beam sensor in the example embodiment disclosed in FIGS. 31 to 41 is substantially similar to the operation and positioning of the beam sensor in the example embodiment disclosed in FIGS. 10-15.

The feed cylinder assembly 3324 comprises the cylinder body 4150, and a cylinder rod 4152 that extends axially therefrom. The cylinder rod 4152 is movable into/out of the cylinder body 4150. Air inlets 4156 are provided for the cylinder body 4150 to selectively control extension and retraction of the cylinder rod 4152. The feed cylinder assembly 3324 comprises a shock bracket 4158 rigidly connected to an outer surface of the cylinder body 4150. The feed cylinder assembly 3324 also comprises a shock assembly 4160 (e.g., a damping element) pivotably attached to the shock bracket 4158. The feed actuator comprises a push arm 4162, which is pivotably attached to the shock assembly 4160 and also to the end of the cylinder rod 4152 that is external to the cylinder body 4150. Extension and retraction of the cylinder rod 4152 causes a pivoting movement of the push arm 4162, such that the push arm 4162 is configured to function in a manner similar to an indexing pawl with each cylinder retraction/extension cycle; the nail thus functions, in conjunction with the push arm, like a ratchet to advance the nails by a nail pitch distance with each retraction/extension cycle of the cylinder rod.

Figure 46:
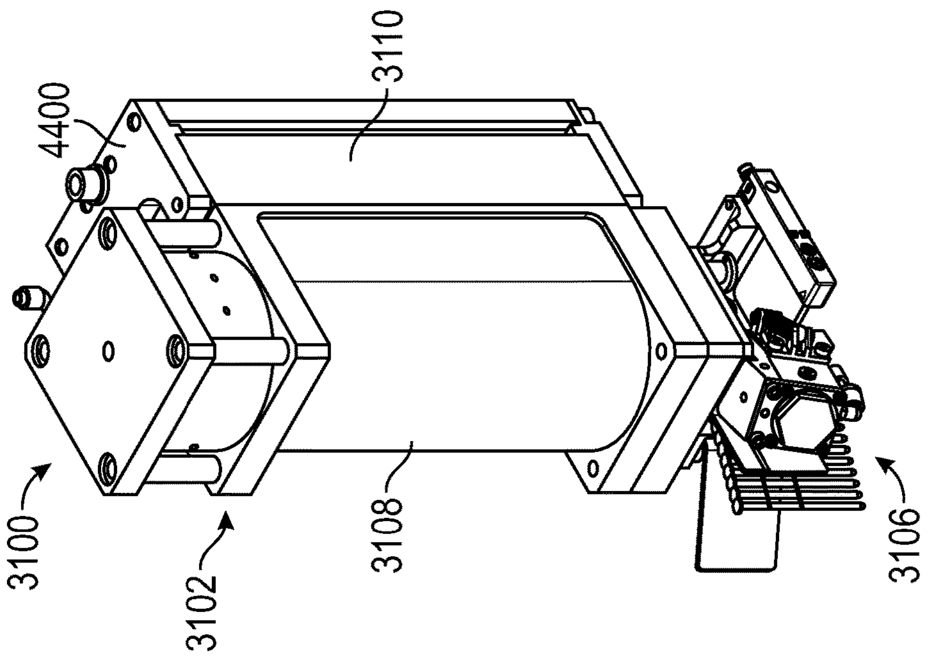
FIG. 46 is an isometric view of a nail gun.
Figure 45:
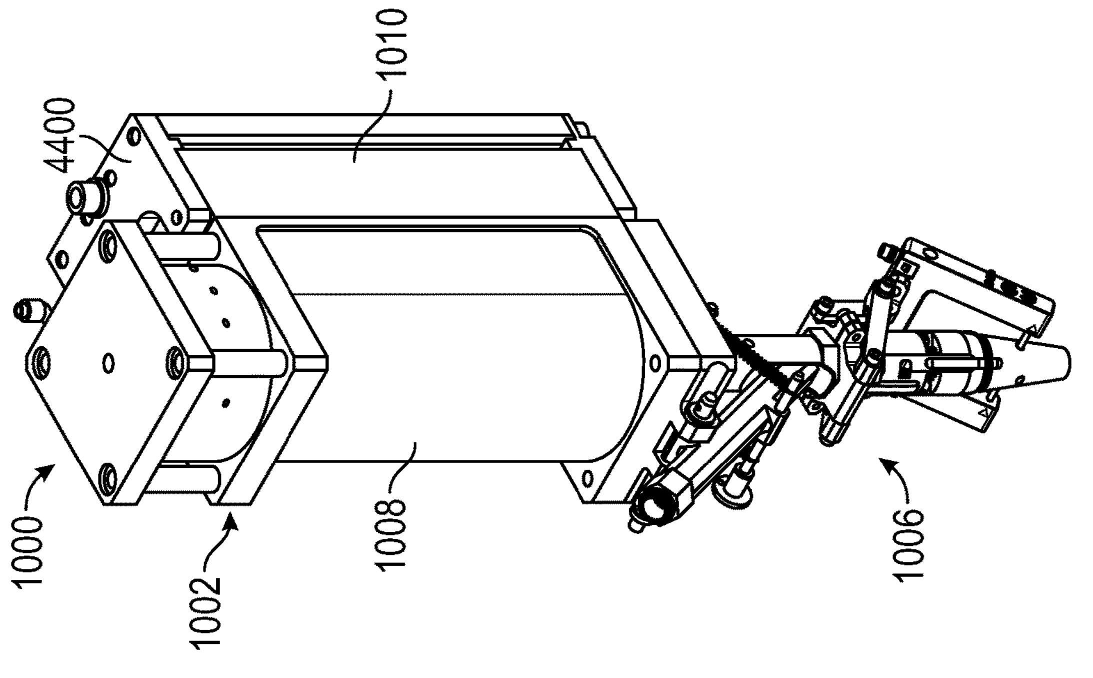
FIG. 45 is an isometric view of a nail gun.

The mounting system 4400 of FIGS. 44A and 44B is suitable for use with either of the example embodiments of the nail guns shown in FIGS. 1, 10, and 31. For example, as shown in FIG. 45, the mounting system 4400 is compatible with the nail gun 1000 and as shown in FIG. 46, the mounting system 4400 is compatible with the nail gun 3100. The mounting system 4400 comprises the bottom bracket 4402, which is connected to two lateral struts 4404, which are positioned on opposite sides of the clamp screw 4406. The mounting system 4400 also comprises a top bracket 4408, which engages with the lateral struts 4404. The top bracket 4408 and the bottom bracket 4402 each have a hole (e.g., openings 4410 and 4412) formed therein that are, when assembled to the lateral struts, substantially coaxial with each other to allow for the passage and/or insertion of the clamp screw 4406. The clamp screw 4406 is used to clamp the top bracket 4408 to the bottom bracket 4402, with the lateral struts 4404 positioned therebetween. Round pins 4422 and diamond pins 4420 are provided in the top and bottom brackets to lock the nail gun to the mounting system 4400.

Figure 47:
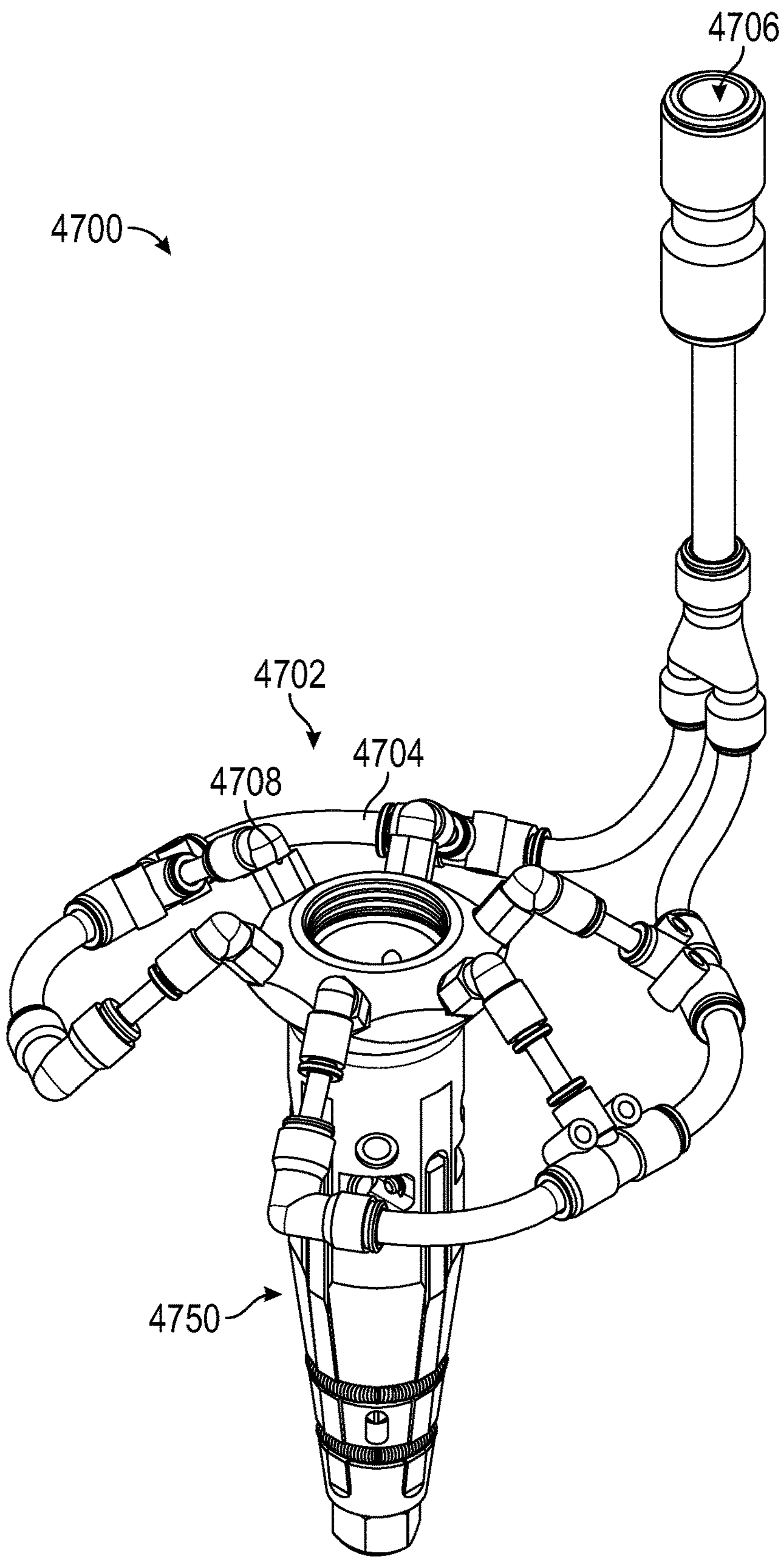
FIG. 47 is an isometric view of a nose assembly for a nail gun.

FIG. 47 illustrates a sneeze circuit 4700 that is compatible with any of the nail guns described herein. The sneeze circuit 4700 is for applications where a nail is to be drive horizontally instead of vertically (with the help of the acceleration of gravity). The sneeze circuit 4700 is triggered by an inductive sensor on the feed tube from the nail feeding system. The inductive sensors tells the controller to open a valve to supply high pressure air to the nose.

As shown in FIG. 47, the sneeze circuit 4700 includes a circuit inlet 4706 leading to a nose assembly 4702. The nose assembly 4702 includes tubing 4704 and a plurality of inlets 4708. The sneeze circuit 4700 is coupled to an output segment 4750, that is coupled to any of the nail guns described herein. During use, high pressure air is introduced into the circuit inlet 4706 and distributed into the nose assembly 4702 (e.g., the tubing 4704). Each of the nose inlets 4708 is directed at an angle with respect to the centerline of the nail gun (e.g., longitudinal axis 3101). The angle of the inlets 4706 creates an airstream to pull the nail into the output segment 4750, also referred to herein as a nose 4750. Mating threads may be provided in the center of the output segment 4750 to secure the output segment 4750 to the guide tube described previously herein.

Figure 48:
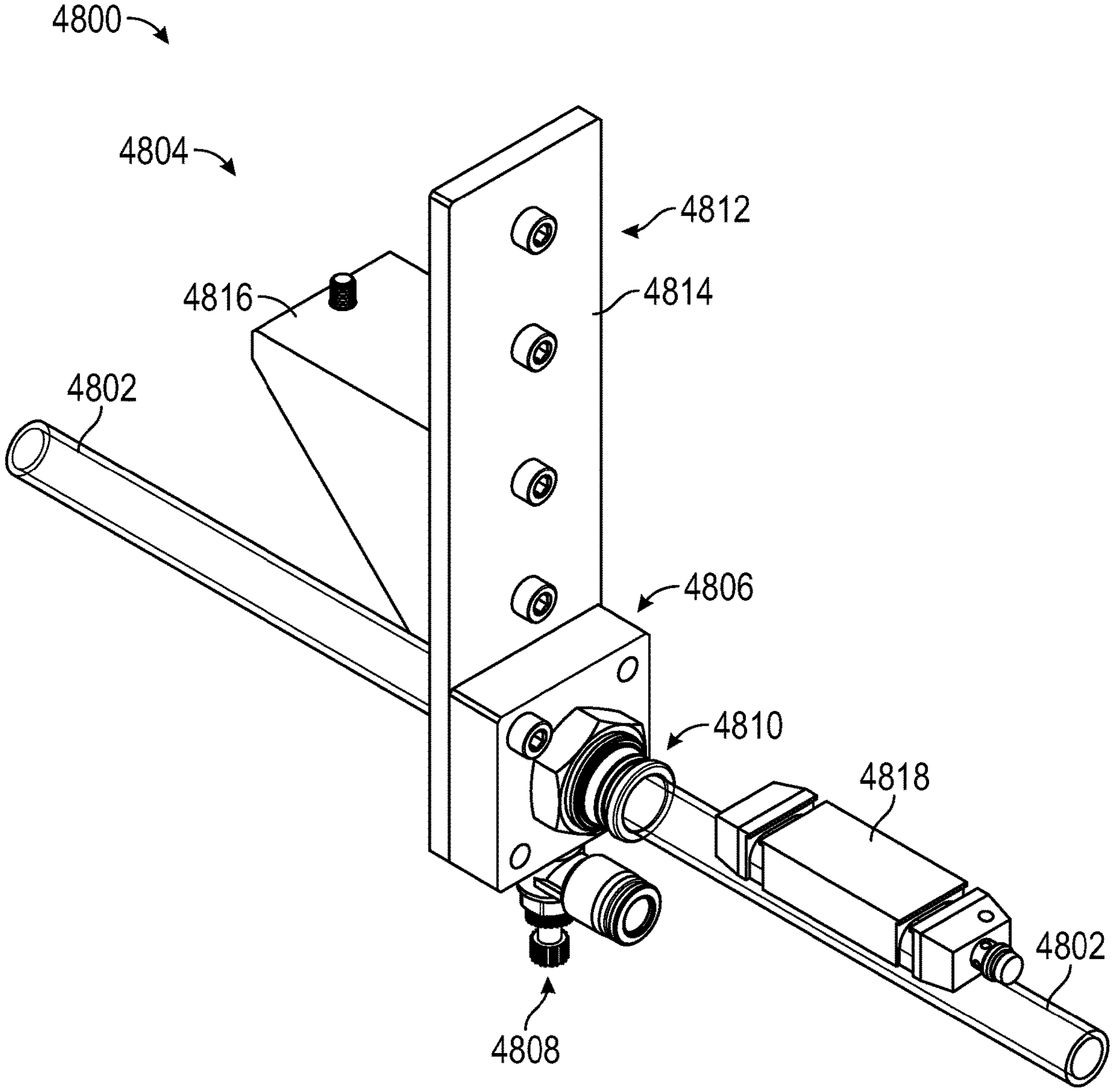
FIG. 48 is an isometric view of a nail feed accelerator for a nail gun.

FIG. 48 illustrates a nail feeding accelerator 4800 that is compatible with any of the nail guns described herein. The nail feeding accelerator 4800 includes a feed tube 4802, gusset 4804 having a mounting surface 4816, a manifold block 4806, a flow control 4808, a bulkhead fitting 4810, a mounting assembly 4812 having a plate 4814, and an inductive sensor 4818.

The feed tube 4802 may be formed of hard nylon tube that serves as a passage for nails from the feed system to a feed arm or to a reload segment (e.g., reload segment 1022) on the nail gun. The gusset 4804 provides a mounting surface 4816 for the nail feeding accelerator 4800. The manifold block 4806 receives air from an inlet and sends the air to the bulkhead fitting 4810. The manifold block 4806 also provides a rigid mounting surface for the accelerator assembly. The bulkhead fitting 4810 supplies air from the manifold block 4806 to the feed tube 4802 to accelerate the nail therein. The inductive sensor 4818 detects the passage of the nail and communicates with the controller to open the valve (e.g., such as described with respect to FIG. 49).

During a nail's journey from the feed system to the nail gun, it may be necessary to expedite the journey or provide extra speed at certain points in the journey. For example, when the feed system is far from the nail gun, or when the nails are driven horizontally, such extra speed is important. The nail feeding accelerator 4800 may be placed anywhere along the length of the nail feed tube to give the nail a boost of speed.

Figure 49A:
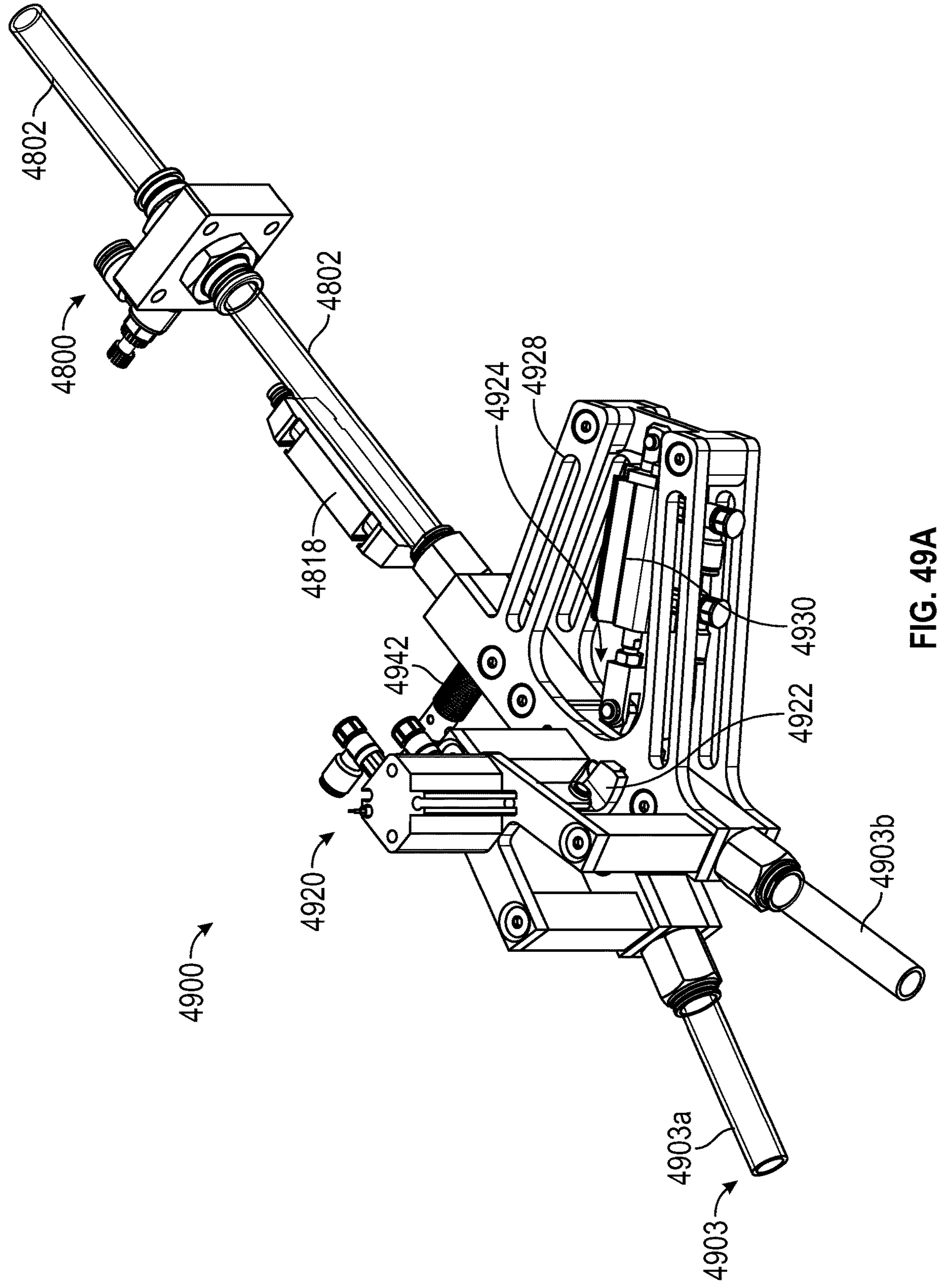
FIG. 49A is an isometric view of a nail feed control gate for a nail gun.
Figure 49B:
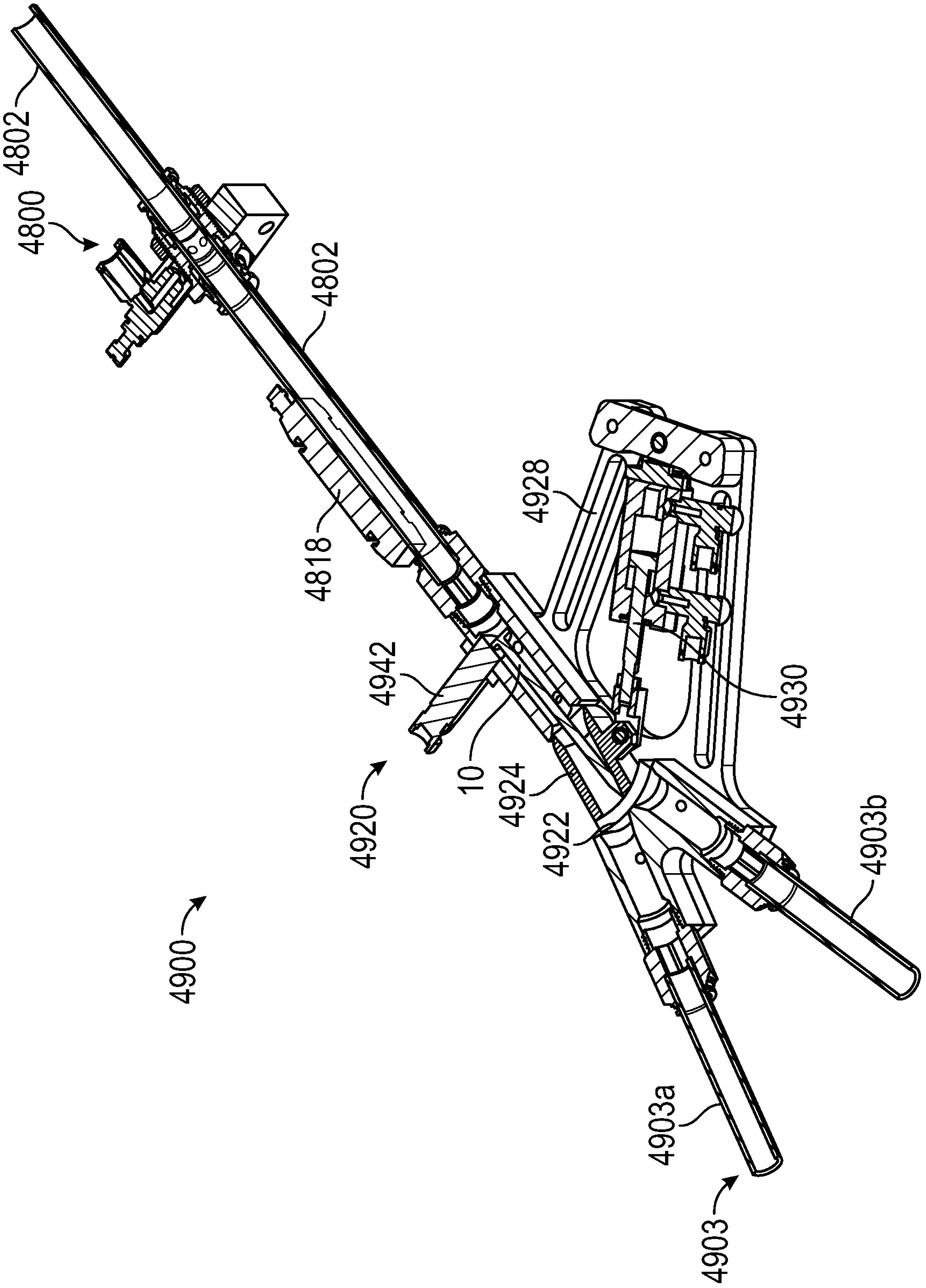
FIGS. 49B and 49C are cross-sectional views of the nail feed control gate of FIG. 49A taken along a longitudinal centerline.
Figure 49C:
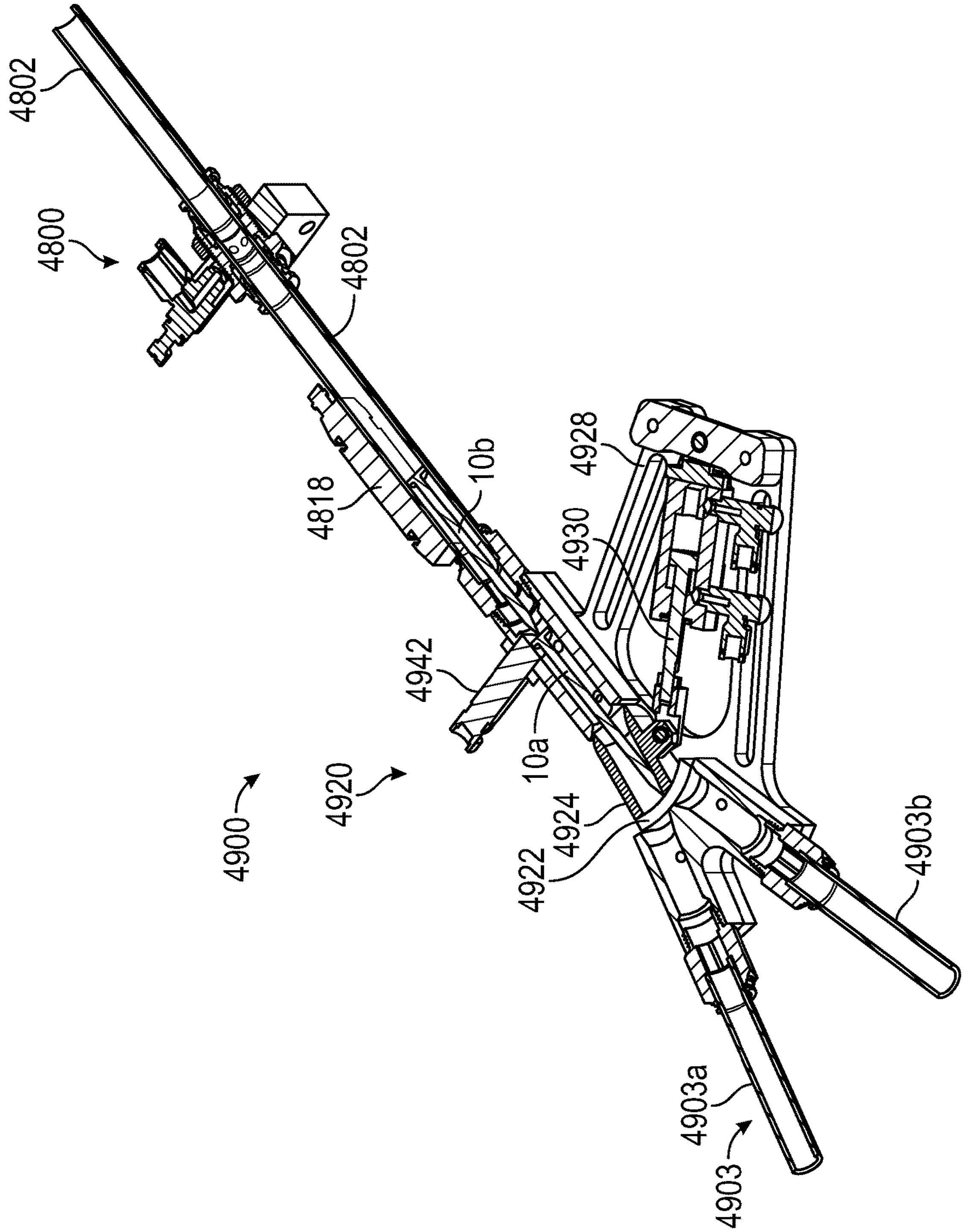

FIGS. 49A to 49C illustrate a nail feed control gate assembly 4900 coupled to the nail feeding accelerator 4800 of FIG. 48. The nail feed control gate assembly 4900 is compatible with any of the nail guns described herein. The nail feed control gate assembly 4900 includes one or more outlets 4903, such as a first outlet 4903*a* and a second outlet 4903*b*. The nail feed control gate assembly 4900 includes a nail feed control gate 4920 having a door 4922. The nail feed control gate assembly 4900 includes a sensor 4942 and a diverter 4924. The diverter 4924 controls the direction of the nail 10 to either exit from the first outlet 4903*a* or the second outlet 4903*b*. The nail gate 4900 includes one or more mounting plates 4928 and one or more actuators 4930. The one or more mounting plates 4928 secure the components of the nail feed control gate 4900 together, as illustrated in FIG. 49B.

As mentioned previously, a nail 10 may be located a long distance from the nail feeder. Thus, during normal operation, it may be necessary to stage subsequent nails to take advantage of the nail gun's idle time. By staging nails 10, the overall cycle time of a process is reduced, which increases the throughput.

Referring to FIG. 49B, during normal operation, when cycle time is flexible, for example, the diverter 4924 may be directed to the first outlet 4903*a* with the door 4922 open. That is, the diverter 4924 is aligned with the first outlet 4903*a* such that the nail 10 may move from the feed tube 4802 to the first outlet 4903*a* (but the nail 10 cannot move to the second outlet 4903*b*), The actuator 4930, which may be a pneumatic actuator, is in a first position that aligns the diverter 4924 with the first outlet 4903*a*. If staging is necessary (e.g., where cycle time is tight), then the door 4922 may be closed. As the nail 10 moves into the gate, a sensor (e.g., the inductive sensor 4818) is flagged, followed by the sensor 4942. The sequential sensors tell the controller that the nail 10 is present in the nail feed control gate 4920. When the nail gun (e.g., any of the nail guns 100, 1000, 3100, for example) is ready for the nail 10, the door 4922 is opened and the accelerator 4800 will turn on and blow the nail into the nail gun.

Referring to FIG. 49C, in some examples, double feeding of nails may be an issue. In this case, the feed control gate assembly 4900 can be used to prevent two nails (nails 10*a*, 10*b*) from feeding into the nail gun. In this case, the second nail 10*b* (upstream) will be directed by the sensor 4818, while both the sensors 4818 and 4942 are flagged. The actuator 4930 will then direct the diverter 4924 to change from the first outlet 4903*a* to the second outlet 4903*b* (this position not illustrated). With the diverter 4924 aligned with the second outlet 4903*b* (e.g., such that the nail 10*a* may move from the feed tube 4802 to the second outlet 4903*b*, but, the nail 10*a* cannot move to the first outlet 4903*a*), the door 4922 is opened. The accelerator 4800 will blow the nails through the second outlet 4903*b* and into a discard bin. Once the nails are discarded, the feed control gate assembly 4900 resets. In either the example of FIGS. 49B and 49C, the door 4922 may be opened prior to alignment of the diverter 4924 or after alignment of the diverter 4924.

Figure 50:
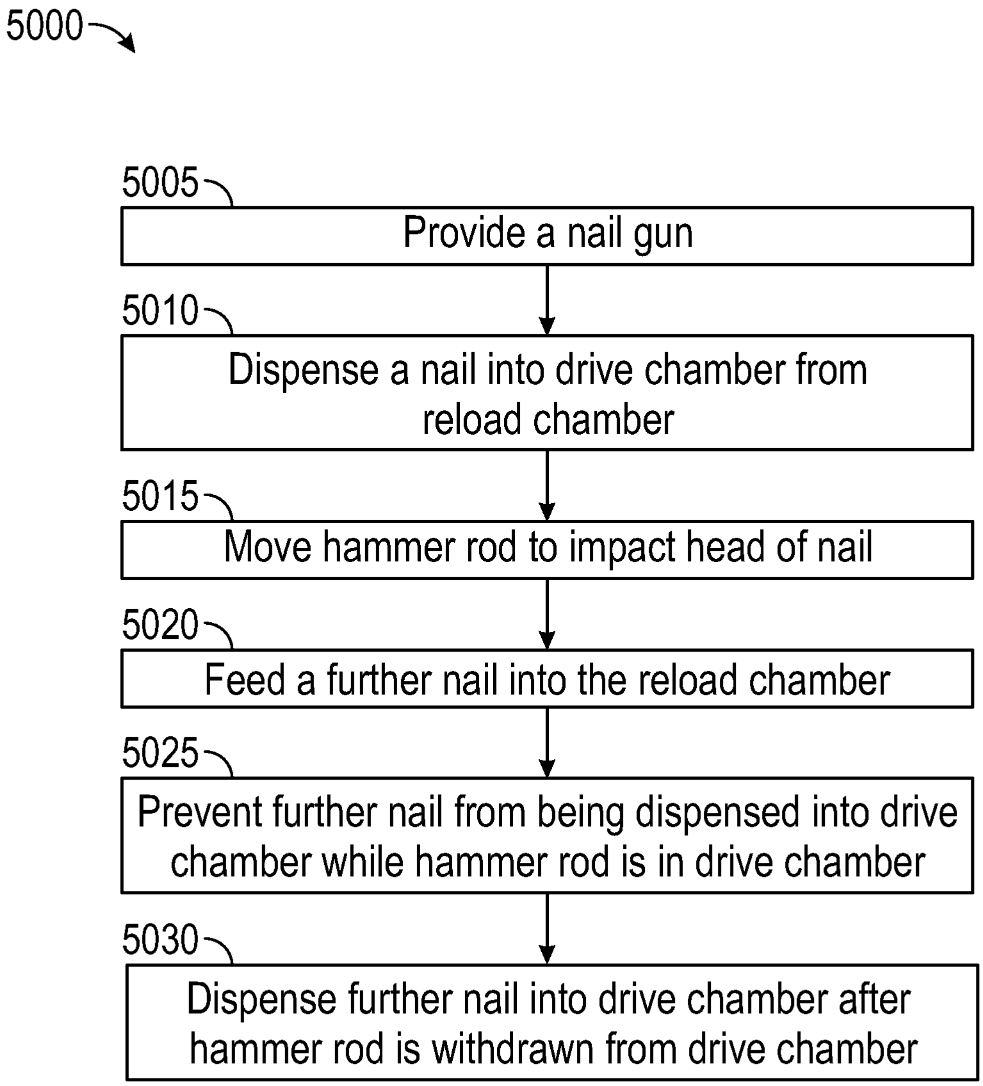
FIG. 50 is a method of operating a nail gun.

FIG. 50 illustrates a method 5000 for driving a nail with any of the nail guns described herein. At step 5005, a nail gun is provided. At step 5010, the method dispenses a nail into the drive chamber from a reload chamber. At step 5015, the hammer rod is moved to impact the head of the nail. At step 5020, an additional nail is fed into the reload chamber. At step 5025, the method prevents further nails from being dispensed into the drive chamber while the hammer rod is in the drive chamber, and in step 5030, the additional nail is dispensed into the drive chamber after the hammer rod is withdrawn from the drive chamber. The method 5000 thus describes dispensing nails from the nail gun one at a time such that a subsequent nail is not drive until the prior nail has exited. The method 5000 may be repeated.

Figure 51:
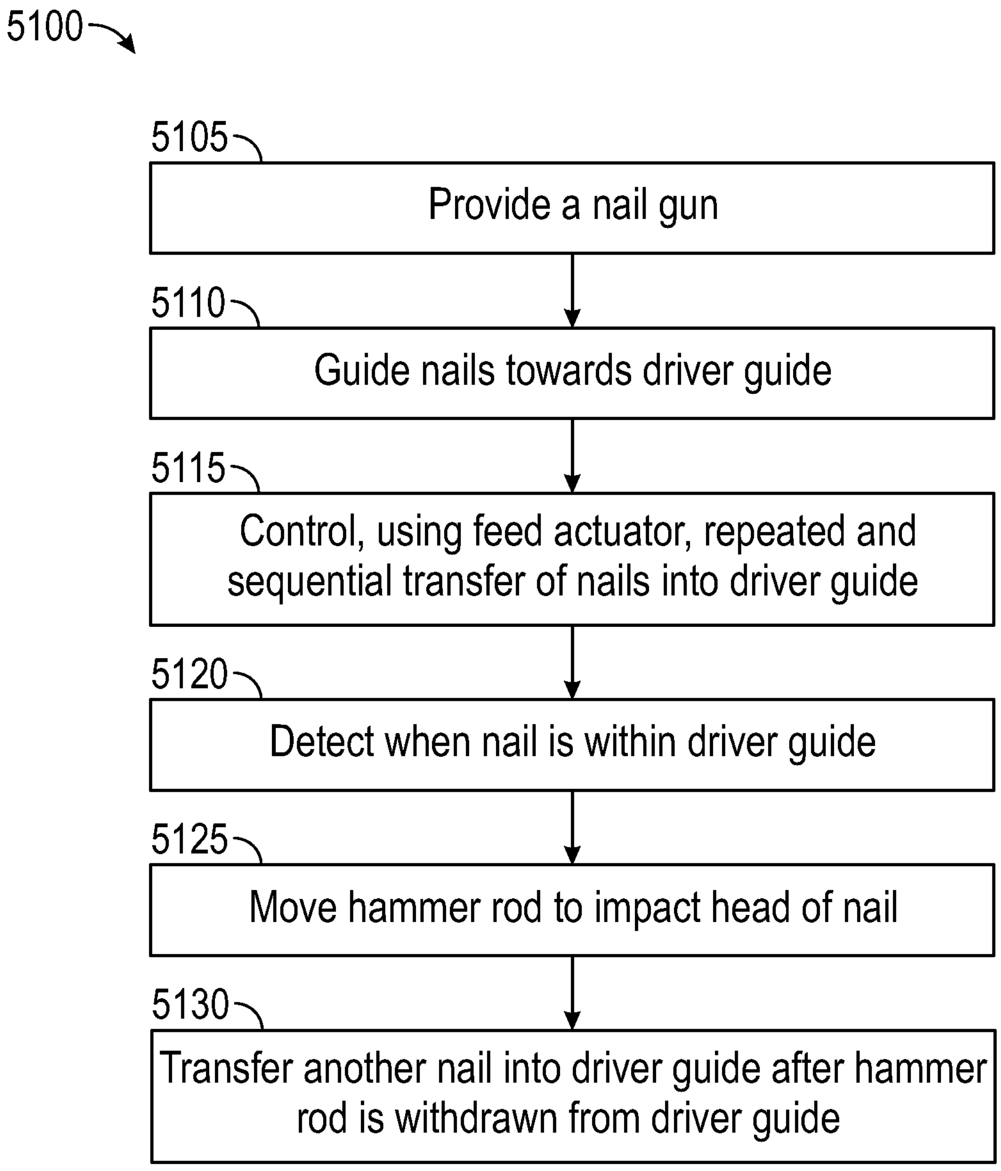
FIG. 51 is a method of operating a nail gun.

FIG. 51 illustrates a method 5100 for driving a nail with any of the nail guns described herein. At step 5105, the method provides a nail gun. The method, at step 5110, guides the nail towards the driver guide. At step 5115, the method controls, using a feed actuator, the repeated and sequential transfer of nails into the driver guide. Step 5120 detects when the nail is within the driver guide and step 5125 then moves the hammer rod to impact the head of the nail. The method, at step 5130, transfers another nail into the driver guide after the hammer rod is withdrawn from the driver guide. The method 5100 may be repeated.

Figure 52:
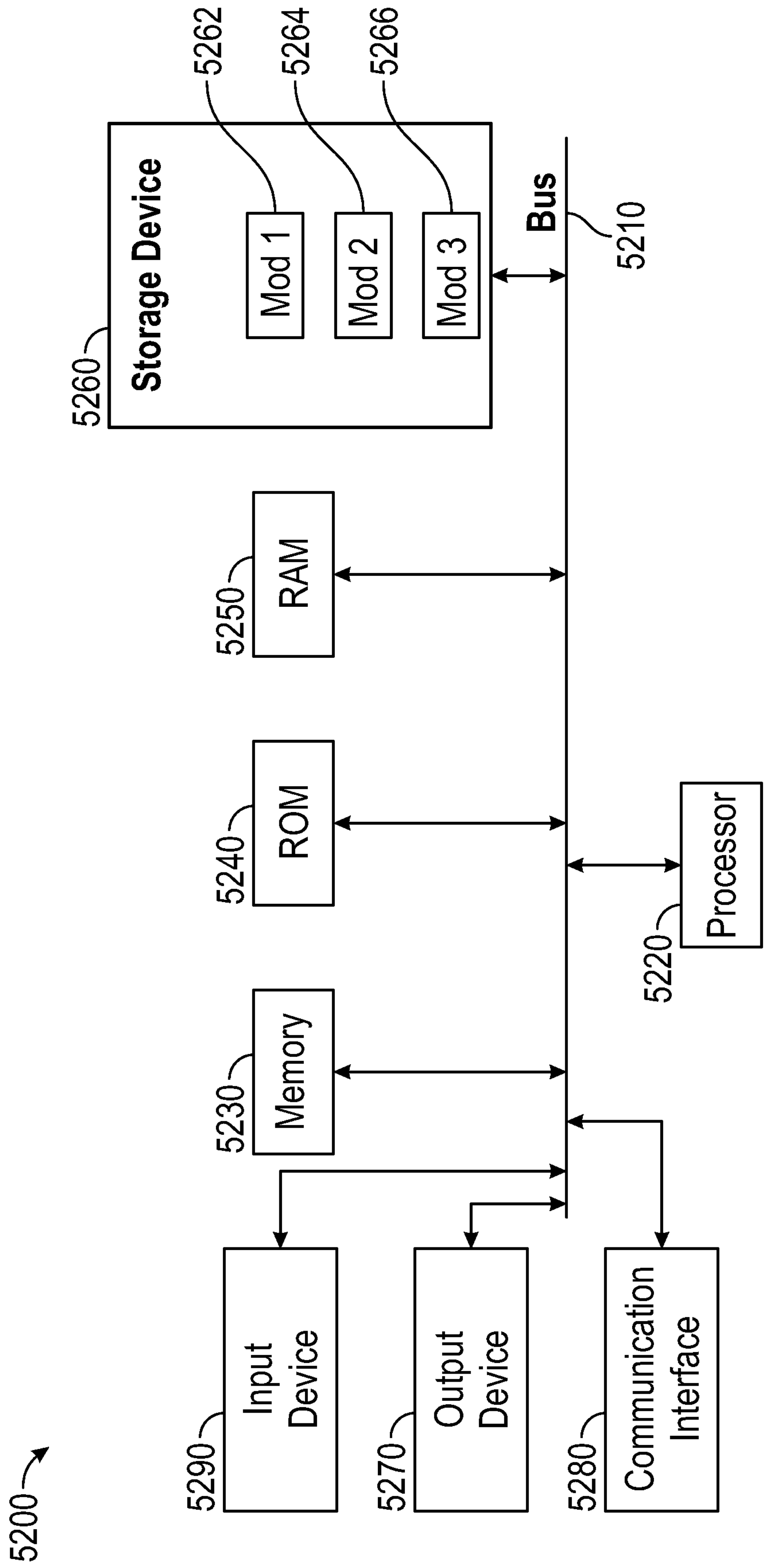
FIG. 52 is an exemplary computing system.

With reference to FIG. 52, an exemplary system 5200 may carry out any of the methods or systems described herein. The controllers described previously herein may be according to the system 5200. The system 5200 includes a general-purpose computing device 5200, including a processing unit (CPU or processor) 5220 and a system bus 5210 that couples various system components including the system memory 5230 such as read-only memory (ROM) 5240 and random-access memory (RAM) 5250 to the processor 5220. The system 5200 can include a cache of high-speed memory connected directly with, in close proximity to, or integrated as part of the processor 5220. The system 5200 copies data from the memory 5230 and/or the storage device 5260 to the cache for quick access by the processor 5220. In this way, the cache provides a performance boost that avoids processor 5220 delays while waiting for data. These and other modules can control or be configured to control the processor 5220 to perform various actions. Other system memory 5230 may be available for use as well. The memory 5230 can include multiple different types of memory with different performance characteristics. It can be appreciated that the disclosure may operate on a computing device 5200 with more than one processor 5220 or on a group or cluster of computing devices networked together to provide greater processing capability. The processor 5220 can include any general-purpose processor and a hardware module or software module, such as module 1 5262, module 2 5264, and module 3 5266 stored in storage device 5260, configured to control the processor 5220 as well as a special-purpose processor where software instructions are incorporated into the actual processor design. The processor 5220 may essentially be a completely self-contained computing system, containing multiple cores or processors, a bus, memory controller, cache, etc. A multi-core processor may be symmetric or asymmetric.

The system bus 5210 may be any of several types of bus structures including a memory bus or memory controller, a peripheral bus, and a local bus using any of a variety of bus architectures. A basic input/output (BIOS) stored in ROM 5240 or the like, may provide the basic routine that helps to transfer information between elements within the computing device 5200, such as during start-up. The computing device 5200 further includes storage devices 5260 such as a hard disk drive, a magnetic disk drive, an optical disk drive, tape drive or the like. The storage device 5260 can include software modules 5262, 5264, 5266 for controlling the processor 5220. Other hardware or software modules are contemplated. The storage device 5260 is connected to the system bus 5210 by a drive interface. The drives and the associated computer-readable storage media provide nonvolatile storage of computer-readable instructions, data structures, program modules and other data for the computing device 5200. In one aspect, a hardware module that performs a particular function includes the software component stored in a tangible computer-readable storage medium in connection with the necessary hardware components, such as the processor 5220, bus 5210, display 5270, and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the device 5200 is a small, handheld computing device, a desktop computer, or a computer server.

Although the exemplary embodiment described herein employs the hard disk 5260, other types of computer-readable media which can store data that are accessible by a computer, such as magnetic cassettes, flash memory cards, digital versatile disks, cartridges, random access memories (RAMs) 5250, and read-only memory (ROM) 5240, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 5200, an input device 5290 represents any number of input mechanisms, such as a microphone for speech, a touch-sensitive screen for gesture or graphical input, keyboard, mouse, motion input, speech and so forth. An output device 5270 can also be one or more of a number of output mechanisms known to those of skill in the art. In some instances, multimodal systems enable a user to provide multiple types of input to communicate with the computing device 5200. The communications interface 5280 generally governs and manages the user input and system output.

There is no restriction on operating on any particular hardware arrangement and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Further aspects are provided by the subject matter of the following clauses.

A nail gun configured to repeatedly drive nails into a substrate, the nail gun comprising a drive assembly having a longitudinal axis, a feed head assembly attached to the drive assembly and configured to provide the nails to an output segment, a hammer configured to reciprocate along the longitudinal axis of the drive assembly to drive the nails into the substrate, and a reservoir assembly configured to provide compressed air to the drive assembly to reciprocate the hammer and drive a nail into the substrate.

The nail gun of the preceding clause, further comprising a dump valve fluidly coupled to the drive assembly, the dump valve configured to selectively seal the drive assembly.

The nail gun of any preceding clause, further comprising a reload segment configured to sequentially load nails into the feed head assembly, wherein the reload segment is pivotably attached to a base plate of the feed head assembly.

The nail gun of any preceding clause, wherein the drive assembly is configured to drive the hammer through an impact stroke, the impact stroke comprising a downstroke, in which the hammer is driven through a drive segment of the feed head assembly for impacting the nail within the output segment, and an upstroke.

The nail gun of any preceding clause, wherein, during the downstroke, the hammer moves through the drive segment and contacts an external surface of a reload segment, such that the reload segment moves, relative to the drive segment, from a reload position into a blocked position.

The nail gun of any preceding clause, wherein, in the reload position, a nail outlet is aligned with a nail passage to allow a nail within the reload segment to be transferred into the drive segment, and, in the blocked position, the nail outlet is misaligned with the nail passage so that the nail within the reload segment cannot be transferred into the drive segment.

The nail gun of any preceding clause, wherein the reload segment is configured such that movement of the reload segment into the reload position is blocked until the hammer is withdrawn from the drive segment during the upstroke.

The nail gun of any preceding clause, wherein the output segment comprises a channel having a substantially annular shape that is formed in an outer surface of the output segment, and a centering spring positioned within the channel to exert a radially inwardly oriented centering force a nail within the output segment.

The nail gun of any preceding clause, comprising a beam sensor that is configured to transmit a beam configured to detect when a nail is within the output segment, and, wherein, when the beam is broken by the nail within the output segment, the hammer is triggered to drive the nail out of the output segment.

The nail gun of any preceding clause, wherein each nail is fed to the feed head assembly with pressurized air.

The nail gun of any preceding clause, wherein each nail is fed to the feed head assembly by a coil of nails or a magazine of nails.

The nail gun of claim 1, further comprising a guide assembly that is rigidly attached to the feed head assembly, wherein the guide assembly comprises a guide plate configured to receive and guide the nails towards the output segment.

The nail gun of any preceding clause, further comprising a feed actuator configured to control a transfer of the nails individually into the output segment.

The nail gun of any preceding clause, wherein the feed actuator comprises a push arm configured to transfer each of the nails individually into the output segment, a cylinder rod that extends longitudinally from a cylinder body and is pivotably attached, at a distal end thereof, to the push arm, and a shock assembly that is pivotably attached, at a proximal end thereof, to a shock bracket that is rigidly attached to the cylinder body and, at a distal end thereof, to the push arm.

The nail gun of claim 14, wherein the feed actuator comprises a first air inlet that is configured, when supplied with pressurized air, to cause an extension movement of the cylinder rod relative to the cylinder body, and a second air inlet that is configured, when supplied with pressurized air, to cause a retraction movement of the cylinder rod relative to the cylinder body, and wherein the extension movement of the cylinder rod causes the push arm to pivot and transfer a single one of the nails into the output segment.

A method for sequentially driving nails into a substrate or structure, the method comprising providing a nail gun comprising a drive assembly having a longitudinal axis, a feed head assembly attached to the drive assembly and configured to provide the nails to an output segment, a hammer configured to reciprocate along the longitudinal axis of the drive assembly to drive the nails into the substrate, and a reservoir assembly configured to provide compressed air to the drive assembly to reciprocate the hammer and drive the nails into the substrate. The method comprising dispensing a first nail into the drive assembly such that the first nail moves into the output segment, moving the hammer along a direction of the longitudinal axis, impacting a head of the first nail with a distal end of the hammer, thereby imparting a drive force to the first nail, feeding, from a nail supply and while the hammer is moving to impact the first nail, a second nail into a reload segment, preventing the second nail from being dispensed into the feed head assembly while the distal end of the hammer is in the feed head assembly, and dispensing the second nail into the feed head assembly after the distal end of the hammer is withdrawn from the feed head assembly.

The method of the preceding clause, wherein the drive assembly moves the hammer through an impact stroke, the impact stroke comprising a downstroke, in which the hammer is driven through the feed head assembly for impacting the nail within the output segment, and an upstroke.

The method of any preceding clause, wherein, during the downstroke, the hammer moves through the feed head assembly and contacts an external surface of the reload segment, such that the reload segment moves, relative to the feed head assembly, from a reload position into a blocked position.

The method of any preceding clause, wherein, in the reload position, a nail outlet is aligned with a nail passage to allow a nail within the reload segment to be transferred into the feed head assembly and, in the blocked position, the nail outlet is misaligned with the nail passage so that the nail within the reload segment cannot be transferred into the feed head assembly.

The method of any preceding clause, further comprising transmitting a beam through a pair of opposing holes that are formed through the output segment, such that the beam passes through the output segment; and detecting when each of the nails is within the output segment by sensing that the beam is broken.

The method of any preceding clause, further comprising controlling, with a feed actuator, a repeated and sequential transfer of each of the nails individually into the output segment, detecting, using a sensor assembly, when a nail is within the output segment, and moving the hammer in a repetitive manner along the longitudinal axis, for driving each of the nails individually out of the output segment, wherein the feed actuator dispenses each of the nails sequentially into the output segment after the distal end of the hammer is withdrawn therefrom.

The method of any preceding clause, further comprising supplying a first air inlet with pressurized air, causing an extension movement of a cylinder rod relative to a cylinder body due to the supplying of the first air inlet with pressurized air, supplying a second air inlet with pressurized air, and causing a retraction movement of the cylinder rod relative to the cylinder body due to the supplying the second air inlet with pressurized air.

The method of any preceding clause, further comprising causing, with the extension movement, a push arm to pivot and transfer a single one of the nails into the output segment.

A nail gun configured to sequentially drive nails into a substrate or structure includes a drive assembly, a feed head assembly attached to the drive assembly and comprising a drive segment comprising a drive chamber, a reload segment configured for sequentially loading nails into the drive chamber individually, and an output segment that is attached, at a proximal end thereof, to a distal end of the drive chamber, the output segment comprising an output segment inlet that is directly adjacent to and formed as an extension of the drive chamber. The drive chamber is configured to receive, repeatedly and sequentially from the reload chamber, one of the nails therein and to sequentially transfer each of the nails to the output segment. The nail gun includes a hammer configured to move in a repetitive manner, along a longitudinal axis of the feed head assembly, for driving each of the nails individually out of the output segment, the hammer comprising a hammer rod that is substantially coaxial with the longitudinal axis of the feed head assembly. The hammer rod comprises a distal end that is configured to impact a head of each of the nails when each nail is within the output segment for imparting a drive force to each such nail, and, upon actuation of the hammer, the nail gun is configured to dispense from a distal end of the output segment one of the nails. The reload chamber is configured to receive therein, from a nail supply and while the hammer rod is moving through the hammer rod passage, a further nail of the plurality of individual nails, hold the further nail within the reload chamber while the hammer rod is in the drive chamber, and dispense the further nail into the drive chamber after the distal end of the hammer rod is withdrawn from the drive chamber.

The nail gun of the preceding clause, wherein the reload segment is pivotably attached to a base plate of the feed head assembly and the drive segment is rigidly attached to the base plate.

The nail gun of any preceding clause, wherein the drive segment comprises a stop plate and a notch formed therein, the notch comprising a reload passage that is shaped to allow passage of a nail from the reload segment into the drive chamber of the drive segment.

The nail gun of any preceding clause, wherein the drive assembly is configured to drive the hammer through an impact stroke, the impact stroke comprising a downstroke, in which the hammer is driven through the feed head assembly for impacting the nail within the output segment, and an upstroke.

The nail gun of any preceding clause, wherein, during the downstroke, the hammer rod moves through the drive segment and contacts an external surface of the reload segment, such that the reload segment moves, relative to the drive segment, from a reload position into a blocked position.

The nail gun of any preceding clause, wherein, in the reload position, the nail outlet is aligned with the nail passage of the notch to allow a nail within the reload chamber to be transferred into the drive chamber through the reload passage and, in the blocked position, the nail outlet is misaligned with the nail passage of the notch so that the nail within the reload chamber cannot be transferred into the drive chamber through the reload passage.

The nail gun of any preceding clause, wherein the stop plate is formed directly adjacent to the reload passage of the notch such that, when the reload segment is in the blocked position, the nail outlet faces directly against the stop plate so that the nail within the reload chamber can rest directly against the stop plate until the reload segment returns to the reload position.

The nail gun of any preceding clause, wherein the reload segment is configured such that, when the reload segment is returning to the reload position, the nail within the reload chamber is automatically transferred into the drive chamber when the nail outlet is sufficiently aligned with the reload passage of the notch.

The nail gun of any preceding clause, comprising a biasing spring connected to the reload segment and configured to exert a bias force on the reload segment to align the reload chamber with the reload passage of the notch.

The nail gun of any preceding clause, wherein the reload segment is configured such that movement of the reload segment into the reload position is blocked until the hammer rod is withdrawn from the drive chamber during the upstroke.

The nail gun of any preceding clause, wherein the output segment comprises a plurality of finger slots that are formed spaced apart from each other circumferentially and extend from an outer surface of the output segment to the output chamber and a plurality of centering fingers, each finger slot of the plurality of finger slots having one of the centering fingers of the plurality of centering fingers provided therein, wherein the centering fingers are configured to position each of the nails within the output chamber in a substantially centered position.

The nail gun of any preceding clause wherein the plurality of finger slots extend through an entire thickness of an outer wall of the output segment.

The nail gun of any preceding clause wherein the plurality centering fingers are pivotably attached within plurality of finger slots.

The nail gun of any preceding clause wherein the output segment comprises a channel having a substantially annular shape that is formed in the outer surface of the output segment and in each of the plurality of centering fingers and a centering spring positioned within the channel to exert a radially inwardly oriented centering force on each of the nails within the output chamber.

The nail gun of any preceding clause, comprising a beam sensor that is configured to transmit a beam through a pair of opposing holes that are formed through the thickness of the output segment, such that the beam passes through the output chamber for detecting when each of the nails is within the output chamber.

The nail gun of any preceding clause, wherein, when the beam is broken by each of the nails within the output chamber, the hammer is triggered to drive the nail out of the output chamber.

A method for sequentially driving nails into a substrate with the nail gun of any preceding clause.

A method for sequentially driving nails into a substrate or structure comprises providing a nail gun comprising a drive assembly, a feed head assembly attached to the drive assembly and comprising a drive segment comprising a drive chamber and a hammer rod passage formed therein, a reload segment comprising a reload chamber, and an output segment that is attached, at a proximal end thereof, to a distal end of the drive chamber, the output segment comprising an output segment inlet that is directly adjacent to and formed as an extension of the drive chamber, and a hammer comprising a hammer rod, dispensing a nail into the drive chamber from the reload chamber, such that the nail moves into the output segment, moving the hammer rod through the hammer rod passage, along a direction of a longitudinal axis of the feed head assembly, to impact a head of the nail with a distal end of the hammer rod, thereby imparting a drive force to the nail, feeding, from a nail supply and while the hammer rod is moving through the hammer rod passage, a further nail into the reload chamber of the reload segment, preventing the further nail from being dispensed into the drive chamber while the distal end of the hammer rod is in the drive chamber, and dispensing the further nail into the drive chamber after the distal end of the hammer rod is withdrawn from the drive chamber.

The method any preceding clause, comprising pivotably attaching the reload segment to a base plate of the feed head assembly, and rigidly attaching the drive segment to the base plate.

The method any preceding clause, comprising forming, in the drive segment, a stop plate and a notch, wherein the notch comprises a reload passage that is shaped to allow passage of a nail from the reload segment into the drive chamber of the drive segment.

The method any preceding clause, wherein the drive assembly moves the hammer through an impact stroke, the impact stroke comprising a downstroke, in which the hammer is driven through the feed head assembly for impacting the nail within the output segment, and an upstroke.

The method any preceding clause, wherein, during the downstroke, the hammer rod moves through the drive segment and contacts an external surface of the reload segment, such that the reload segment moves, relative to the drive segment, from a reload position into a blocked position.

The method any preceding clause, wherein, in the reload position, the nail outlet is aligned with the nail passage of the notch to allow a nail within the reload chamber to be transferred into the drive chamber through the reload passage and, in the blocked position, the nail outlet is misaligned with the nail passage of the notch so that the nail within the reload chamber cannot be transferred into the drive chamber through the reload passage.

The method any preceding clause, wherein the stop plate is formed directly adjacent to the reload passage of the notch such that, when the reload segment is in the blocked position, the nail outlet faces directly against the stop plate so that the nail within the reload chamber can rest directly against the stop plate until the reload segment returns to the reload position.

The method any preceding clause, wherein, when the reload segment is returning to the reload position, the nail within the reload chamber is automatically transferred into the drive chamber when the nail outlet is sufficiently aligned with the reload passage of the notch.

The method any preceding clause, comprising attaching a biasing spring to the reload segment, and exerting, using the reload spring, a bias force on the reload segment to align the reload chamber with the reload passage of the notch.

The method any preceding clause, wherein the reload segment is attached to the drive segment in such a way that movement of the reload segment into the reload position is blocked until the hammer rod is withdrawn from the drive chamber during the upstroke.

The method any preceding clause, wherein the output segment comprises a plurality of finger slots that are formed spaced apart from each other circumferentially and extend from an outer surface of the output segment to the output chamber, and a plurality of centering fingers, each finger slot of the plurality of finger slots having one of the centering fingers of the plurality of centering fingers provided therein, and wherein the centering fingers are configured to position each of the nails within the output chamber in a substantially centered position.

The method any preceding clause, wherein the plurality of finger slots extend through an entire thickness of an outer wall of the output segment.

The method any preceding clause, wherein the plurality centering fingers are pivotably attached within plurality of finger slots.

The method any preceding clause, wherein the output segment comprises a channel having a substantially annular shape that is formed in the outer surface of the output segment and in each of the plurality of centering fingers, and a centering spring positioned within the channel to exert a radially inwardly oriented centering force on each of the nails within the output chamber.

The method any preceding clause, comprising a beam sensor that is configured to transmit a beam through a pair of opposing holes that are formed through the thickness of the output segment, such that the beam passes through the output chamber for detecting when each of the nails is within the output chamber.

The method any preceding clause, wherein, when the beam is broken by each of the nails within the output chamber, the hammer is triggered to drive the nail out of the output chamber.

A nail gun configured to sequentially drive nails into a substrate or structure, the nail gun comprising a feed head assembly comprising a main housing, a feed cylinder assembly that is pivotably attached to the main housing and comprises a first portion of a nail/driver guide, a guide assembly that is rigidly attached to the main housing and comprises a second portion of a nail/driver guide, and a sensor assembly that is rigidly attached to the main housing and is configured for detecting when one of the nails is within a volumetric region defined between the first and second portions of the nail/driver guide, wherein the guide assembly comprises a guide plate configured to receive and guide the nails towards the nail/driver guide, and wherein the feed cylinder assembly comprises a feed actuator configured to control, repeatedly and sequentially, a transfer of the nails individually into the volumetric region defined between the first and second portions of the nail/driver guide, and a hammer configured to move in a repetitive manner, along a longitudinal axis of the feed head assembly, for driving each of the nails individually out of the volumetric region defined between the first and second portions of the nail/driver guide, the hammer comprising a hammer rod that is substantially coaxial with the longitudinal axis of the feed head assembly, wherein the hammer rod comprises a distal end that is configured to impact a head of each of the nails when each nail is within the volumetric region defined between the first and second portions of the nail/driver guide for imparting a drive force to each such nail, wherein, upon actuation of the hammer, the nail gun is configured to dispense one of the nails from a distal end of the nail/driver guide, and wherein the feed actuator is configured to dispense each of the nails sequentially into the volumetric region defined between the first and second portions of the nail/driver guide after the distal end of the hammer rod is withdrawn therefrom.

The nail gun of the preceding clause, wherein the feed actuator comprises a push arm configured to transfer each of the nails individually into the volumetric region defined between the first and second portions of the nail/driver guide, a cylinder rod that extends longitudinally from a cylinder body and is pivotably attached, at a distal end thereof, to the push arm, a shock assembly that is pivotably attached, at a proximal end thereof, to a shock bracket that is rigidly attached to the cylinder body and, at a distal end thereof, to the push arm.

The nail gun of any preceding clause, wherein the feed actuator comprises a first air inlet that is configured, when supplied with pressurized air, to cause an extension movement of the cylinder rod relative to the cylinder body; and a second air inlet that is configured, when supplied with pressurized air, to cause a retraction movement of the cylinder rod relative to the cylinder body.

The nail gun of any preceding clause, wherein the extension movement of the cylinder rod causes the push arm to pivot and transfer a single one of the nails into the volumetric region defined between the first and second portions of the nail/driver guide.

The nail gun of any preceding clause, wherein the sensor assembly comprises a beam sensor that is configured to transmit a beam through a pair of opposing holes that are formed through the thickness of the first and second portions, respectively, of nail/driver guide, such that the beam passes through the volumetric region defined between the first and second portions of the nail/driver guide for detecting when each of the nails is within such volumetric region.

The nail gun of any preceding clause, wherein, when the beam is broken by each of the nails within the volumetric region, the hammer is triggered to drive the nail out of the volumetric region.

A method for sequentially driving nails into a substrate or structure, comprising providing a nail gun having a feed head assembly comprising a main housing a feed cylinder assembly that is pivotably attached to the main housing and comprises a first portion of a nail/driver guide, a guide assembly that is rigidly attached to the main housing and comprises a second portion of a nail/driver guide, and a sensor assembly that is rigidly attached to the main housing, and a hammer comprising a hammer head, guiding, using a guide plate of the guide assembly, the nails towards the nail/driver guide, controlling, using the feed actuator, a repeated and sequential transfer of each of the nails individually into a volumetric region defined between the first and second portions of the nail/driver guide, detecting, using the sensor assembly, when one of the nails is within the volumetric region defined between the first and second portions of the nail/driver guide, and moving the hammer in a repetitive manner along a longitudinal axis of the feed head assembly, for driving each of the nails individually out of the volumetric region defined between the first and second portions of the nail/driver guide, wherein the hammer rod is substantially coaxial with the longitudinal axis of the feed head assembly, wherein the hammer rod comprises a distal end that impacts a head of each of the nails when each nail is within the volumetric region defined between the first and second portions of the nail/driver guide for imparting a drive force to each such nail, wherein, upon actuation of the hammer, the nail gun dispenses one of the nails from a distal end of the nail/driver guide, and wherein the feed actuator dispenses each of the nails sequentially into the volumetric region defined between the first and second portions of the nail/driver guide after the distal end of the hammer rod is withdrawn therefrom.

The method of the preceding clause, wherein the feed actuator comprises a push arm that transfers each of the nails individually into the volumetric region defined between the first and second portions of the nail/driver guide, a cylinder rod that extends longitudinally from a cylinder body and is pivotably attached, at a distal end thereof, to the push arm, and a shock assembly that is pivotably attached, at a proximal end thereof, to a shock bracket that is rigidly attached to the cylinder body and, at a distal end thereof, to the push arm.

The method of any preceding clause, wherein the feed actuator comprises a first air inlet that, when supplied with pressurized air, causes an extension movement of the cylinder rod relative to the cylinder body, and a second air inlet that, when supplied with pressurized air, causes a retraction movement of the cylinder rod relative to the cylinder body.

The method of any preceding clause, wherein the extension movement of the cylinder rod causes the push arm to pivot and transfer a single one of the nails into the volumetric region defined between the first and second portions of the nail/driver guide.

The method of any preceding clause, wherein the sensor assembly comprises a beam sensor that transmits a beam through a pair of opposing holes that are formed through the thickness of the first and second portions, respectively, of nail/driver guide, such that the beam passes through the volumetric region defined between the first and second portions of the nail/driver guide for detecting when each of the nails is within such volumetric region.

The method of any preceding clause, wherein, when the beam is broken by each of the nails within the volumetric region, the hammer is triggered to drive the nail out of the volumetric region.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter. Moreover, features described in connection with one embodiment may be used in conjunction with other embodiments, even if not explicitly stated above.

The invention claimed is:

1. A nail gun configured to repeatedly drive nails into a substrate, the nail gun comprising:
- a drive assembly having a longitudinal axis;
- a feed head assembly attached to the drive assembly and configured to provide the nails to an output segment;
- a hammer configured to reciprocate along the longitudinal axis of the drive assembly to drive the nails into the substrate;
- a reservoir assembly configured to provide compressed air to the drive assembly to reciprocate the hammer and drive a nail into the substrate; and
- a sensor configured to detect when a nail is within the output segment, wherein the hammer is triggered to drive the nail out of the output segment when the sensor detects the nail is within the output segment.

2. The nail gun of claim 1, further comprising a dump valve fluidly coupled to the drive assembly, the dump valve configured to selectively seal the drive assembly.

3. The nail gun of claim 1, further comprising a reload segment configured to sequentially load nails into the feed head assembly, wherein the reload segment is pivotably attached to a base plate of the feed head assembly.

4. The nail gun of claim 1, wherein the drive assembly is configured to drive the hammer through an impact stroke, the impact stroke comprising a downstroke, in which the hammer is driven through a drive segment of the feed head assembly for impacting the nail within the output segment, and an upstroke.

5. The nail gun of claim 4, wherein, during the downstroke, the hammer moves through the drive segment and contacts an external surface of a reload segment, such that the reload segment moves, relative to the drive segment, from a reload position into a blocked position.

6. The nail gun of claim 5, wherein, in the reload position, a nail outlet is aligned with a nail passage to allow a nail within the reload segment to be transferred into the drive segment, and, in the blocked position, the nail outlet is misaligned with the nail passage so that the nail within the reload segment cannot be transferred into the drive segment.

7. The nail gun of claim 5, wherein the reload segment is configured such that movement of the reload segment into the reload position is blocked until the hammer is withdrawn from the drive segment during the upstroke.

8. The nail gun of claim 1, wherein the output segment comprises:
- a channel having a substantially annular shape that is formed in an outer surface of the output segment; and
- a centering spring positioned within the channel to exert a radially inwardly oriented centering force a nail within the output segment.

9. The nail gun of claim 1, wherein the sensor is a beam sensor that is configured to transmit a beam configured to detect when a nail is within the output segment, and, wherein, when the beam is broken by the nail within the output segment, the hammer is triggered to drive the nail out of the output segment.

10. The nail gun of claim 1, wherein each nail is fed to the feed head assembly with pressurized air.

11. The nail gun of claim 1, wherein each nail is fed to the feed head assembly by a coil of nails or a magazine of nails.

12. The nail gun of claim 1, further comprising a guide assembly that is rigidly attached to the feed head assembly, wherein the guide assembly comprises a guide plate configured receive and guide the nails towards the output segment.

13. The nail gun of claim 1, further comprising a feed actuator configured to control a transfer of the nails individually into the output segment.

14. The nail gun of claim 13, wherein the feed actuator comprises:
- a push arm configured to transfer each of the nails individually into the output segment;
- a cylinder rod that extends longitudinally from a cylinder body and is pivotably attached, at a distal end thereof, to the push arm; and
- a shock assembly that is pivotably attached, at a proximal end thereof, to a shock bracket that is rigidly attached to the cylinder body and, at a distal end thereof, to the push arm.

15. The nail gun of claim 14, wherein the feed actuator comprises:
- a first air inlet that is configured, when supplied with pressurized air, to cause an extension movement of the cylinder rod relative to the cylinder body; and
- a second air inlet that is configured, when supplied with pressurized air, to cause a retraction movement of the cylinder rod relative to the cylinder body, and
- wherein the extension movement of the cylinder rod causes the push arm to pivot and transfer a single one of the nails into the output segment.

16. A method for sequentially driving nails into a substrate or structure, the method comprising:
- providing a nail gun comprising:
  - a drive assembly having a longitudinal axis;
  - a feed head assembly attached to the drive assembly and configured to provide the nails to an output segment;
  - a hammer configured to reciprocate along the longitudinal axis of the drive assembly to drive the nails into the substrate; and
  - a reservoir assembly configured to provide compressed air to the drive assembly to reciprocate the hammer and drive the nails into the substrate;
- dispensing a first nail into the drive assembly such that the first nail moves into the output segment;
- detecting, with a sensor, when the first nail is within the output segment;
- moving the hammer along a direction of the longitudinal axis when the sensor detects the nail is within the output segment;
- impacting a head of the first nail with a distal end of the hammer, thereby imparting a drive force to the first nail;
- feeding, from a nail supply and while the hammer is moving to impact the first nail, a second nail into a reload segment;
- preventing the second nail from being dispensed into the feed head assembly while the distal end of the hammer is in the feed head assembly; and
- dispensing the second nail into the feed head assembly after the distal end of the hammer is withdrawn from the feed head assembly.

17. The method of claim 16, wherein the drive assembly moves the hammer through an impact stroke, the impact stroke comprising a downstroke, in which the hammer is driven through the feed head assembly for impacting the nail within the output segment, and an upstroke.

18. The method of claim 17, wherein, during the downstroke, the hammer moves through the feed head assembly and contacts an external surface of the reload segment, such that the reload segment moves, relative to the feed head assembly, from a reload position into a blocked position.

19. The method of claim 18, wherein, in the reload position, a nail outlet is aligned with a nail passage to allow a nail within the reload segment to be transferred into the feed head assembly and, in the blocked position, the nail outlet is misaligned with the nail passage so that the nail within the reload segment cannot be transferred into the feed head assembly.

20. The method of claim 16, wherein detecting, with the sensor, when the first nail is within the output segment comprises transmitting a beam through a pair of opposing holes that are formed through the output segment, such that the beam passes through the output segment; and detecting when each of the nails is within the output segment by sensing that the beam is broken.

21. The method of claim 16, further comprising:

controlling, with a feed actuator, a repeated and sequential transfer of each of the nails individually into the output segment;

detecting, using the sensor, when a nail is within the output segment; and moving the hammer in a repetitive manner along the longitudinal axis, for driving each of the nails individually out of the output segment, wherein the feed actuator dispenses each of the nails sequentially into the output segment after the distal end of the hammer is withdrawn therefrom.

22. The method of claim 21, further comprising:

supplying a first air inlet with pressurized air;

causing an extension movement of a cylinder rod relative to a cylinder body due to the supplying of the first air inlet with pressurized air;

supplying a second air inlet with pressurized air; and causing a retraction movement of the cylinder rod relative to the cylinder body due to the supplying the second air inlet with pressurized air.

23. The method of claim 22, further comprising causing, with the extension movement, a push arm to pivot and transfer a single one of the nails into the output segment.

24. A method for sequentially driving nails into a substrate or structure, the method comprising:

providing a nail gun comprising:

a drive assembly having a longitudinal axis;

a feed head assembly attached to the drive assembly and configured to provide the nails to an output segment;

a hammer configured to reciprocate along the longitudinal axis of the drive assembly to drive the nails into the substrate; and a reservoir assembly configured to provide compressed air to the drive assembly to reciprocate the hammer and drive the nails into the substrate;

dispensing a first nail into the drive assembly such that the first nail moves into the output segment;

moving the hammer along a direction of the longitudinal axis;

impacting a head of the first nail with a distal end of the hammer, thereby imparting a drive force to the first nail;

feeding, from a nail supply and while the hammer is moving to impact the first nail, a second nail into a reload segment;

preventing the second nail from being dispensed into the feed head assembly while the distal end of the hammer is in the feed head assembly;

dispensing the second nail into the feed head assembly after the distal end of the hammer is withdrawn from the feed head assembly;

controlling, with a feed actuator, a repeated and sequential transfer of each of the nails individually into the output segment;

detecting, using a sensor assembly, when a nail is within the output segment; and moving the hammer in a repetitive manner along the longitudinal axis, for driving each of the nails individually out of the output segment, wherein the feed actuator dispenses each of the nails sequentially into the output segment after the distal end of the hammer is withdrawn therefrom.

25. The method of claim 24, further comprising:

supplying a first air inlet with pressurized air;

causing an extension movement of a cylinder rod relative to a cylinder body due to the supplying of the first air inlet with pressurized air;

supplying a second air inlet with pressurized air; and causing a retraction movement of the cylinder rod relative to the cylinder body due to the supplying the second air inlet with pressurized air.

26. The method of claim 25, further comprising causing, with the extension movement, a push arm to pivot and transfer a single one of the nails into the output segment.

27. A nail gun configured to repeatedly drive nails into a substrate, the nail gun comprising:

a drive assembly having a longitudinal axis;

a feed head assembly attached to the drive assembly and configured to provide the nails to an output segment, wherein the output segment comprises:

a channel having a substantially annular shape that is formed in an outer surface of the output segment; and a centering spring positioned within the channel to exert a radially inwardly oriented centering force a nail within the output segment;

a hammer configured to reciprocate along the longitudinal axis of the drive assembly to drive the nails into the substrate; and a reservoir assembly configured to provide compressed air to the drive assembly to reciprocate the hammer and drive a nail into the substrate.

28. A nail gun configured to repeatedly drive nails into a substrate, the nail gun comprising:

a drive assembly having a longitudinal axis;

a feed head assembly attached to the drive assembly and configured to provide the nails to an output segment;

a guide assembly that is rigidly attached to the feed head assembly, wherein the guide assembly comprises a guide plate configured receive and guide the nails towards the output segment;

a hammer configured to reciprocate along the longitudinal axis of the drive assembly to drive the nails into the substrate; and a reservoir assembly configured to provide compressed air to the drive assembly to reciprocate the hammer and drive a nail into the substrate.

29. A nail gun configured to repeatedly drive nails into a substrate, the nail gun comprising:

a drive assembly having a longitudinal axis;

a feed head assembly attached to the drive assembly and configured to provide the nails to an output segment;

a feed actuator configured to control a transfer of the nails individually into the output segment, wherein the feed actuator comprises:

a push arm configured to transfer each of the nails individually into the output segment;

a cylinder rod that extends longitudinally from a cylinder body and is pivotably attached, at a distal end thereof, to the push arm; and a shock assembly that is pivotably attached, at a proximal end thereof, to a shock bracket that is rigidly attached to the cylinder body and, at a distal end thereof, to the push arm;

a hammer configured to reciprocate along the longitudinal axis of the drive assembly to drive the nails into the substrate;

a reservoir assembly configured to provide compressed air to the drive assembly to reciprocate the hammer and drive a nail into the substrate.

30. The nail gun of claim 29, wherein the feed actuator comprises:

a first air inlet that is configured, when supplied with pressurized air, to cause an extension movement of the cylinder rod relative to the cylinder body; and a second air inlet that is configured, when supplied with pressurized air, to cause a retraction movement of the cylinder rod relative to the cylinder body, and wherein the extension movement of the cylinder rod causes the push arm to pivot and transfer a single one of the nails into the output segment.

* * * * *